(12) United States Patent
Nies et al.

(10) Patent No.: US 7,418,431 B1
(45) Date of Patent: Aug. 26, 2008

(54) WEBSTATION: CONFIGURABLE WEB-BASED WORKSTATION FOR REASON DRIVEN DATA ANALYSIS

(75) Inventors: Craig A. Nies, Carlsbad, CA (US); Jean de Traversay, Solama Beach, CA (US); Arati S. Deo, San Diego, CA (US); Anu K. Pathria, La Jolla, CA (US); Louis S. Biafore, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1932 days.

(21) Appl. No.: 09/672,142

(22) Filed: Sep. 27, 2000

Related U.S. Application Data

(60) Provisional application No. 60/157,226, filed on Sep. 30, 1999.

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06Q 10/00 | (2006.01) |
| G06Q 50/00 | (2006.01) |

(52) U.S. Cl. .......................................... 706/21; 702/2
(58) Field of Classification Search ............ 707/1, 707/3, 5, 100; 705/22; 706/45, 46, 60, 62, 706/61

See application file for complete search history.

(56) References Cited

U.S. PATENT DOCUMENTS

| | | | | |
|---|---|---|---|---|
| 5,253,164 A | | 10/1993 | Holloway et al. .............. 705/2 |
| 5,577,169 A | | 11/1996 | Prezioso ...................... 706/52 |
| 5,577,249 A | * | 11/1996 | Califano ..................... 707/100 |
| 5,819,226 A | * | 10/1998 | Gopinathan et al. ........... 705/44 |
| 5,835,897 A | | 11/1998 | Dang ............................. 705/2 |
| 5,852,819 A | * | 12/1998 | Beller ............................ 707/1 |
| 5,864,846 A | * | 1/1999 | Voorhees et al. ............... 707/5 |
| 5,873,082 A | * | 2/1999 | Noguchi ........................ 707/3 |
| 5,895,453 A | * | 4/1999 | Cook ........................... 705/22 |
| 5,933,822 A | | 8/1999 | Barden-Harder et al. ....... 707/5 |
| 5,970,482 A | * | 10/1999 | Pham et al. ................... 706/16 |
| 6,330,546 B1 | * | 12/2001 | Gopinathan et al. .......... 705/35 |
| 6,473,084 B1 | * | 10/2002 | Phillips et al. ............. 345/440 |
| 6,606,615 B1 | * | 8/2003 | Jennings et al. .............. 706/45 |

(Continued)

OTHER PUBLICATIONS

Gehrke et al., "Classification and Regression: Money 'Can' Grow on Trees", Conference on Knowledge Discovery in Data, Feb. 1999.*

(Continued)

*Primary Examiner*—Michael B Holmes
(74) *Attorney, Agent, or Firm*—Mintz, Levin, Cohn, Ferris, Glovsky & Popeo, P.C.

(57) ABSTRACT

A system, computer program product, and method provide for reason driven data analysis in a web-based system that is configurable to various types of data and environments. The computer program product provides for navigation of a report tree of reports that are hierarchically organized with respect to reasons derived from an analysis of transactional data in a database. A frame based interface provides for easy and flexible navigation and configuration of the reports and other features. A configuration file is used to rapidly develop and customize the web-based system. Case management functionality is included to allow for management of cases being reviewed using the system.

25 Claims, 40 Drawing Sheets

U.S. PATENT DOCUMENTS

| | | | |
|---|---|---|---|
| 6,629,095 B1 * | 9/2003 | Wagstaff et al. | 707/5 |
| 6,728,695 B1 * | 4/2004 | Pathria et al. | 707/2 |
| 6,778,643 B1 * | 8/2004 | Bushey et al. | 379/88.18 |
| 6,804,551 B2 * | 10/2004 | Griffin et al. | 600/515 |
| 6,868,342 B2 * | 3/2005 | Mutter | 702/21 |
| 6,901,830 B2 * | 6/2005 | Kawatsu et al. | 82/122 |
| 6,917,952 B1 * | 7/2005 | Dailey et al. | 707/203 |
| 6,965,861 B1 * | 11/2005 | Dailey et al. | 704/242 |
| 6,973,459 B1 * | 12/2005 | Yarmus | 707/102 |
| 6,978,263 B2 * | 12/2005 | Soulanille | 707/3 |
| 7,003,476 B1 * | 2/2006 | Samra et al. | 705/10 |
| 7,006,979 B1 * | 2/2006 | Samra et al. | 705/10 |
| 7,010,495 B1 * | 3/2006 | Samra et al. | 705/10 |
| 7,050,932 B2 * | 5/2006 | Selby et al. | 702/179 |
| 7,110,993 B2 * | 9/2006 | Soulanille et al. | 707/3 |
| 7,139,369 B2 * | 11/2006 | Martin et al. | 379/88.16 |
| 7,187,790 B2 * | 3/2007 | Sabol et al. | 382/128 |
| 7,191,150 B1 * | 3/2007 | Shao et al. | 705/38 |
| 7,251,624 B1 * | 7/2007 | Lee et al. | 705/35 |
| 7,263,492 B1 * | 8/2007 | Suresh et al. | 705/2 |

OTHER PUBLICATIONS

Khoshgoftaar et al., "Predicting the Order of Fault-Prone Modules in Legacy Software", The Ninth International Symposium on Software Reliability Engineering, Nov. 1998.*

Stokes et al., "Recent Enhancements and New Directions n SAS/STAT Software", SUGI Proceedings 1998.*

Yancher et al., "Visualization of Modeling Results in Database Marketing", DIMACS MiniWorkshop Exploring Large Data Sets Using Classification, Consensus and Platter Recognition Techniques, May 1997.*

Insurance, Government and Health Care, Decision Edge for Fraud and Abuse Management, IBM, 1998.*

A multi-information based gene scoring model with applications on analysis of hepatocellular carcinoma Hsieh-Hui Yu; Tseng, V.S.-M.; Jiin-Haur Chuang; Bioinformatics and Bioengineering, 2004. BIBE 2004. Proceedings. Fourth IEEE Symposium on May 19-21, 2004 pp. 345-350.*

Machine quantification of text-based economic reports for use in predictive modeling Lu Gao; Beling, P.A.; Systems, Man and Cybernetics, 2003. IEEE International Conference on vol. 4, Oct. 5-8, 2003 pp. 3536-3541 vol. 4.*

The quantification of unstructured information and its use in predictive modeling Dumrong, P.; Gould, J.; Lee, G.; Nicholson, L.; Gao, K.; Beling, P.; Blume, M.; Robinson, J.; Systems and Information Engineering Design Symposium, 2003 IEEE Apr. 24-25, 2003 pp. 225-232.*

Automatic Phonetic Segmentation by Score Predictive Model for the Corpora of Mandarin Singing Voices Cheng-Yuan Lin; Jyh-Shing Jang;Audio, Speech, and Language Processing, IEEE Transactions on [see also Speech and Audio Processing, IEEE Transactions on] vol. 15, Issue 7, Sep. 2007 pp. 2151-2159 Digital Object Identifier 10.1109/TASL.20.*

Risk Factors for Apgar Score using Artificial Neural Networks Ibrahim, D.; Frize, M.; Walker, R.C.; Engineering in Medicine and Biology Society, 2006. EMBS '06. 28th Annual International Conference of the IEEE Aug. 2006 pp. 6109-6112 Digital Object Identifier 10.1109/IEMBS.2006.25959.*

Risk Factors for Apgar Score using Artificial Neural Networks Ibrahim, Doaa; Frize, Monique; Walker, Robin C; Engineering in Medicine and Biology Society, 2006. EMBS '06. 28th Annual International Conference of the IEEE Aug. 30, 2006-Sep. 3, 2006 pp. 6109-6112 Digital Object Identifier 10.1109/IEMBS.2006.259591.*

Integrating customer value considerations into predictive modeling Rosset, S.; Neumann, E.; Data Mining, 2003. ICDM 2003. Third IEEE International Conference on Nov. 19-22, 2003 pp. 283-290.*

Performance of neural nets, Cart, and Cox models for censored survival data Kates, R.E.; Berger, U.; Ulm, B.K.; Harbeck, N.; Graeff, H.; Schmitt, M.; Knowledge-Based Intelligent Information Engineering Systems, 1999. Third International Conference Aug. 31-Sep. 1, 1999 pp. 309-312 Digital Object Identifier 10.1109/KES.1999.820185.*

Computer prediction of neonatal outcome and comparison with assessments by physicians and midwives Rey, H.R.; Han, S.A.; Higgins, A.; Rosasco, K.; Peisner, D.; James, L.S.; Computer-Based Medical Systems, 1989. Proceedings., Second Annual IEEE Symposium on Jun. 26-27, 1989 pp. 16-24 Digital Object Identifier 10.1109/CBMSYS.1989.47352.*

Can Hofstede's Model Explain National Differences in Perceived Information Overload? A Look at Data From the US and New Zealand Kock, N.; Parente, R.; Verville, J.; Professional Communication, IEEE Transactions on vol. 51, Issue 1, Mar. 2008 pp. 33-49 Digital Object Identifier 10.1109/TPC.2007.2000047.*

Modified Genetic Algorithm for Parameter Selection of Compartmental Models Shah, N.A.; Moffitt, R.A.; Wang, M.D.; Engineering in Medicine and Biology Society, 2007. EMBS 2007. 29th Annual International Conference of the IEEE Aug. 22-26, 2007 pp. 143-146 Digital Object Identifier 10.1109/IEMBS.2007.4352243.*

Multirate sinusoidal transform coding at rates from 2.4 kbps to 8 kbps McAulay, R.; Quatieri, T.; Acoustics, Speech, and Signal Processing, IEEE International Conference on ICASSP '87. vol. 12, Apr. 1987 pp. 1645-1648.*

Hypermotifs: Novel Discriminatory Patterns for Nucleotide Sequences and their Application to Core Promoter Prediction in Eukaryotes Pridgeon, C.; Corne, D.; Computational Intelligence in Bioinformatics and Computational Biology, 2005. CIBCB '05. Proceedings of the 2005 IEEE Symposium on Nov. 14-15, 2005 pp. 1-7.*

PCT Search Report US00/26881.

* cited by examiner

| 1012 | Client Age/Gender Mix (percent) | | | | | |
|---|---|---|---|---|---|---|
| | Age 0-1 | Age 1-6 | Age 6-12 | Age 12-21 | Age >21 | Total |
| Male | 0.0 | 16.7 | 30.0 | 1.0 | 2.0 | 49.7 |
| Female | 0.0 | 17.3 | 27.0 | 2.0 | 4.0 | 50.3 |
| Total | 0.0 | 34.0 | 57.0 | 3.0 | 6.0 | 100.0 |
| 1014 | Procedure Mix | | | | | | | | | | |
|---|---|---|---|---|---|---|---|---|---|---|---|
| Percent Activity in Each Clinical CPT Group | | | | | | | | | | | |
| | G1 | G2 | G3 | G4 | G5 | G6 | G7 | G8 | G9 | G10 | G11 |
| # | 0.0 | 0.0 | 2.0 | 0.0 | 0.0 | 0.0 | 0.0 | 0.0 | 0.0 | 98.0 | 0.0 |
| $ | 0.0 | 0.0 | 2.0 | 0.0 | 0.0 | 0.0 | 0.0 | 0.0 | 0.0 | 98.0 | 0.0 |
Top 10 Procedure Codes (by Dollars Paid)
| Procedure Code | Number of Details | Dollars Billed | Dollars Paid |
|---|---|---|---|
| D0110 | 4036 | $67,993.00 | $60,400.00 |
| D0120 | 120 | $982.00 | $928.00 |
| D0272 | 3 | $145.00 | $145.00 |
1016
FIG. 10-2
FIG. 9
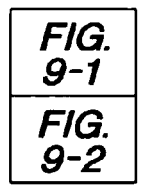
FIG. 10
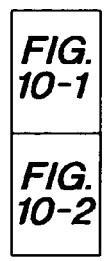

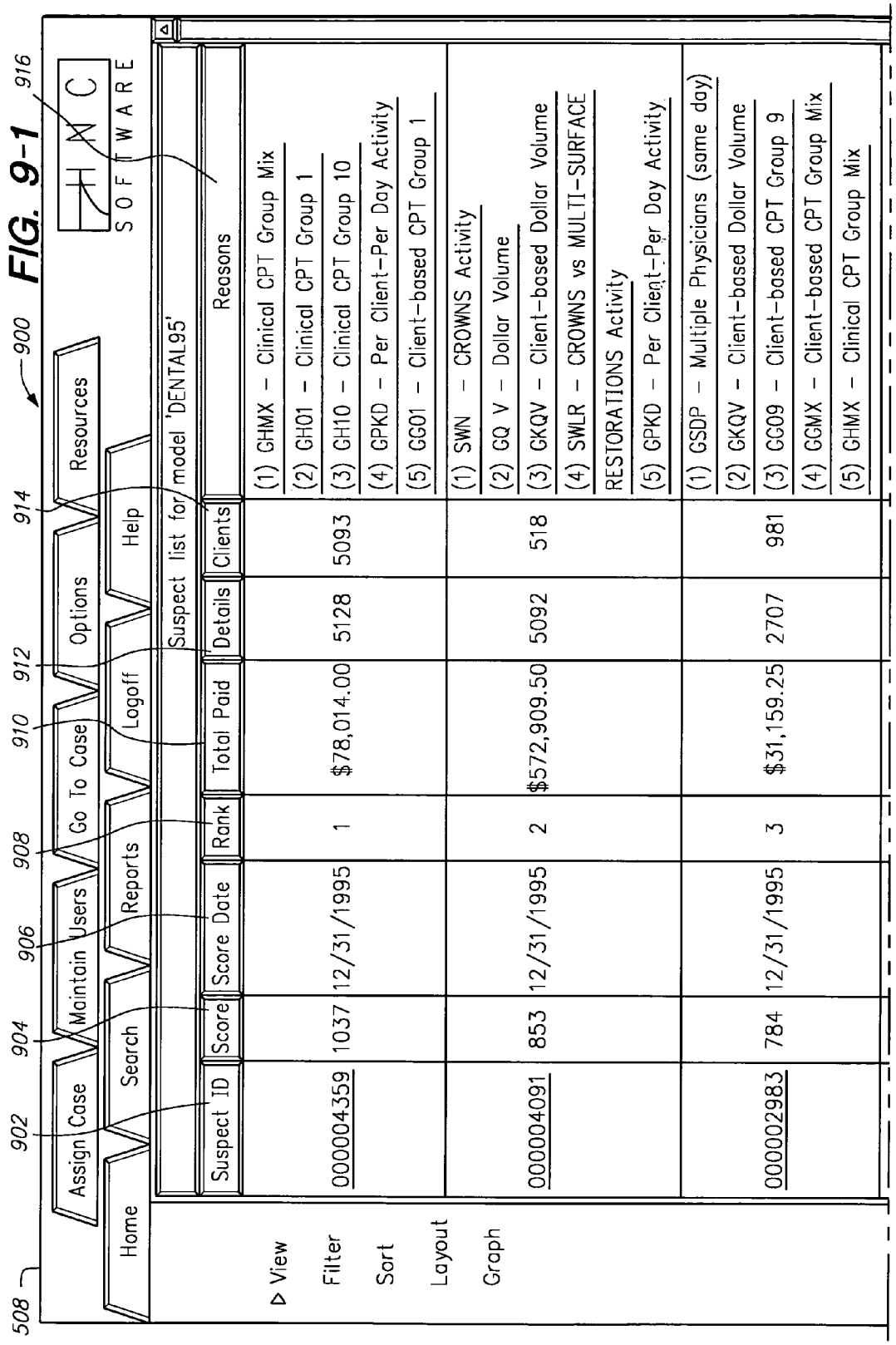

FIG. 9-2

| | | | | | |
|---|---|---|---|---|---|
| 000002791 | 694 | 12/31/1995 | 4 | $43,680.25 | 1671 | 752 | (1) GG02 – Client-based CPT Group 2<br>(2) CH08 – Clinical CPT Group 8<br>(3) GF02 – Provider-based CPT Group 2<br>(4) GHMX – Clinical CPT Group Mix<br>(5) GH01 – Clinical CPT Group 1 |
| 000003215 | 692 | 12/31/1995 | 5 | $9,507.50 | 252 | 47 | (1) GH01 – Clinical CPT Group 1<br>(2) SRI – PERIODONTAL Activity<br>(3) GHMX – Clinical CPT Group Mix<br>(4) SBM – BEHAVIOR MGMT Activity<br>(5) GG01 – Client-based CPT Group 1 |
| 000002795 | 671 | 12/31/1995 | 6 | $55,326.75 | 2428 | 1032 | (1) GG06 – Client-based CPT Group 6<br>(2) GG02 – Client-based CPT Group 2<br>(3) CH07 – Clinical CPT Group 7<br>(4) CH08 – Clinical CPT Group 8<br>(5) GHMX – Clinical CPT Group Mix |
| 000002662 | 666 | 12/31/1995 | 7 | $66,861.05 | 1112 | 218 | (1) SCT – ROOT CANAL or PULPOTOMY Activity<br>(2) GH10 – Clinical CPT Group 10<br>(3) GQ V – Dollar Volume<br>(4) GH05 – Clinical CPT Group 5 |

FIG. 10-1

Provider Summary for 'DP0000005'

Identity

| | |
|---|---|
| Provider Number: | DP0000005 |
| License Number: | D12345 |
| Group Number: | N/A |
| Additional Provider Number: | DENT00002 |
| | DENT00003 |
| Provider Number Count: | 3 |
| Provider Name/Address: | Smith, John P. |
| | 2222 Main St. |
| | Houston, TX 77070 |
| Provider Type: | 48 |
| Provider Specialty: | 1 |

— 1002

Fraud and Abuse Risk

Detection Models:

| Model | Score | Score Date | Reason 1 | Reason 2 | Reason 3 | Reason 4 | Reason 5 |
|---|---|---|---|---|---|---|---|
| Dental provider | 860 | 01/06/1998 | GG01 | GG04 | GH01 | SLS | SLC |

Detection Rules: — 1004    [Details]

| Rule | Detected | Execute Date |
|---|---|---|
| Excessive Daily Billing | No | 01/06/1998 |
| Excessive Per Client Billing | No | 01/06/1998 |

General Statistics

Activity By Year

| | Number of Details | Dollar Billed | Dollar Billed |
|---|---|---|---|
| 1995 | 4036 | $67,993 | $60,400 |
| 1996 | 5593 | $75,982 | $70,528 |
| 1997 | 6732 | $102,200 | $92,350 |

— 1006

Activity By Quarter (Most Recent Year)

| | Q1 1997 | Q2 1997 | Q3 1997 | Q4 1997 |
|---|---|---|---|---|
| Details Paid | 0.0 | 10.0 | 30.0 | 60.0 |
| Details Paid | 0.0 | 12.0 | 35.0 | 53.0 |

— 1008

Activity Detail (Most Recent Year)

| | |
|---|---|
| Dollars Paid per Service: | $15.50 |
| Number of Clients Seen: | 6732 |
| Average Details per Client: | 1.0 |
| Average Billed per Client: | $15.75 |
| Average Paid per Client: | $15.50 |
| Paid to Billed, per Client: | 333.98 |
| Average Paid, per Client, per Day: | $15.50 |
| Maximum $ Paid, per Client, per Day: | $31.00 |

Patient list for provider ID '000004091', used in model 'DENTAL95'

| Patient ID | Age Group | Gender | # Services | Average $ | Total $ | Group 4, # | Group 5, # |
|---|---|---|---|---|---|---|---|
| 000000106 | 4 | M | 22 | 188.84 | 4154.5 | 4 | 0 |
| 000000149 | 4 | F | 28 | 187.12 | 5239 | 0 | 0 |
| 000000216 | 4 | M | 22 | 147.63 | 3247.75 | 4 | 0 |
| 000000369 | 4 | F | 23 | 152.08 | 3497.75 | 4 | 0 |
| 000000478 | 4 | F | 16 | 113.59 | 1317.5 | 0 | 0 |
| 000000567 | 4 | F | 24 | 145.52 | 3492.5 | 0 | 0 |
| 000000812 | 4 | F | 2 | 23.25 | 46.5 | 0 | 0 |
| 000000885 | 4 | F | 31 | 139.09 | 4311.75 | 4 | 0 |
| 000000895 | 4 | M | 2 | 31.5 | 63 | 0 | 0 |
| 000001049 | 4 | M | 22 | 147.26 | 3239.75 | 4 | 0 |
| 000001106 | 4 | F | 27 | 192.99 | 5210.75 | 4 | 0 |
| 000001563 | 4 | F | 13 | 215.29 | 2798.75 | 0 | 0 |
| 000001612 | 4 | F | 24 | 185.29 | 4447 | 5 | 0 |
| 000001822 | 4 | F | 26 | 107.53 | 2795.25 | 8 | 0 |
| 000001939 | 4 | F | 28 | 123.38 | 3454.5 | 4 | 0 |
| 000002133 | 4 | F | 18 | 124.88 | 2247.75 | 4 | 0 |
| 000002137 | 4 | M | 7 | 32.39 | 226.75 | 4 | 0 |
| 000002823 | 4 | M | 13 | 132.83 | 1726.75 | 4 | 0 |
| 000002845 | 4 | M | 17 | 212.83 | 3517.75 | 0 | 0 |
| 000002889 | 4 | F | 9 | 50.53 | 454.75 | 4 | 0 |

▷ View
Filter
Sort
Layout
Graph

FIG. 13

| Claim data for | | patient ID 'RCPT0002213' | |
|---|---|---|---|
| Patient ID | Procedure | Date Of Service | $ Billed |
| RCPT0002213 | D0150 | 01/20/1997 | 15.25 |
| RCPT0002213 | D0210 | 01/20/1997 | 31.75 |
| RCPT0002213 | D3330 | 01/20/1997 | 275 |
| RCPT0002213 | D2791 | 01/20/1997 | 250 |
| RCPT0002213 | D2950 | 01/20/1997 | 45 |
| RCPT0002213 | D2950 | 01/20/1997 | 45 |
| RCPT0002213 | D2150 | 01/20/1997 | 35 |
| RCPT0002213 | D2791 | 01/20/1997 | 278.75 |
| RCPT0002213 | D3330 | 01/20/1997 | 275 |
| RCPT0002213 | D2791 | 01/20/1997 | 250 |
| RCPT0002213 | D2950 | 01/20/1997 | 45 |
| RCPT0002213 | D3320 | 01/20/1997 | 206.25 |
| RCPT0002213 | D3330 | 01/21/1997 | 275 |
| RCPT0002213 | D2950 | 01/21/1997 | 45 |
| RCPT0002213 | D2791 | 01/21/1997 | 250 |
| RCPT0002213 | D3320 | 01/21/1997 | 206.25 |
| RCPT0002213 | D2950 | 01/21/1997 | 45 |
| RCPT0002213 | D2791 | 01/21/1997 | 250 |
| RCPT0002213 | D2150 | 01/21/1997 | 35 |
| RCPT0002213 | D7200 | 01/21/1997 | 120 |
| RCPT0002213 | D7240 | 01/21/1997 | 150 |
| RCPT0002213 | D7130 | 01/21/1997 | 30 |
| RCPT0002213 | D2150 | 01/21/1997 | 35 |
| RCPT0002213 | D2160 | 01/21/1997 | 45 |
| RCPT0002213 | D4341 | 01/21/1997 | 56.25 |
| RCPT0002213 | D4341 | 01/21/1997 | 56.25 |
| RCPT0002213 | D7130 | 01/30/1997 | 30 |

| Date Of Service | $ Billed | $ Paid |
|---|---|---|
| | > 30.00 | = |
| | | |
| | | |
| | | |
| | | |

[Reset] [Cancel]

| Date Of Service | $ Billed | $ Paid |
|---|---|---|
| 01/20/1997 | 15.25 | 15.25 |
| 01/20/1997 | 31.75 | 31.75 |
| 01/20/1997 | 275 | 275 |
| 01/20/1997 | 250 | 250 |
| 01/20/1997 | 45 | 45 |
| 01/20/1997 | 45 | 45 |
| 01/20/1997 | 35 | 35 |
| 01/20/1997 | 278.75 | 250 |
| 01/20/1997 | 275 | 275 |
| 01/20/1997 | 250 | 250 |
| 01/20/1997 | 45 | 45 |
| 01/20/1997 | 206.25 | 206.25 |
| 01/21/1997 | 275 | 275 |
| 01/21/1997 | 45 | 45 |
| 01/21/1997 | 250 | 250 |
| 01/21/1997 | 206.25 | 206.25 | patient ID 'RCPT0002213'

| | Claim data for patient ID 'RCPT0002213' | | | |
|---|---|---|---|---|
| Patient ID | Procedure | Date Of Service | $ Billed | $ Paid |
| ☐ | ☐ | 2 | 1 | ☐ |

[Apply] [Reset] [Cancel]

| | | | | |
|---|---|---|---|---|
| RCPT0002213 | D0150 | 01/20/1997 | 15.25 | 15.25 |
| RCPT0002213 | D0210 | 01/20/1997 | 31.75 | 31.75 |
| RCPT0002213 | D3330 | 01/20/1997 | 275 | 275 |
| RCPT0002213 | D2791 | 01/20/1997 | 250 | 250 |
| RCPT0002213 | D2950 | 01/20/1997 | 45 | 45 |
| RCPT0002213 | D2950 | 01/20/1997 | 45 | 45 |
| RCPT0002213 | D2150 | 01/20/1997 | 35 | 35 |
| RCPT0002213 | D2791 | 01/20/1997 | 278.75 | 250 |
| RCPT0002213 | D3330 | 01/20/1997 | 275 | 275 |
| RCPT0002213 | D2791 | 01/20/1997 | 250 | 250 |
| RCPT0002213 | D2950 | 01/20/1997 | 45 | 45 |
| RCPT0002213 | D3320 | 01/20/1997 | 206.25 | 206.25 |
| RCPT0002213 | D3330 | 01/21/1997 | 275 | 275 |
| RCPT0002213 | D2950 | 01/21/1997 | 45 | 45 |
| RCPT0002213 | D2791 | 01/21/1997 | 250 | 250 |
| RCPT0002213 | D3320 | 01/21/1997 | 206.25 | 206.25 |
| RCPT0002213 | D2950 | 01/21/1997 | 45 | 45 |
| RCPT0002213 | D2791 | 01/21/1997 | 250 | 250 |
| RCPT0002213 | D2150 | 01/21/1997 | 35 | 35 |
| RCPT0002213 | D7230 | 01/21/1997 | 120 | 120 |
| RCPT0002213 | D7240 | 01/21/1997 | 150 | 150 |
| RCPT0002213 | D7130 | 01/21/1997 | 30 | 30 |
| RCPT0002213 | D2150 | 01/21/1997 | 35 | 35 |
| RCPT0002213 | D2160 | 01/21/1997 | 45 | 45 |

Sidebar: View, Filter, ▷ Sort, Layout, Graph

2900

Case List: John Q. Investigator

| Case ID | Status | Target ID | Last Access... | 2902<br>Msgs |
|---|---|---|---|---|
| 10001 | New | 1234 | 06/01/98 ... | 2 |
| 10007 | New | 5678 | 06/01/98 ... | 1 |
| 10009 | Open | 9101 | 06/01/98 ... | 3 |
| 10013 | Open | 9101 | 06/01/98 ... | 0 |
| 10014 | Closed | 9101 | 06/01/98 ... | 3 |

2904　　2906　　2908

EXIT

Detection Sources 3106

| Source | Entry Date | Entered By | Comments |
|---|---|---|---|
| Dental Provider Model, 1998 | 09/24/1999 15:12:40 | jd (John Doe) | This seems like a very interesting one. |

Recovery Report

Estimated Recovery: $25,000.00
Total Recoverd: $15,550.00
Balance (estimated-total): $9,450.00

3108

Recovery Details 3110

| Recovery Date | Amount Recovered | Entry Date | Entered By | Comments |
|---|---|---|---|---|
| 09/24/1999 | $550.00 | 09/24/1999 | jd (John Doe) | Turns out much of lead was poor. |
| 09/27/1999 | $15,000.00 | 09/25/1999 | jd (John Doe) | New evidence and information unearthed considerably more. |

Attached Claims

No claims have been attached to this case.

Linked Cases

No cases have been linked to this case.

WEBSTATION: CONFIGURABLE WEB-BASED WORKSTATION FOR REASON DRIVEN DATA ANALYSIS

CROSS REFERENCE TO RELATED APPLICATION

This application claims priority under 35 U.S.C.§119(e) from provisional application Ser. No. 60/157,226 filed Sep. 30, 1999, which is incorporated by reference herein in its entirety.

BACKGROUND

1. Field of the Invention

The present invention relates to workstations and user interfaces for data mining generally, and more particularly, for analyzing and manipulating the results of predictive models.

2. Background of the Invention

In data mining applications generally, and in applications for analyzing the results of predictive models, it is helpful for users to be able to easily traverse through very complex sets of data describe that describe the relationships between different entities. Conventional data mining tools typically allow for providing complex queries on the data set, but still require the user to sufficiently understand the problem and the data so as to know which queries to construct. This makes it relatively more difficult for the user to explore the data in order to find patterns or relationships of interest, without knowing such relationships ahead of time.

It is further desirable to provide a development platform for a database mining application that allows for rapid development and customization of such applications. Many existing database mining applications are hardcoded, and require customized development by experienced programmers.

SUMMARY OF THE INVENTION

The present invention overcomes the limitations of existing database mining platforms by providing methods for viewing the results of predictive models with report trees. The predictive model scores entities and ranks them by their score. The report tree includes a number of hyperlinked reports, including a summary level report that summarizes data that contributes to a reason that the entity was included in the scored output. The hyperlinking allow a user to quickly navigate through a complex collection of data, to identify, for example, suspicious or fraudulent activity by an entity.

For example, a predictive model may score healthcare providers for the likelihood of fraud based on their reimbursement claims for healthcare services to patients (reimbursements may be requested after the service is provided, at the time is being provided, or prior to the service being provided). The predictive model provides a ranked order listing of providers, and a reason that each provider is included. The reason may be based on some significant aberration in the provider's claims. The report tree allows a user to explore this difference by exploring complex data relationships and underlying individual transactions (e.g. claims), and by statistically comparing the provider's activities with activities of the provider's peers. One aspect of the invention allows the user to dynamically select different peer groups for comparing and contrasting an entity's behavior.

A separate feature of the invention is the ability to create web sites on the fly which contain selected reports from a report tree. A user, while investigating an entity via the report tree, and selectively include different reports into a casebook which forms a web site that others can access to very quickly see the reports of interest.

Yet another separate feature of the invention is a frame based user interface layout for web pages that includes a main menu frame, a display frame, a context menu frame, and a navigation frame.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 9 is a suspect list page.

FIG. 10 is a provider summary page.

FIG. 12 is a patient list page.

FIG. 13 is a patient specific claim data page.

FIG. 15 shows the use of the sort function in the context of the patient specific claim data page.

FIG. 29 illustrates a sample case list.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview of WebStation System Architecture
II. A Deployed Predictive Solution Using a Webstation
III. Overview of WebStation Features
   Reason-Driven Report Tree
   WebStation Frame Layout
   WebStation Integration with Case-Management
IV. Spyder Analysis Workstation: A Quick Introduction
   A Browser-Based Approach to Viewing and Analyzing Detection Results
   A Sample WebStation Session
     User Log-on
     Primary Detection Page
     The Suspect List is the "Root" of Spyder's Report Tree
     Viewing Spyder's Standard Summary Reports
V. Report Tree Example
VI. WebStation Functional Description
   Viewing Report Tree Supporting Data
     Navigation Frame content:
     Function Frame content:
     Data Frame content:
   Produce Hardcopy and Electronic Reports
   Provide Security and Access Controls
   Manage Cases
   Additional WebStation Features
   Optional Features
     Web CaseBook
     Enhanced Graphics
     Graphing Function
     File Export
VII. Case Management Module Software
   Functional Overview
     Manage Cases
     Assign Cases
     Generate Management Reports
     Case Management and Report Navigation
     Web CaseBook
VIII. WebStation Configuration File
   Preferred Syntax of a Configuration File
   Pages
     Title
     SQL
     Coloring
     Column
     Shown/Order
   Example Page Configuration I. Overview of WebStation System Architecture The Analysis WebStation (WebStation) provides a system, method, and software product with a user interface that enables end-users to view, understand, analyze and act upon the results of predictive models. Though the WebStation may also be used with other application areas using various types of transactional data, in this disclosure, an exemplary embodiment for predictive solutions is discussed.

Figure 1:
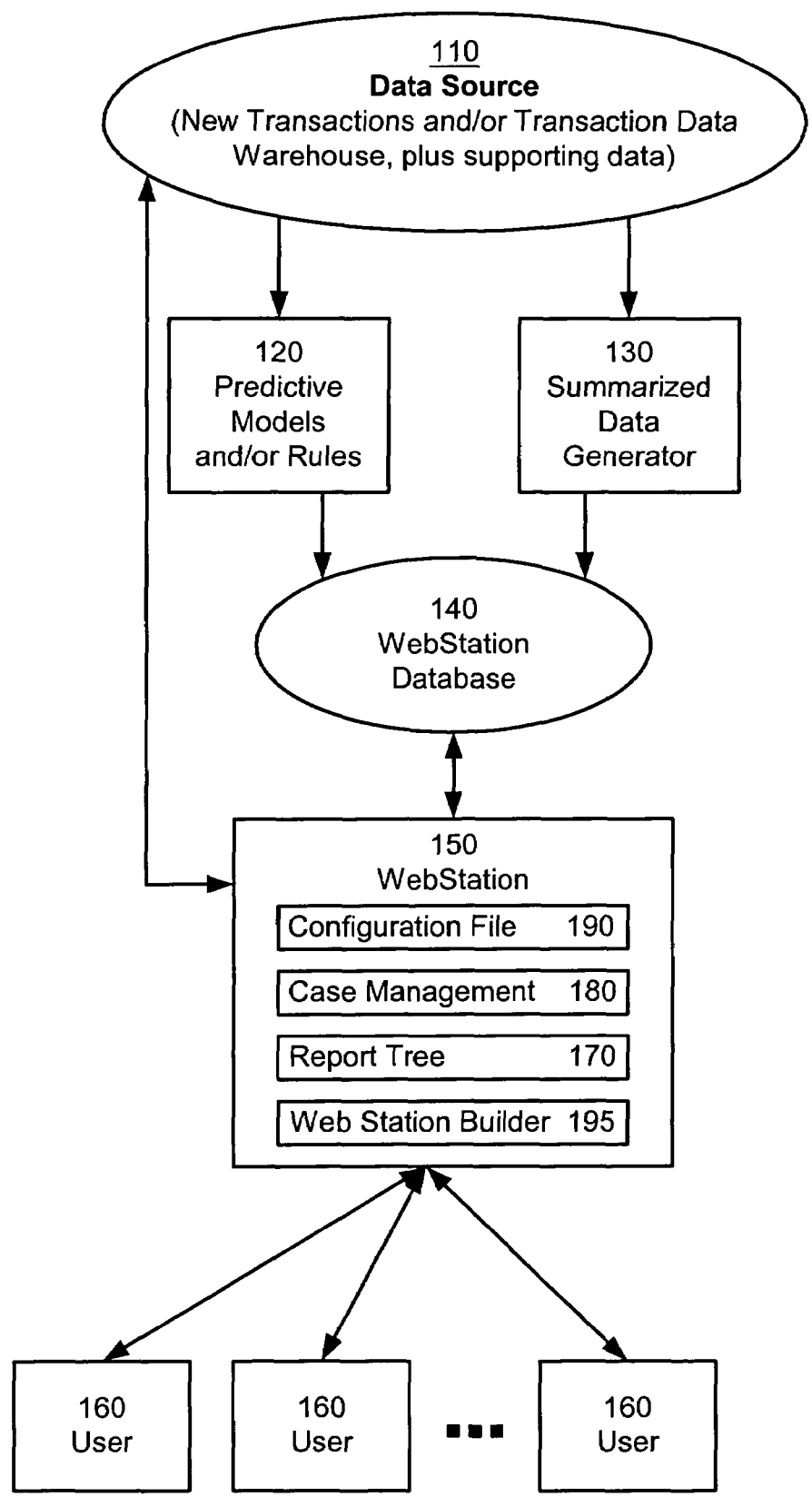
FIG. 1 is an illustration of an exemplary predictive solution system providing a WebStation interface.

Referring now to FIG. 1, there is shown an overview of the system architecture of a system 100 for implementing the WebStation 150. Each element of the system of FIG. 1 can run on a different hardware platform, or may be implemented by consolidating the elements on a more limited number of platforms. The Data Source 110 refers to the raw data upon which the predictive decision will be based. This source often consists of transaction data and supporting data such as demographics or master-file data describing individual "entities." In one embodiment, such as for analysis of healthcare claims, the Data Source 110 may contain 2-4 years of historical claims data, provider master-file data and recipient eligibility data. Claims data may typically span all types of covered services including inpatient, outpatient, pharmacy, dental and long-term care data.

Detection System 120 inputs are derived from the Data Source 110. The Data Source 110 is processed through conventional training methodologies to develop the Detection System 120. The Detection System 120 may include Predictive Models 121 and/or Rules 122. The Detection System 120 is preferably a statistical model (e.g. a neural network, multivariate regression, or the like) or a procedural model (e.g. decision tree, expert system), or even a combination of both. The Predictive Models 121 may be developed using supervised or unsupervised learning techniques. The Predictive Models 121 generate predictive results (usually in the form of a score(s) with associated reasons, and a series of summary reports that will be viewed via the WebStation 150). In a preferred embodiment, the Detection System 120 is developed using the profiling techniques disclosed in co-pending application "Cascaded Profiles for Multiple Interacting Entities," Ser. No. 09/606,575, which is incorporated by reference herein.

In one embodiment, the target of a Predictive Model 121 or Rule 122 is the entity whose fraud risk is being assessed. For example, a model may generate a fraud score for a healthcare provider, a healthcare provider-group, a licensee, a recipient or any of a number of other "entities." When reviewing results, it is desirable for the user to know precisely what the target is. Similarly, each Rule searches for patterns of activity that relate to a specific entity. In the WebStation 150 a Target Id takes the form of an Id for the entity being assessed. The Target Id may refer to a provider number, a license number, or a recipient number, or the like. The target may even be a combination-entity such as provider-recipient pair, in which case the two Id numbers are concatenated to form the Target Id.

The results of the Detection System 120 are stored in the Results Database 140. This database may also contain pre-computed reports designed to help human reviewers determine the best actions to take in response to identified outputs (e.g. identified fraud patterns). The Database 140 serves as the communications path for delivering detection results generated by the Detection System 120 to the end users via WebStation and optional third-party reporting or visualization tools. The Database 140 provides quick access for end-users and enables execution of complex detection queries in a reasonable amount of time.

The Summarized Data Generator 130 transforms the raw data in the data source into summary data to be displayed to end-users by the WebStation 150. The summarized data is stored in a set of data tables in the Database 140. The WebStation 150 provides an interface for end-users to view the predictive results stored in the Database 140 and data from other databases such as raw or summarized data relevant to the end-user.

The WebStation 150 is a highly configurable and general-purpose interface, designed to serve as interface for many different predictive applications in many different industries. As further explained below, the user interface features of the WebStation are implemented as web pages with hyperlinks between them for navigation purposes. The WebStation 150 includes a Report Tree module 170, a Case Management module 180, a Configuration File 190, and a WebStation Builder module 195.

One embodiment of the interface deployed using the WebStation software is for a healthcare fraud and abuse detection product, hereafter sometimes called "Spyder" or "Spyder Analysis WebStation." In the case of Spyder, the Data Source 110 contains healthcare claims, provider data, patient demographics and other supporting data. A typical Data Source might contain data for 100,000 providers, 2 million recipients, and several hundred million claim details (where there is one detail for every medical service claimed). The scope of this data further evidences the usefulness of the WebStation for mining the data through the report tree and other features.

In this embodiment, the Dection System 120 assigns a fraud-risk score to each "entity" (provider, patient, etc.), and generates explanatory reasons for each score. Here, the Summarized Data Generator 130 builds a set of data tables that summarize provider, patient and peer-group activity. (Peer groups are populations of entities that are expected to have similar activity patterns. For example, a provider peer group might contain providers who have the same medical specialty and who deliver services in the same general geographic location.)

Spyder's WebStation Database 140 contains the fraud-risk scores and associated reasons for all scored entities, summarized data, WebStation 150 user information (passwords and security information, for example), case-management information (case status and tracking information, for example), and supporting tables, such as tables to associate text descriptions with medical procedure (CPT) codes, diagnosis codes, zip codes and other similar "look-up" data.

In this embodiment's operation, end-users operate a Spyder Analysis WebStation 150 by starting the web-browser on their desktop, navigating to a Spyder URL, and logging in via Spyder's login page. Once logged in, the user navigates from page to page via hyperlinks, as with any web site. Further details of the operation of the Spyder Analysis WebStation are described in Section IV. Spyder is used as a concrete example of the one possible implementation of a WebStation 150. Other examples where the WebStation could be deployed include worker's compensation claimant fraud detection, worker's compensation employer fraud detection, credit-card fraud detection, credit-card profitability and risk prediction, worker's compensation care management triage, healthcare outcomes prediction or any other predictive task.

II. A Deployed Predictive Solution Using a Webstation

Figure 2:
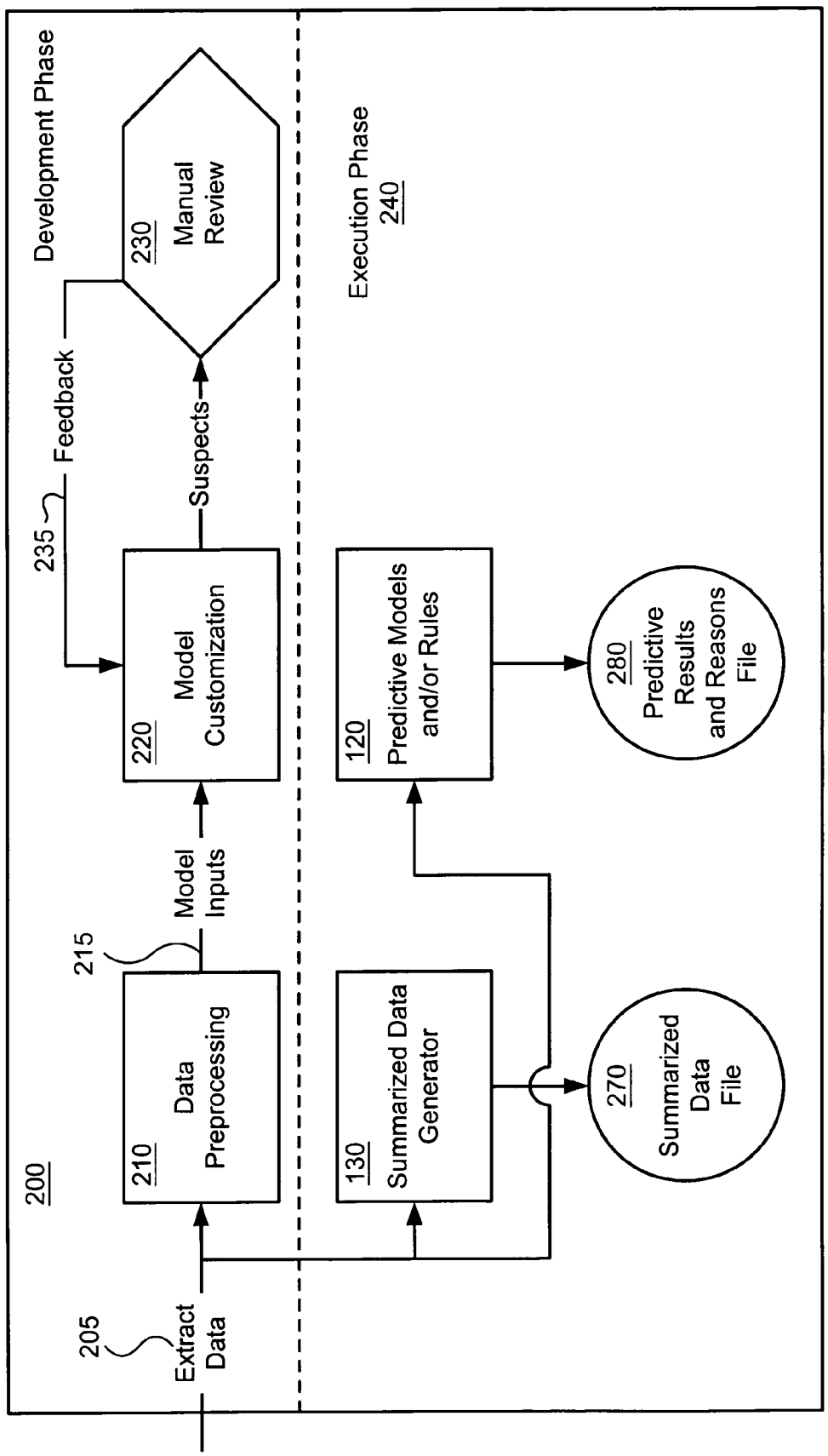
FIG. 2 is an illustration of the development and execution phases of a predictive model system.

Referring now to FIG. 2, there are shown the two phases in which the Webstation is used, Development 200 and Execution 240. The Development Phase 200 begins with the loading of data extracts 205 onto a hardware platform, into the Data Source 110. The Data Preprocessing 210 step transforms the raw data (claims and supporting data, for Spyder) into behavioral profiles (e.g., of providers, patients and other entities for a Spyder-type embodiment). In one preferred embodiment, the preprocessing is performed using the methods described in co-pending application "Cascaded Profiles for Multiple Interacting Entities," Ser. No. 09/606,575, which is incorporated by reference herein. These profiles are the source of model inputs 215. The Development process continues with the execution of the current model 220, generation of suspects 236 and gathering 230 of feedback 235 (assessing the quality of high-scoring suspects). This feedback 235 drives the tuning of the model to ensure that it operates optimally in the customer environment.

In the Execution 240 (or Deployment) Phase, data extracts 205 (incremental feeds of new claims and supporting data, for Spyder) are fed to the Detection System 120 where behavioral profiles are computed and the predictive models and/or rules are executed to generate predictive outputs (for Spyder, these are fraud risk scores for each provider and explanatory reasons for each scored provider). The scores and reasons 280 are packaged into a file for loading into the WebStation Database 140.

Data extracts 205 also feed into Summarized Data Generator 130 process that computes all of the summary information required to support WebStation operation by end users. The summarized data 270 is also packaged into a file for loading into the WebStation Database 140.

Figure 3:
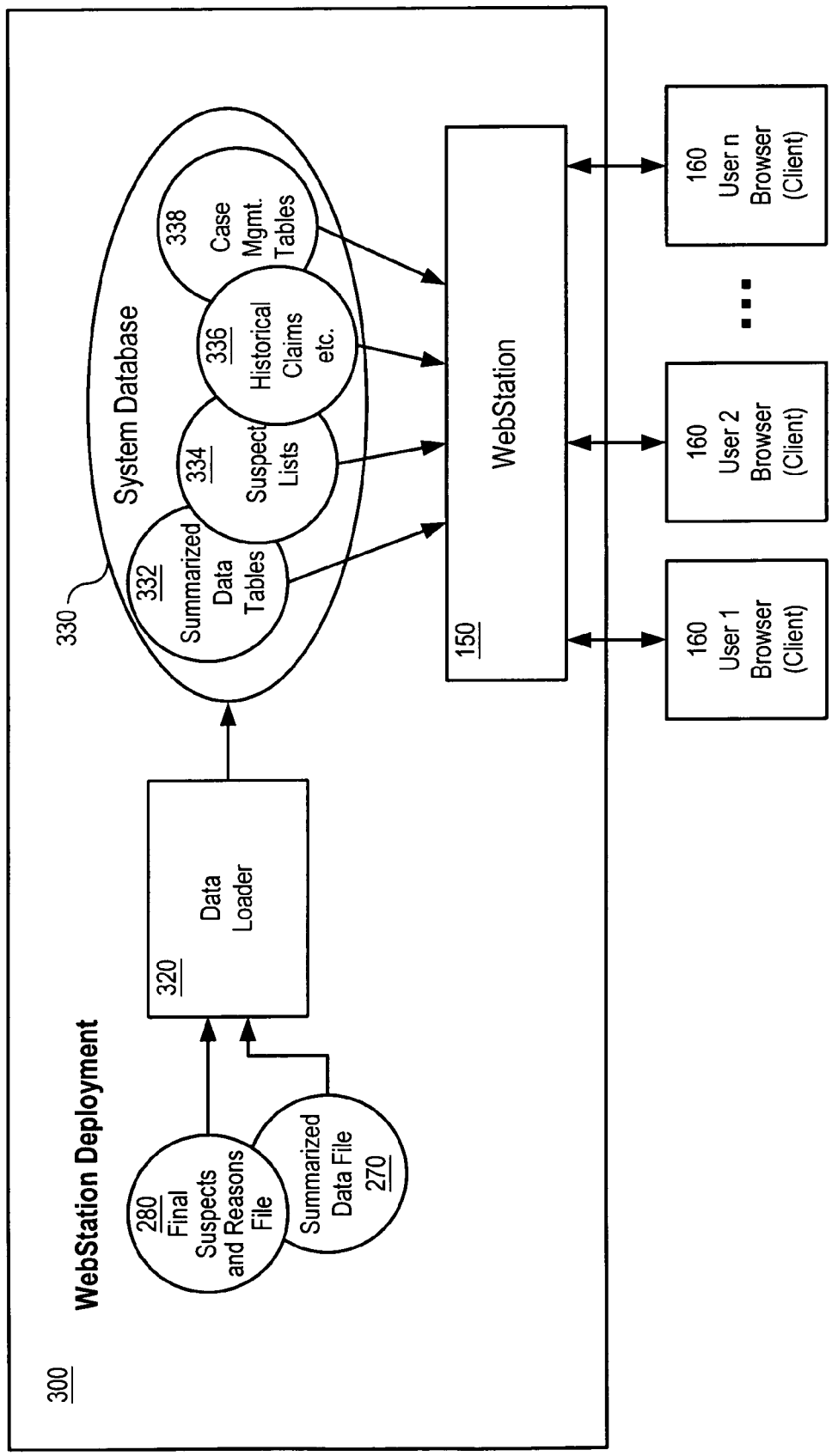
FIG. 3 is an illustration of the deployment environment for a WebStation.

Referring now to FIG. 3, on the WebStation deployment platform 300, the suspects scores and reasons 280 as well as the summarized data 270 are loaded into the System Database 330 via the Data Loader process 320. (The System Database 330 refers to all data sources that are accessed by the WebStation 150. This may be one physical database or several different physical databases, each containing some of the data required by the WebStation 150.) The WebStation Server process 150 stands between end users and the System Database 330, accessing and delivering data to meet each user's requests. Users operate the WebStation through a web browser 160 installed on their desktop.

The WebStation 150 for a particular predictive application (for example the Spyder Analysis WebStation) is a software application that is built by a partly automated and partly manual process. The automated part is done by the WebStation Builder process 195, which reads a WebStation Configuration File 190 and generates some of the WebStation software. Section VIII, "WebStation Configuration File" provides a description of this process. Manual software development then completes the specific WebStation software for each particular predictive application.

III. Overview of WebStation Features

The WebStation 150 includes various innovations:

1. Directed analysis of predictive results using the Reason-Driven Report Tree.

2. The WebStation frame-layout for simplified presentation of data and navigation.

3. Integrated case management functionality.

Reason-Driven Report Tree

Figure 4:
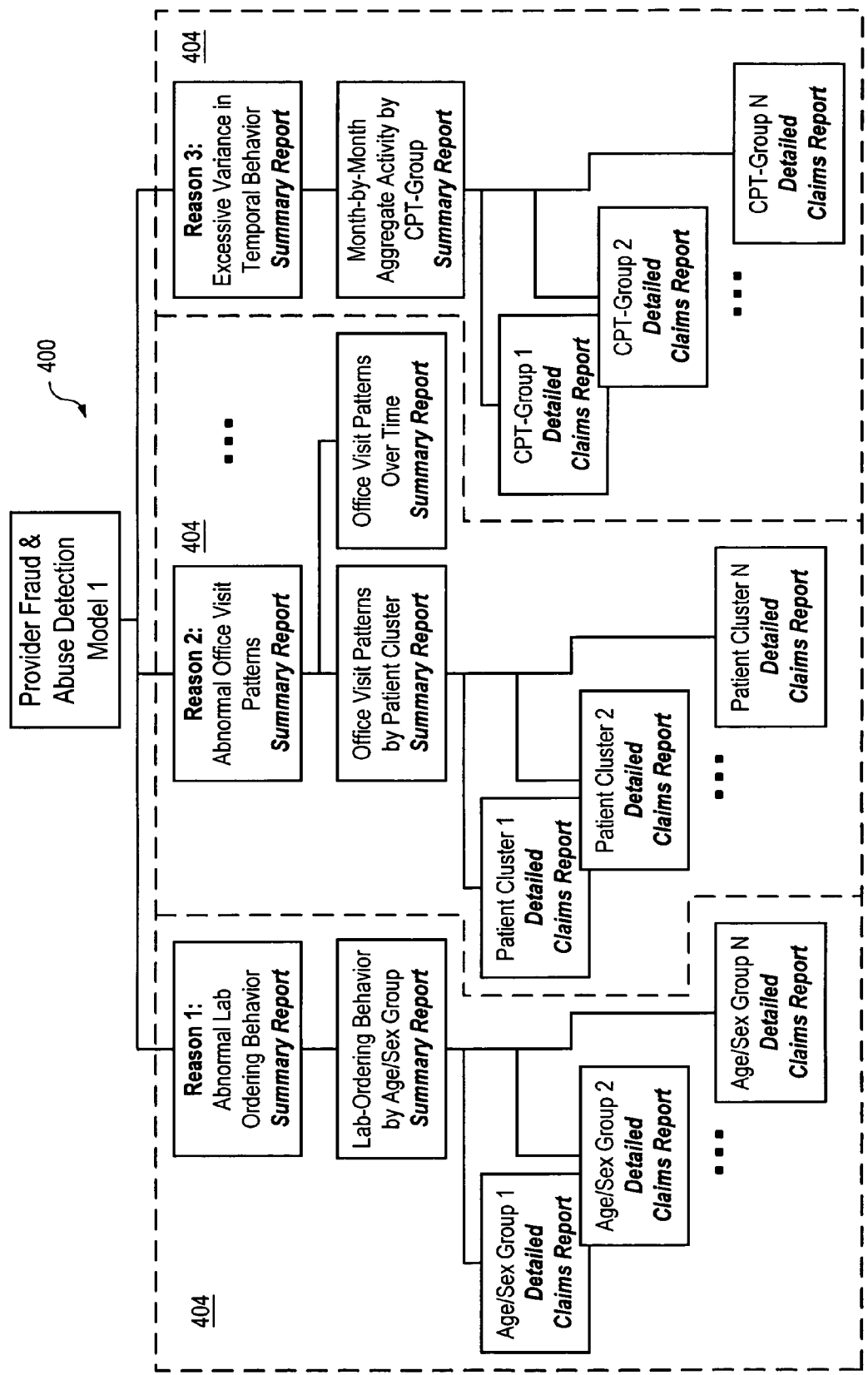
FIG. 4 is an example of a report tree.

The WebStation 150 is designed to enable users with minimal computer training to view, understand, and act on predictive results. To this end, each Predictive Model 121 has a Reason-Driven Report Tree (Report Tree). The Report Tree is a collection of reports, which are graphical and/or tabular views into the data contained in the System Database. The reports are organized into a tree, with high-level summarized data near the root, and detailed or "raw" data at the leaves. FIG. 4 shows a sample Report Tree 400 for a detection model.

For example, for a Spyder-type Predictive Model 121, the Report Tree 400 for a model or rule begins with the Suspect List 402—this is the "root" of the tree. Emanating from the root, for each suspect there is one branch 404 for each reason (reasons are explanations of predictive results) the suspect is included in the Suspect List. Along each reason's branch, there is a high-level summary report that displays data in tabular and/or graphical form displaying information related to that reason. These reports are preferably pre-defined (and may be pre-computed and stored as separate tables in the Database 140). For example, one possible reason for a Spyder model is that the suspect provider delivers an unusual mix of procedures relative to his peers. The high-level report for that reason (the Procedure Mix Report) displays, for each major group of procedures, the amount of activity that the suspect delivers in that group and the amount delivered by his peers.

From each report in the Report Tree, the user can follow links (e.g. through hyperlinked buttons or other user interface elements) to more detailed reports (moving from the root toward the leaves of the Report Tree). For example, in the Spyder Analysis WebStation, the user can link from the Procedure Mix Report to a Distribution Chart for any of the major procedure groups. The user can also link from the Procedure Mix Report to the Patient Summary Table (a table with one row per patient that the suspect provider has treated, summarizing each different patient's past activity). From the Patient Summary Table, the user can link to the Patient Claim Detail Table (which shows the actual procedures delivered for that patient).

The WebStation allows users to "move around" on the Report Tree, navigating out to the leaves (most detailed reports) and then going back to the same or different high-level summary reports (closer to the root). The reports in the Report Tree are pre-defined, but the user can modify them through a variety of actions including changing the sort order of data in tables, filtering (executing a sub-query) the data in a table, changing the peer group for data shown in peer-comparison tables and other similar actions.

Each Report Tree 400 has an associated Table Tree in the Database 140, listing the table included in each report node. Preferably, each table contains pre-computed results and each node in the Report Tree maps to a single table in the Database.

The Report Tree 400 allows users to easily follow a logical path of reports to develop a deeper understanding of the predictive results. For example, for a Spyder-type environment, the Report Tree 400 helps users review each identified suspect provider without a detailed knowledge of the specific reports that are available. More generally, for each predictive model, this path is defined by the most important score-reasons identified for inclusion of a suspect. The reasons determine which part of the tree 400 the user will explore. Along each branch the user is presented with clearly identified links to other summaries or detail raw data. Although the Report Tree 400 defines a default sequence of reports for review, the WebStation allows users (who are familiar with the reports that are available) to view any report at any time. Section V below, "Report Tree Example" provides a detailed illustration of an actual Report Tree for one of Spyder's predictive models. In addition, Section IV, "Spyder Analysis WebStation: A Quick Introduction" also describes a report tree usage in detail.

The same Report Tree concept applies to rules when these are used. There is one Report Tree for each detection rule. The content of the reports depends upon the specific content area being analyzed (e.g. fraud and abuse scams) that the rules are designed to detect. Because rules typically target specific in the lowest level data (e.g., claims), the Report Trees for rules typically contain fewer levels than those for models. The user will typically see one summary report followed by a listing of detailed claims that caused the rule to fire.

WebStation Frame Layout

Figure 26:
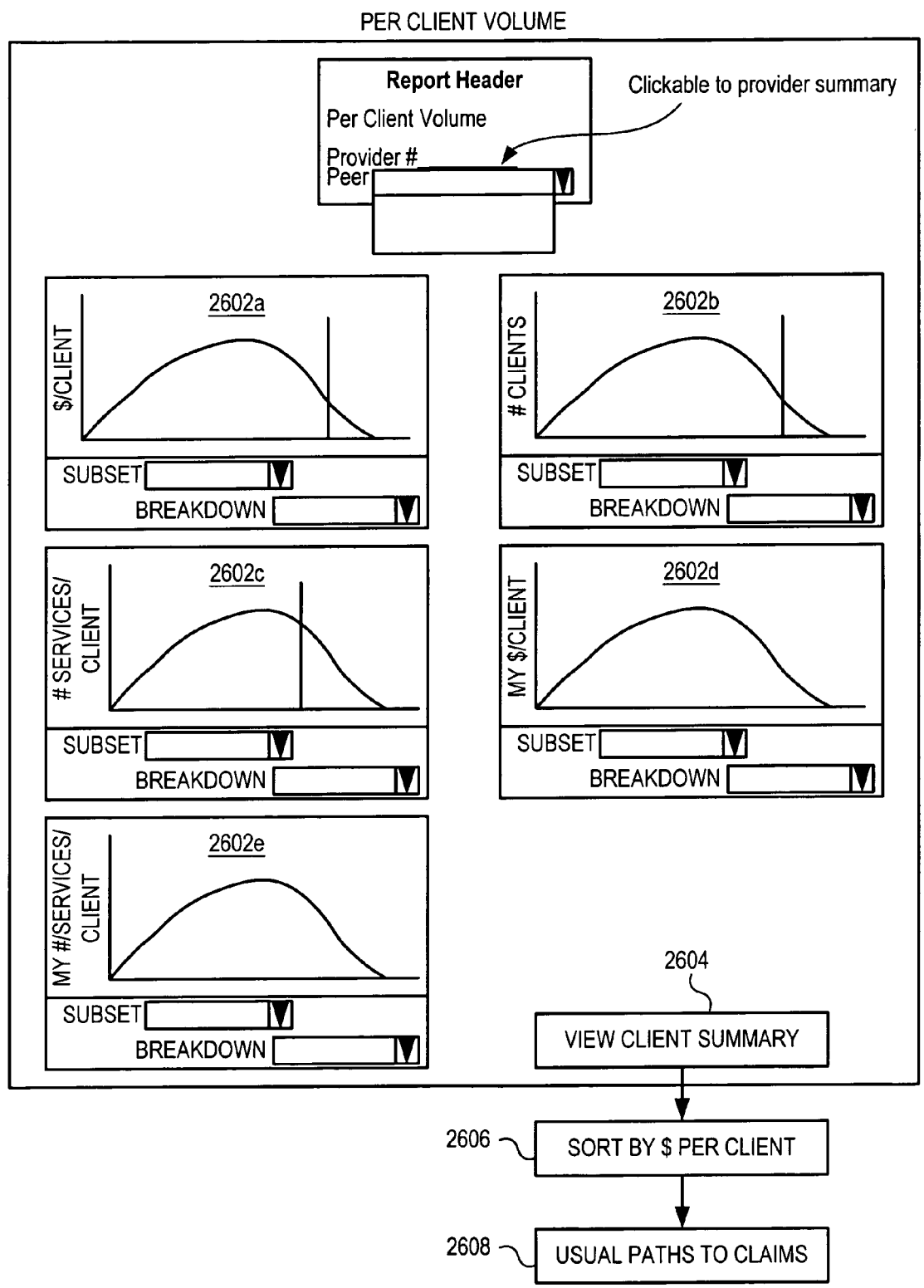
FIG. 26 illustrates the Per Client Volume report.
Figure 27:
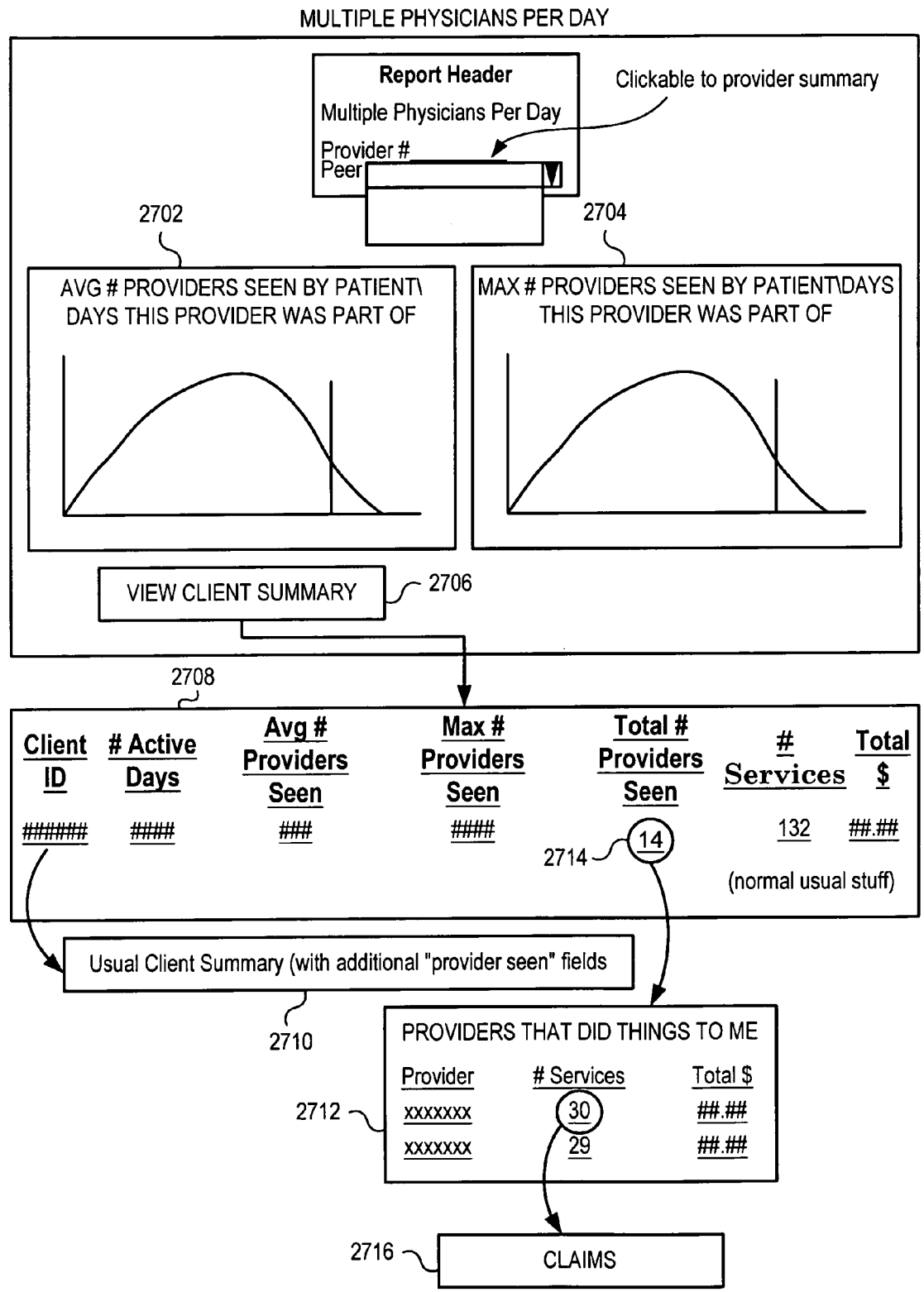
FIG. 27 illustrates the Multiple Physicians Per Day report.

Viewing data is a central function of the WebStation. It is desirable to present data in a clear, easy to understand and consistent format. To this end, the WebStation follows a specific frame-based layout, with each frame displaying a specific type of information, and enabling users to perform a specific set of functions. ("Frame" is a web browser term with a specific technical definition in the HTML standards. To the user, a frame is a region on the screen, usually rectangular in shape with a clearly shown boundary that their browser treats as a separate region for control, viewing, printing and other functions.) The WebStation frame layout is designed to make operation of interface easy and intuitive. When presenting data within the WebStation, three frames are presented and preferably always occupy the same location on-screen. FIG. 26 illustrates the frame layout.

The Main Menu Frame 502 provides a quick way for users to move from one part of the user-interface to another. Using the Main Menu Frame 502 the user can move directly to any of the main screens of the user interface. The contents that appear in the Main Menu Frame do not change as the user moves about the interface. The Main Menu Frame appears at the top of the browser window 500.

The Context Menu Frame 508 provides functions that make sense given what the user is currently viewing on-screen. For example, when a data table is visible in the Display Frame 504, the Context Menu Frame displays functions like sorting, filtering and changing the table layout. The Context Menu Frame appears (only when needed) at the far left hand side of the browser window.

The Display Frame 504 presents information. It is the largest frame, occupying most of the screen. What is shown in the Display Frame depends upon the function that the user is working to accomplish. Sometimes the data frame shows a table of data, sometimes it shows a graphical report, sometimes it shows a form for the user to fill-in and submit. Readability is the primary objective, so special consideration is given to color, font, spacing shading and other graphical methods that make viewing data easier.

The Display Frame shows data from a single database table (thus corresponding to a single report in the Report Tree). The way the data looks on-screen is specified by the Display Type. There are three possible display types (though others may be added as desired):

Data Grid: Shows data in tabular form.

Figure 6A:
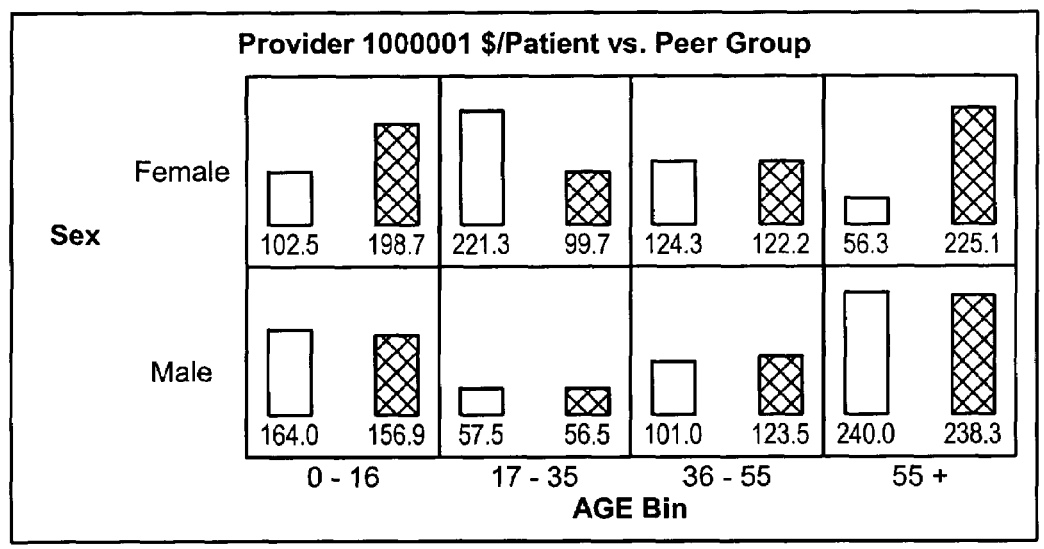
FIG. 6a is an illustration of a sample 2-By Peer chart layout

2-By Peer Chart: Shows data as a table of bar-charts comparing individual vs. peer values. The table is defined by up to two "by" variables (such as patient age and sex). FIG. 6a illustrates a sample 2-By Peer Chart.

Figure 6B:
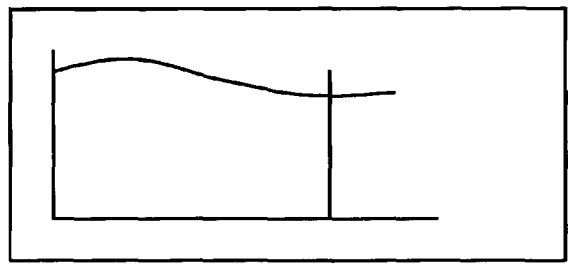
FIG. 6b is an illustration of a distribution plot.
Figure 7:
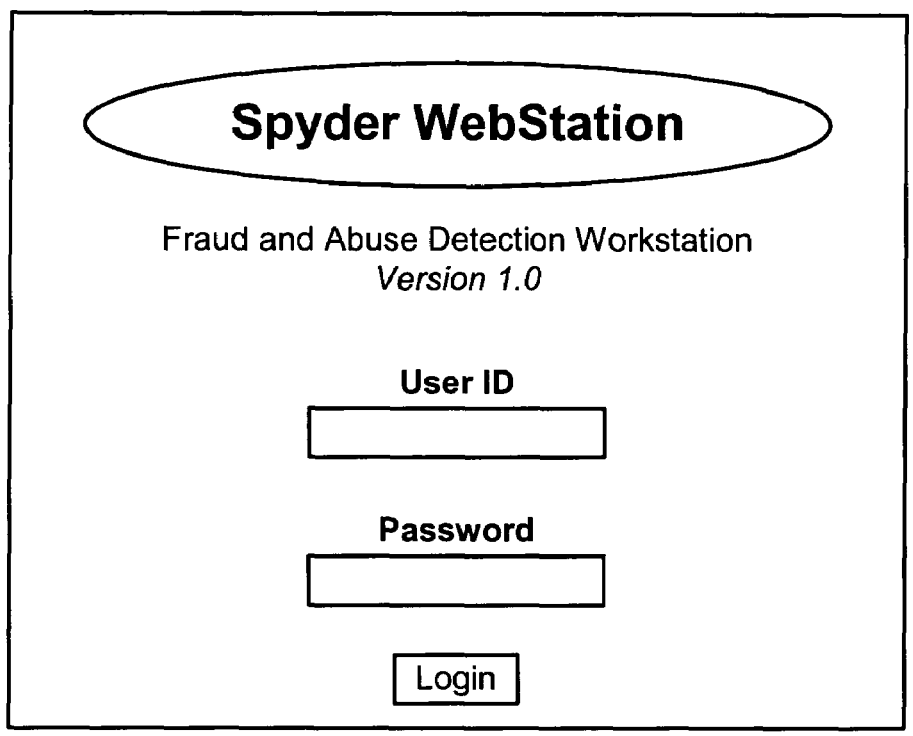
FIG. 7 is a logon screen.

Distribution Plot: Shows the histogram (bar-chart) for a variable across the individual's peer-population, with a vertical line indicating where the individual falls in the distribution. FIG. 6b illustrates a sample distribution plot.

The Report Tree Navigation Frame 510 shows a recent history of the user's path within the Report Tree 400. The Report Tree Navigation Frame appears only when the user is viewing reports in the Report Tree. Icons 512 appear in this frame representing previously viewed reports in the Report Tree 400. By clicking on any of these icons, the user will go immediately to the associated report in the Report Tree. The Report Tree Navigation Frame is a very narrow frame that appears at the bottom of the browser window.

WebStation Integration with Case-Management

The WebStation can be deployed with or without case management functionality. Case management refers to the set of functions required to create, update, understand and track cases. Depending upon the specific predictive application, investigation of a case can span a range of activities from desk-audit (looking more closely at the data relevant to a specific predictive result) to field-investigation (which, for some applications, may include under-cover work, interviews, surveillance etc.).

A "case" refers to a suspect that has been deemed appropriate for further review or investigation. This review typically starts out as an internal analysis of the suspect's behavior, but may at some point involve external organizations or become a legal case in a court of law. A case always has a status (open, under investigation, closed as valid, closed as fraud, etc.). A case is created when an identified suspect is first "locked" by an authorized user. Over its lifetime a case may be worked by many different users, but at any given instant, only one user can lock the case. At that instant, case-management functions (changing case status, attaching comments etc.) can only be performed by a user that has locked the case. When a case is locked it is viewable by other users but cannot be locked by another user until it is released by the first user. Each case has a unique Case Id that serves as a label for the case as long as the case is stored in the system.

The WebStation allows case management functions to be included "seamlessly" (to the user, it looks like case-management functions are built-into the WebStation). The WebStation Main Menu Frame 502 can include case-management functions (such as "Assign Case" and "Goto Case") and the WebStation knows when a user is in a context to perform these functions. Once the user navigates to a case, they may modify it if they have the proper authorization to do so. The WebStation guarantees that multiple users cannot modify a case at the same time.

The Case Management Module preferably provides this integration. The Case Management module tracks a variety of information about each case, including reviewer comments, action notes and status changes. Because all case related information is time-stamped the complete history of each case can be reconstructed (who reviewed the case, when they reviewed it, what they thought about the suspect, actions they took and the status they assigned to the suspect).

Each case has an associated collection of fraud-risk assessments (one or more model scores and/or query results), summary reports, user comments and status updates that relate to the "entity" that has been identified as a suspect for fraud, abuse or waste. There are many different entities whose behavior may be analyzed by the Detection System 120. These include providers, recipients, licensees and provider groups. Every case relates to some specific entity.

The Case Management module 180 provides functionality to:

Manage Cases: Allow authorized users to view, open, update, track, save and close cases Assign Cases Allow Management users to control who can access and review a case Generate Management Reports: Allow Management users to generate reports to understand current case-load, status, program effectiveness, investigator effectiveness etc.

In order to provide security and access control it is useful to define several different user types:

Management users are authorized to perform all functions. This includes user-management, management reporting, assigning cases to users, viewing all detection results and reports and all case management functions.

Internal users are authorized to perform all viewing and case-management functions.

Internal Limited users are allowed to perform all viewing and case-management functions for only those entities (providers, recipients etc.) that appear in their access list.

External users are authorized to perform all viewing functions.

External Limited users are authorized to perform viewing functions for only those entities (providers, recipients etc.) that appear in their access list.

The Case Management Module 180 further provides functional related to the management of queues. A queue is a list of suspects. A queue is defined by a set of entry criteria (conditions that have to be met in order for a suspect to be included in the queue).

A queue can serve many different purposes. For example, a queue may be defined to include suspects from a limited geographic region. Then, a Management user can assign a user to the queue so that investigative work that requires travel to the same region is handled by the same investigator. Similarly, queues can be defined to distribute work across the available staff based upon medical specialty, type of fraud scheme, case status or other criteria.

In addition to distributing review work, queues can be used to implement and track specific fraud and abuse strategies. For example, a queue could be defined to focus on fraud and abuse for high-volume providers. Such a queue would have two criteria, (fraud-risk score>X AND dollar-volume>Y). Using the Case Management module, Management users define new queues, and modify existing ones.

An entity is a logical unit that can be characterized by looking at a collection of related data items. Examples of entities include providers, recipients, licensees, provider groups, provider-provider pairs (linked through referrals, for example) and provider-recipient pairs. The behavior of each of these entities can be captured by looking at different "slices" of the historical claims data. An entity may be the focus of a fraud detection model or may simply be used to help understand the behavior of another entity (for example, looking at the behavior of the patients a provider has treated in order to better understand the behavior of the provider).

The target of a detection model or rule is the entity whose fraud risk is being assessed. For example, a model may generate a fraud score for a provider, a provider-group, a licensee, a recipient or any of a number of other "entities". When reviewing results, it is important to know precisely what the target is. Similarly, each detection rule searches for patterns of activity that relate to a specific entity.

Case-management functions are described in Section VII, "Case Management Module Software", along with illustrative aspects of the case management user interface. Additional case-management concepts (such as the Web Casebook) are described in Section VI, "WebStation Functional Description." The seamless integration of case management functions is shown in the screenshots described in Section IV, "Spyder Analysis WebStation: A Quick Introduction".

IV. Spyder Analysis Workstation: A Quick Introduction

This section provides a quick introduction to the Spyder Analysis WebStation embodiment of the present invention. This embodiment focuses on using the features of a WebStation in a predictive solution for analyzing healthcare fraud and abuse; other applications of the WebStation are certainly possible. The goal is to illustrate the basic functionality and show how a WebStation embodiment can be used to review suspects identified by the Detection System 120.

A Browser-Based Approach to Viewing and Analyzing Detection Results

The WebStation is a browser-based application, as such it requires no desk-top software installation beyond a conventional browser, such as Netscape Navigator (version 4.x or higher) or Internet Explorer (version 4.x or higher). Users who access the Internet via one of these browsers should find operating a WebStation 150 fairly intuitive. Like web sites on the Internet, the WebStation 150 uses links on one page to get to other pages. In the WebStation 150, these pages contain information about suspects identified by the Detection System 120, which the Spyder embodiment are models and rules pertaining to healthcare fraud and abuse.

The WebStation 150 is designed to help users take the first step in analyzing detection results. Users may or may not be able to pinpoint the specific claims that are inappropriate, abusive or fraudulent, but they should be able to determine whether or not more detailed investigative work is required, or if there is a valid explanation for the suspect's activity. To accomplish this, the WebStation 150 presents suspect lists, and enables users to view a wide array of summary reports describing the suspect. These reports provide insight into the suspect's activity at many different levels of granularity, from high-level summary to claim line-item detail. The claims data, suspect-lists and summary reports that the WebStation presents on-screen are housed in a database 140.

A Sample WebStation Session

User Log-on

Referring now to FIGS. 7-16, there is shown a sample user session with an embodiment of the WebStation. A WebStation session begins when the user logs on. The logon page (FIG. 7) is the first page presented and requires users to enter their user-ID and password. Each WebStation user has an assigned access-level that determines which functions they can and cannot perform. For example, only a Management-Level user can assign cases to other users, add new users to the system or change the access-level of an existing user.

Primary Detection Page

The first page (FIG. 8) that WebStation users see is the primary detection page 800 (sometimes referred to as the "home" page) which lists the detection models 810 and rules 820 that have produced a list of fraud and abuse suspects. Because Spyder suspects can be providers, patients or other "entities," the predictive models 815 and rules 830 are organized by the type of "entity" they detect.

A color-coded bar at the far left of the screen ("Provider Detection" 840) indicates the type of suspect (here "providers") that is being assessed by the detection models and rules. When the user selects the "Description" button 850, a text description of the model or rule is shown. (Rules for patients and other entities are not shown in this example.)

Figure 5:
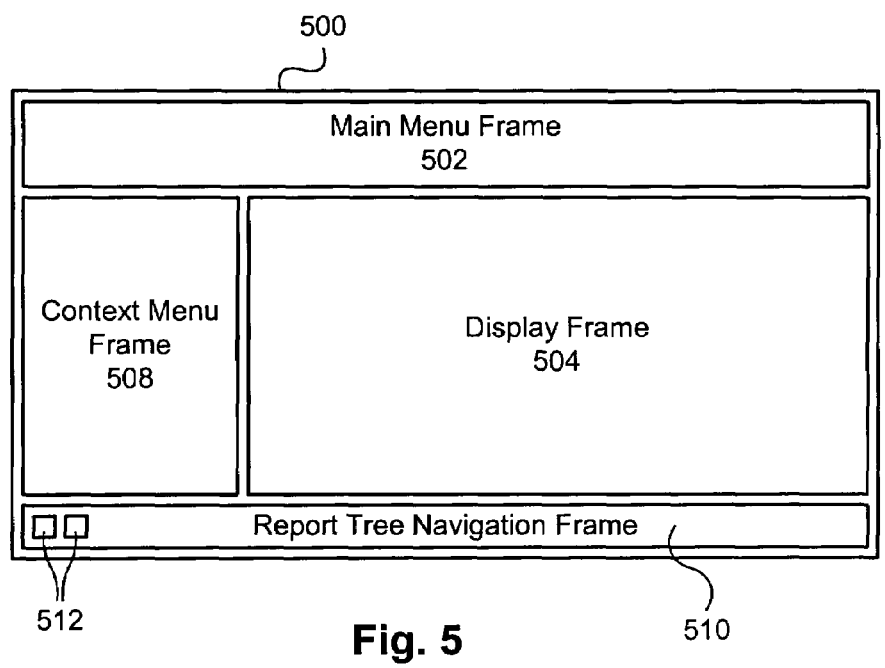
FIG. 5 is a schematic illustration of the report frame layout for the user interface of the WebStation.

The WebStation presents information in "frames." When a user looks at a screen, they will typically be looking at several different frames as described above with respect to FIG. 5. The screen shown in FIG. 8 includes two frames, one (the Display Frame 504) shows the lists of available models and rules, the other (the Main Menu Frame 502) appears as a set of "tabs" 860 at the top of the screen. The WebStation shows these same tabs on all subsequent screens. These tabs operate like a "main menu" allowing users to select the major functions that the WebStation provides, no matter where they currently are within the WebStation.

The WebStation's "main menu" functions include:

| Menu Tab | Function Description |
| --- | --- |
| Home 870 | Enables users to quickly return to the "home" page that lists detection models and rules. |
| Assign-Case 872 | Allows Management users to open a case for a given suspect and assign it to a user or group of users. |

-continued

| Menu Tab | Function Description |
| --- | --- |
| Search 874 | Allows users to search for individuals by entering identity information (ID number, first name, last name, etc.) for specific "entities" (providers, patients etc.). The result is a list of entities that "match" the search criteria. The user can then view summary data for that entity. |
| Maintain Users 876 | Allows Management users to add new users and change properties for existing users (such as access level). |
| Reports 878 | Allows users to view specific reports by selecting the report from a list of reports. |
| Go To Case 880 | Allows users to view a case for the suspect currently shown on-screen. The suspect currently being viewed must have a case opened and the user must have permission to view the specific case. |
| Log-off 882 | Logs the current user off and allows a new user to log on. |
| Options 884 | Allows users to perform secondary functions such as changing their password, defining the colors and fonts to be used in the interface, etc. |
| Help 886 | Opens a separate browser window that provides a help facility. |
| Resources 888 | Displays internet links to helpful healthcare fraud and abuse sites. |

The Suspect List is the "Root" of Spyder's Report Tree

There is one suspect list for each predictive model 815 or rule 830. This suspect list forms the "root" of a reason-based report tree, such as illustrated in FIG. 4. As the name suggests, this is a collection of reports, organized into a tree. The suspect list is the root, then, for each category of explanatory reason, there is a different branch.

The first report along each branch is a high-level summary that presents an overview of activity related to that branch's reason category. As the user moves down the branch, they can select specific reports to view. The reports near the root are high-level summaries, while the reports near the end of the branches (the "leaves") are very detailed, usually showing detailed claims.

Users view a specific suspect list by selecting the name of the model 815 or rule 830 from the WebStation "home" page 800.

FIG. 9 illustrates a sample suspect list 900 which would be the root of report tree. The suspect list 900 shown in FIG. 9 includes:

Suspect-Id 902 (for this model, suspects are providers)

Score 904 (the higher the number, the greater the fraud risk)

Score-Date 906 (indicating when the model was executed)

Rank 908 (1 is the highest-scoring provider)

The suspect's total dollars paid 910

The suspect's number of claim details 912

The suspect's number of patients 914

A set of explanatory reasons 916 (which indicate why the model produced the score that it did for each provider). The reasons are ordered based upon relative importance to the score Notice that two additional frames appear. The Context Menu frame 508 on the far left, and the Report Tree Navigation Frame 510 at the bottom of the screen. The Context Menu frame 508 enables users to perform a variety of useful functions on the data that appears in the Suspect List. These same functions are available any time the WebStation displays data in tabular form. A closer look at these functions is made later;

this section describes how a user can select a suspect to look at, and then drill-down from high-level summary to claims detail for that suspect.

As previously mentioned, the Report Tree Navigator frame 510 at the bottom of the screen displays small icons 512 that represent the report pages that the user has visited. Notice that only one small icon appears in the sample above. This icon represents the suspect-list 900. As the user drills down into additional reports (following a branch of the report tree), additional icons will appear in this frame. If the user wants to "back up" and revisit a previous report, they can do so by clicking on the icon representing that report.

Viewing Spyder's Standard Summary Reports

Focusing again on the screen showing the suspect-list 900, if the user clicks on a specific Suspect-ID 902 (which is a Provider-ID in this example), the WebStation 150 takes the user to a standard summary for that provider. Notice that the data fields that serve as hyperlinks follow the Internet convention and are shown in color-coded, underlined text.

The Provider-ID appears on many different pages within the WebStation, but selecting the Provider-ID always takes the user to the standard summary for that Provider. FIG. 10 illustrates the format of one version of a Provider Summary page 1000. The Provider Summary 1000 includes separate blocks of information about:

- Identifying information 1002 (provider numbers, license number, name, address etc.)
- Fraud-risk results 1004 for all of the detection models and rules that apply to the provider.
- General statistics 1006 to indicate the size and type of the provider's practice
- The age/gender mix 1012 of the provider's client-base
- The mix of procedures 1014, 1016 the provider delivers User can view similar standard summaries for other entities (such as individual patients). The method for accessing these summaries, as with the Provider Summary, is by clicking on the ID for the specific entity as it appears in any data table within the interface. After viewing the Provider Summary, the user returns to the Suspect List 900 by using the "Back" button on the web browser.

If, from the Suspect List 900, the user selects a specific reason 916 for a given suspect, the WebStation 150 takes the user to the high-level summary report that captures the "essence" of that reason. Reasons serve as explanations for model fraud-risk scores. Each suspect has several reasons, which are listed in order of importance. Reasons are different for each model. The example used here is a model that detects fraud and abuse for Dental Providers.

Figure 11:
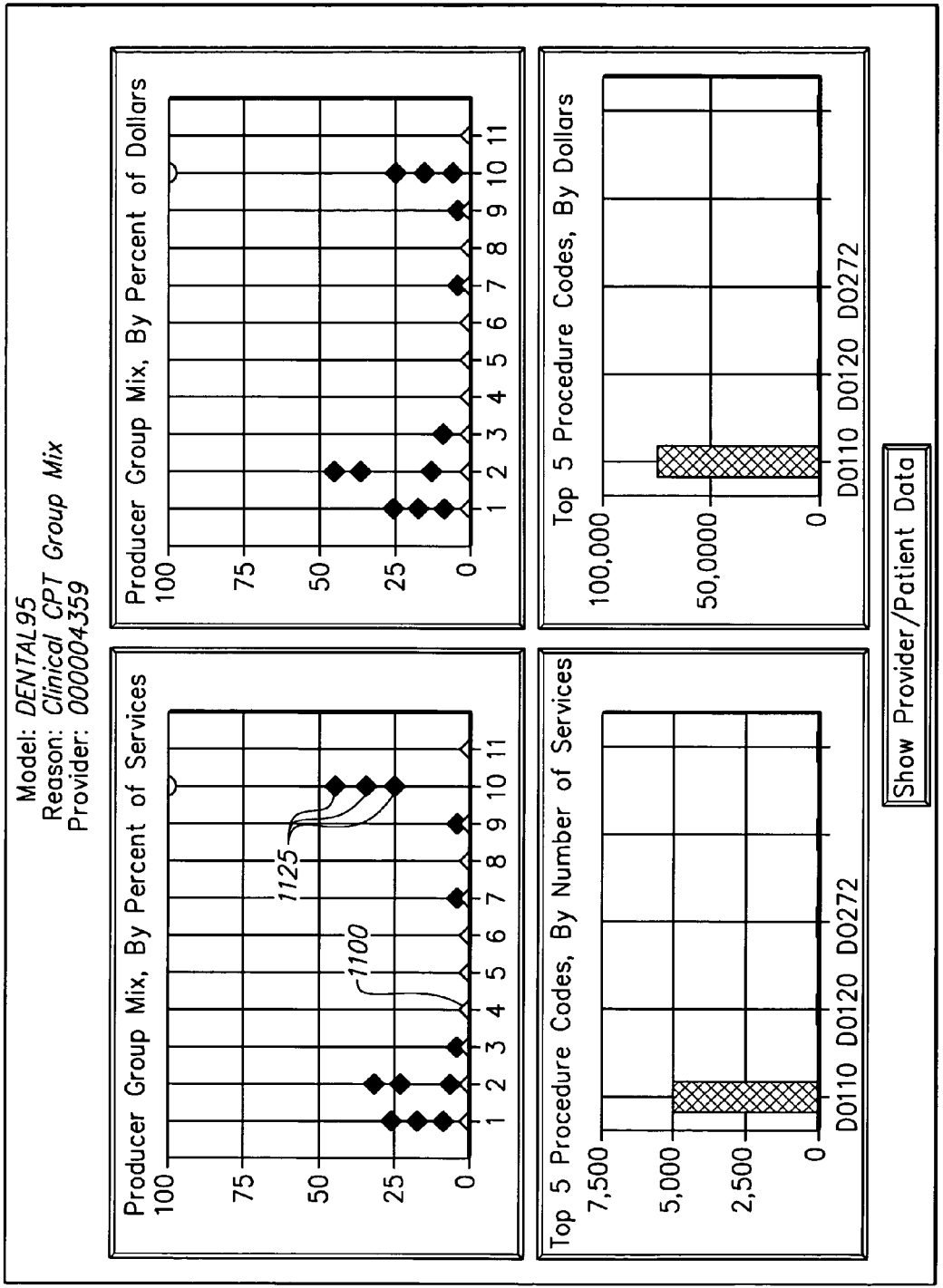
FIG. 11 is a graphical high-level summary page.

A typical detection model will have 10-20 reason categories. Each category has links to a high-level summary report from the Suspect List 900 for that model. FIG. 11 is an example of the type of high-level summary that the WebStation displays when the user selects a reason from the Suspect List.

This report is called an "Abnormal Clinical Procedure Mix" report. In this graphical report, the WebStation displays a summary (upper charts) of the provider's activity in each of 11 different clinical procedure groups. The mix across groups is shown both in terms of dollars paid and number of services. For each procedure group, the individual provider is shown as a dot 1110 (here a half-circle because of its placement on the X-axis and on the 100% line), while the provider's peers are shown as 3 diamonds 1125 (connected with a thick line). These three diamonds (which sometimes are so close together that they appear as a single diamond) represent the median (middle diamond), 25th percentile (lower diamond) and 75th percentile (upper diamond).

Where the provider dot 1110 appears with respect to the 3 peer-group diamonds 1125 tells the user where the individual falls with respect to their peer group. Thus, in a glance, the user can tell if the provider is doing more or less of a particular type of service than his peers, and can immediately see if the difference is large or small, relates to a single category of services or to several categories, etc.

The two bar charts at the bottom of the figure show the individual provider's top five CPT codes both in terms of dollars paid and number of services. By clicking on the "Show Provider/Patient data" button at the bottom of the screen, the user can proceed to the next level of detail, as illustrated in FIG. 12.

In this report 1200, there is one line 1202 per patient (it lists the patients for which the suspect provider has delivered at least one service). Each line indicates the patient's ID 1204, Age 1206 and Gender 1208, as well as specific aggregate measures of the services received by this patient (average dollars per service 1212 and total dollars 1214, and number of services 1216) both from the suspect provider and all other providers (for which there is claims data available). From this report, if the user selects (e.g. clicks on) the number of services 1210 for a patient or the patient ID, the WebStation takes the user to a list of that patient's claim details. FIG. 13 illustrates this report 1300.

Figure 8:
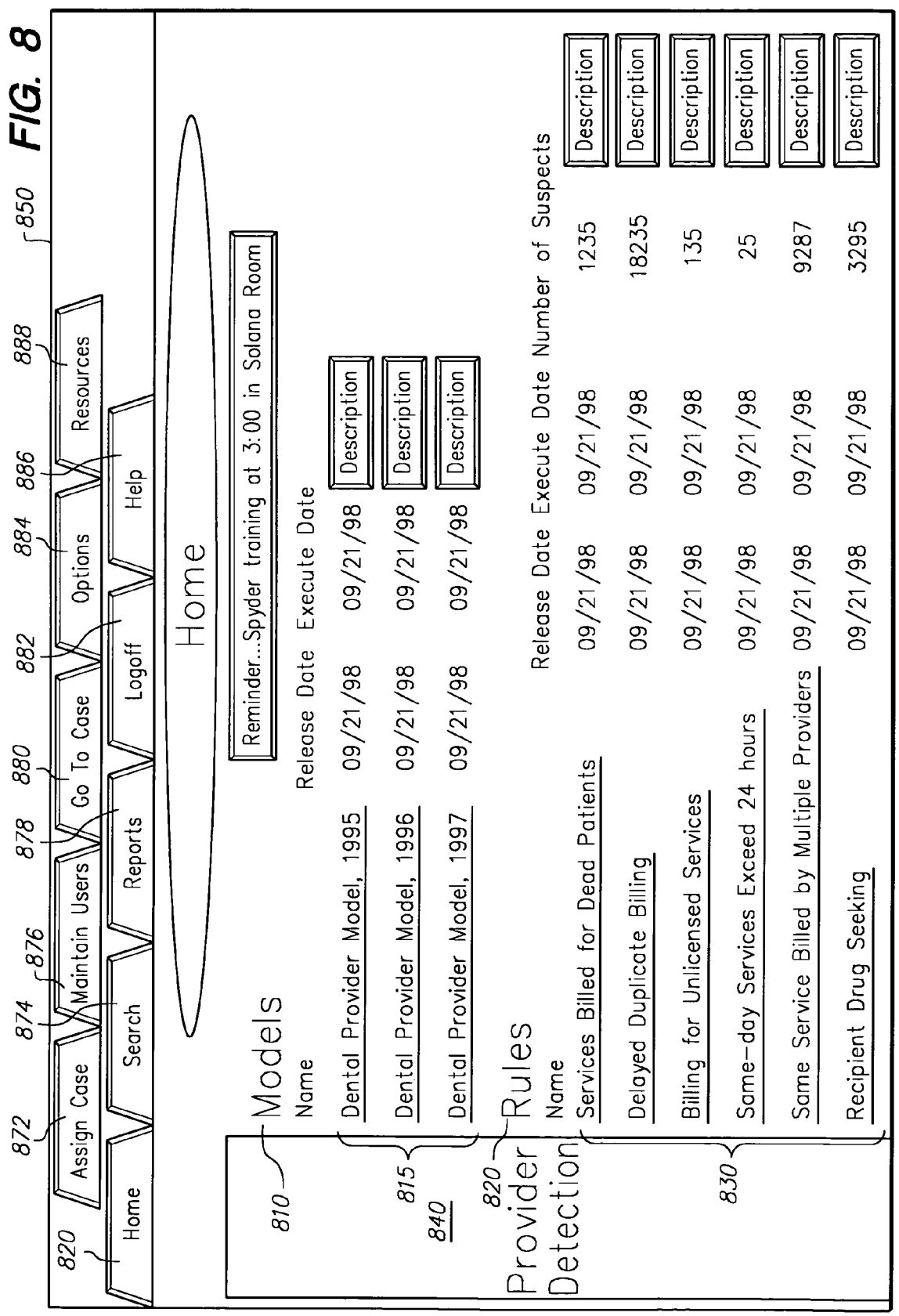
FIG. 8 is a user's home page in the WebStation.

While not shown here, the main menu tabs 870-888 as shown in FIG. 8 are preferably always shown on-screen, and the navigation icons 740 are always shown in the Report Tree Navigation frame 510 along the bottom of the screen. The list of functions (filter, sort, layout, etc.) are shown in the Context Menu frame 508 at the far left any time data is displayed in tabular form.

Figures 1, 14:
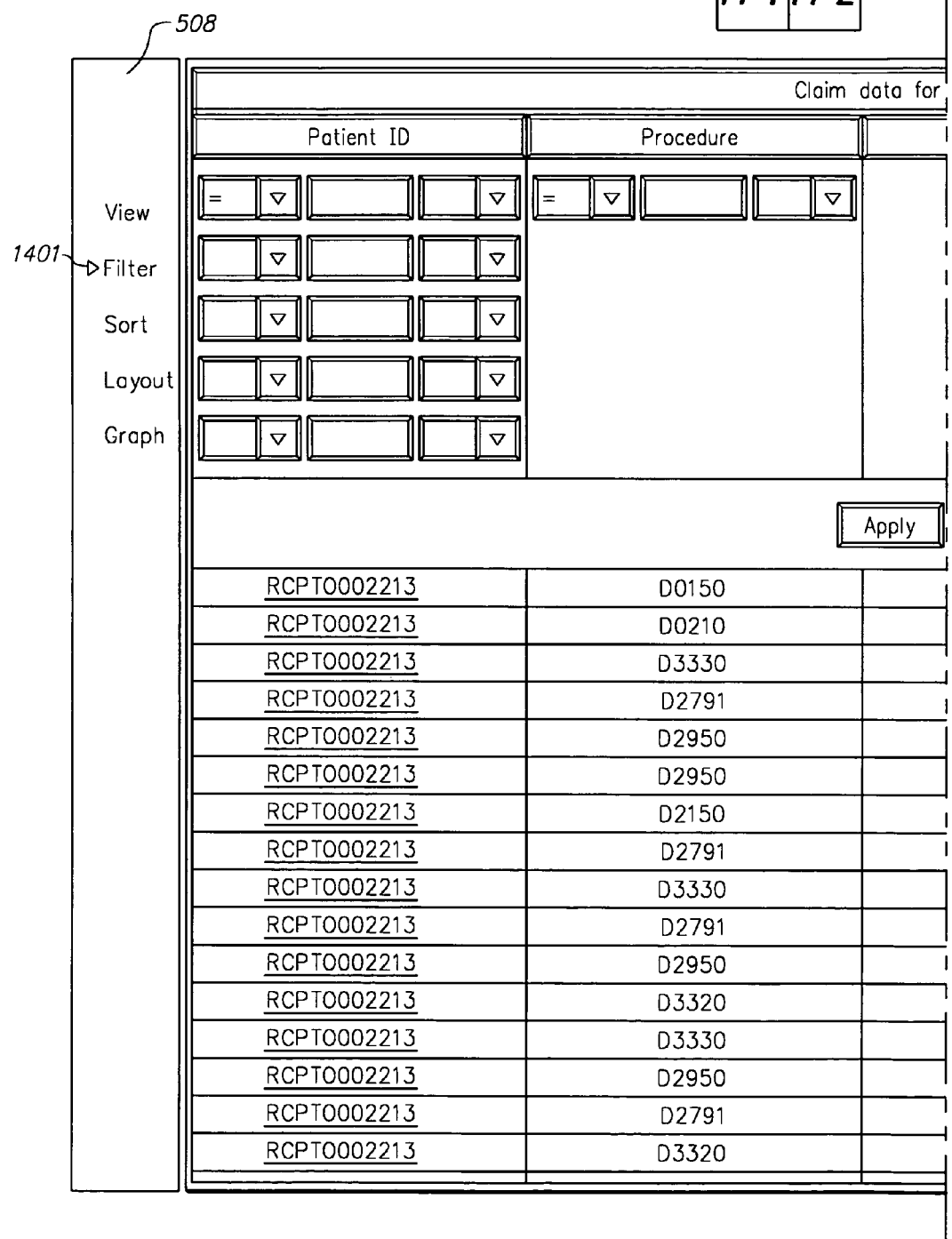
FIG. 14 shows the use of the filter function in the context of the patient specific claim data page.
Figure 16:
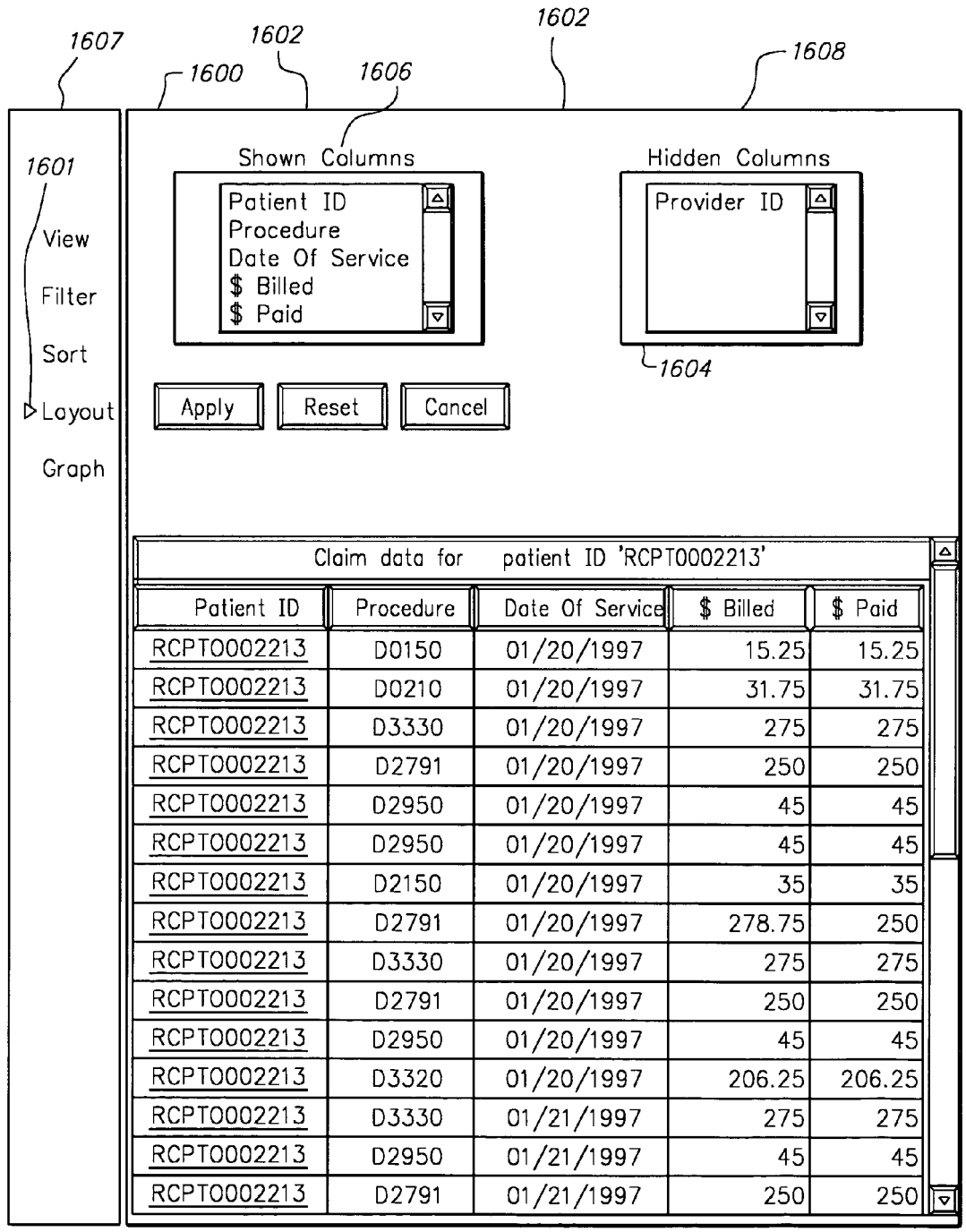
FIG. 16 illustrates the layout function in the context of the patient specific claim data page.
Figure 17:
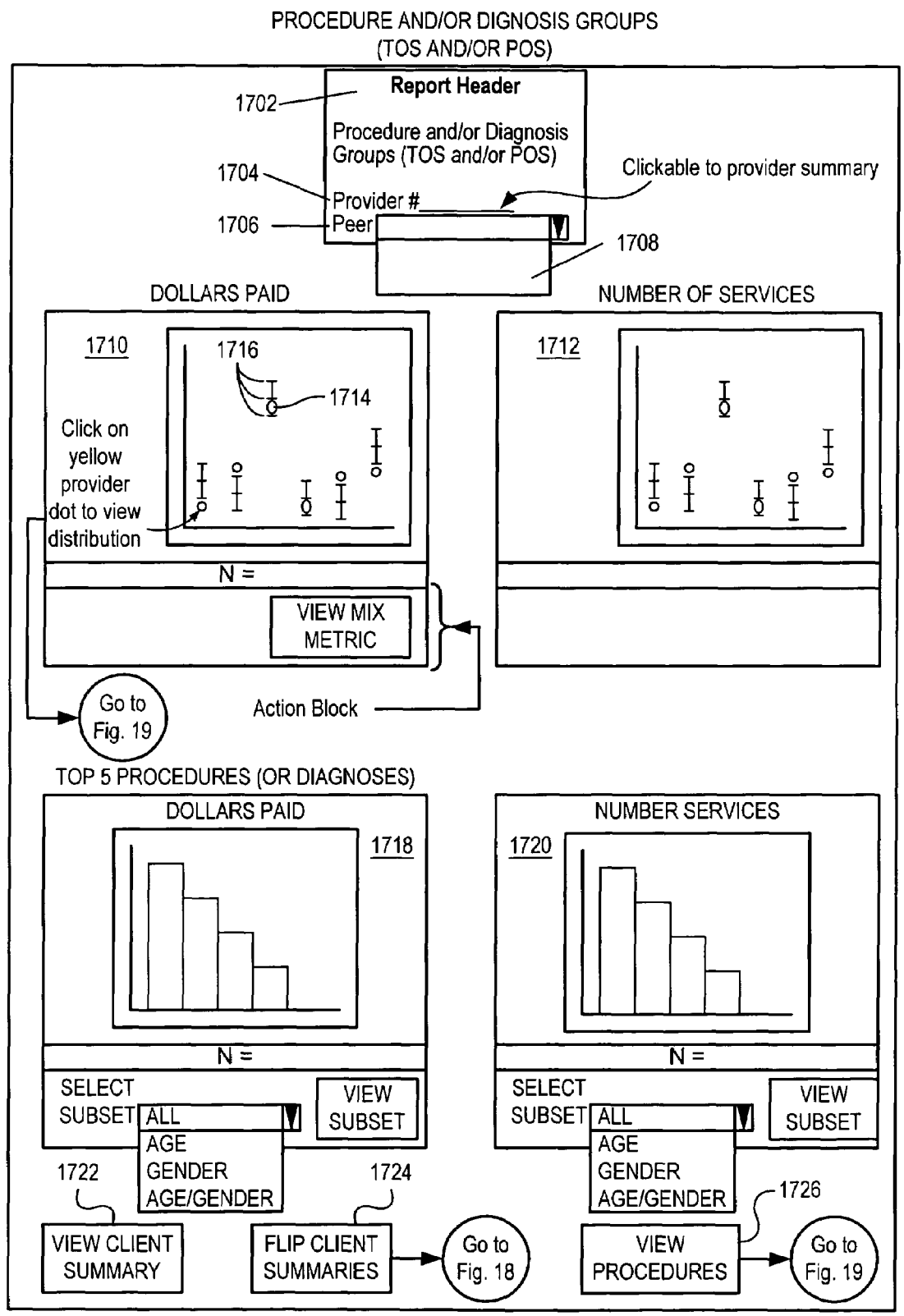
FIG. 17 illustrates the Procedure and/or Diagnosis Groups report.
Figure 18:
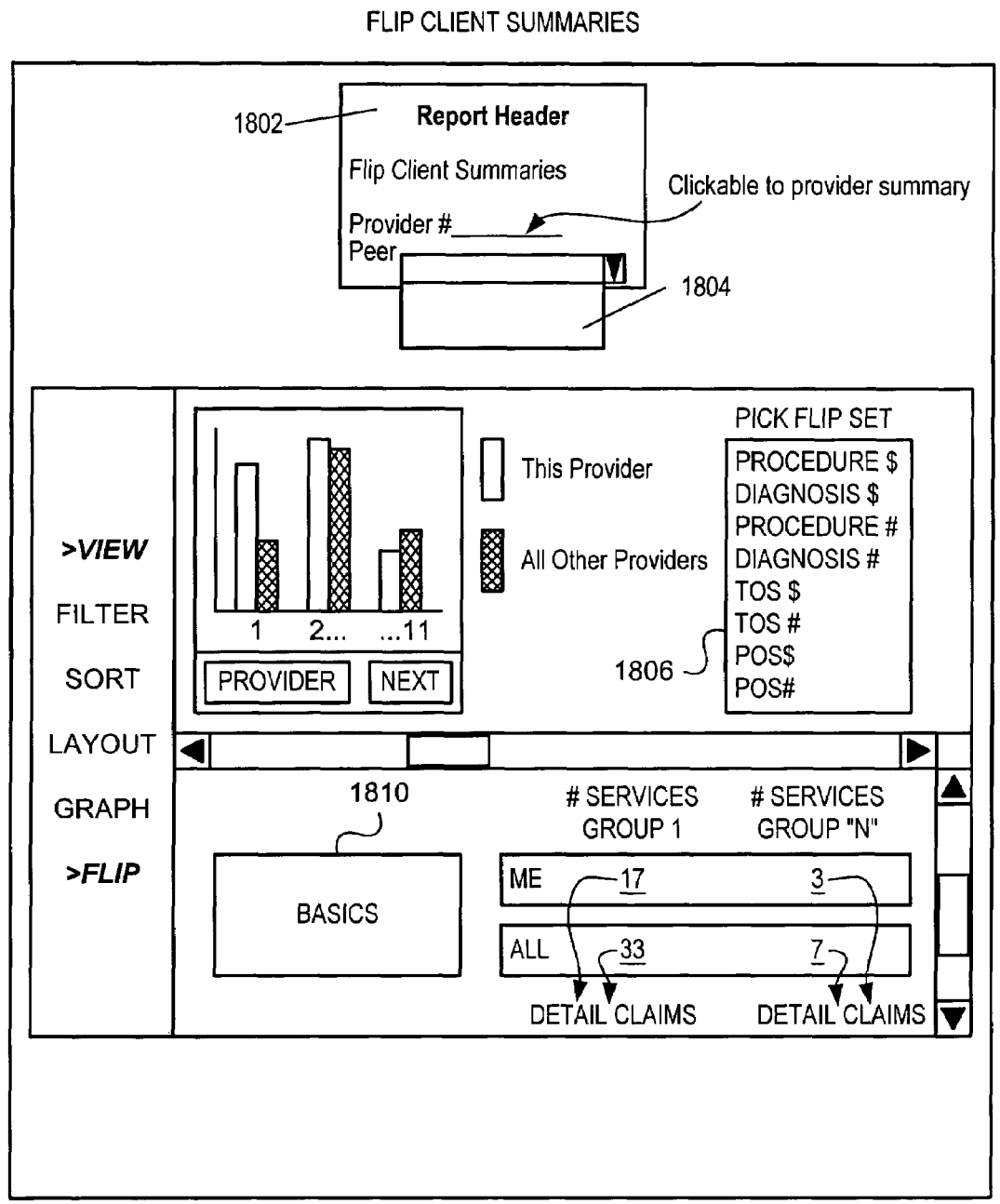
FIG. 18 illustrates the Flip Client Summaries report.

The claim detail page is a good place to show how some of these functions work. Referring to FIG. 14, to select a function, the user clicks on the desired function (e.g. Filter 1401) in the Context Menu frame 508 at the far left of the screen. Filtering allows users to execute queries that qualify which rows of the current data grid should be shown on-screen. For example, as shown in FIG. 14, if the user is only interested in services where the amount billed is greater than $30.00, he selects ">" 1404 in the $ Billed column 1402 and enters the amount "30.00". Each column permits multiple criteria, and the user can enter criteria for as many columns as he likes. To execute the filter, the user selects the "Apply" button.

Referring to FIG. 15, when the user selects the "Sort" function 1501, the current sort order is displayed and the user is given the opportunity to specify a new ordering. Numbers 1504 indicate the sort hierarchy, and arrows 1506 indicate increasing (up) or decreasing (down). In the example of FIG. 15, the sort order is first by decreasing $ Billed and then by date-of-Service (most recent first). Fields not included in the sort definition remain unnumbered (indicated by a small box 1502 at the top of the column). Clicking on this box 1502 includes the column in the sort criteria, clicking on a number removes the column from the sort criteria. Clicking on the up or down arrow toggles the direction of the sort. When the user has defined the desired sort order, they can execute the sort by clicking on the "Apply" button.

When the user selects the "Layout" function 1601, the current layout is displayed (FIG. 16) and the user is given the opportunity to change which fields are displayed as well as the order in which they appear on screen. Right/Left arrows 1602 move fields between the "Shown Columns" 1606 and "Hidden Columns" 1608 lists. Up/Down arrows 1604 move the selected field up or down in the "order of appearance" indicated in the "Shown Column" list. The "Apply" button executes the layout changes.

The Graph function 1607 allows users to pick which columns of data they would like to use for a plot, and the type of plot they want to view (scatter, pie, line, bar, etc.). The WebStation computes and graphs the selected plot using the data from the selected columns. Sample plots are shown in various ones of FIGS. 17-27.

V. Report Tree Example

This section describes in further detail a sample report tree, as may be generated by the WebStation for analyzing in more detail the relationships of various entities to each other. The illustrated reports are schematic in format and not representative of how they would actually appear on a screen display, though some of portions of the figures illustrate features of such screen displays. In addition, the linkages between reports are explicitly illustrated in many cases to show how the user navigates between reports. While this example is specific to a healthcare fraud and abuse implementation of the WebStation and the report tree concept, the report tree may be utilized in many other types of applications, including other types of fraud and abuse systems (e.g., consumer, merchant, Internet, credit card, debit card, etc.), sales and marketing analysis system, or any other application where multiple entities interact with each other in complex data relationships.

Procedure and/or Diagnosis Groups (TOS and/or POS) (FIG. 17): This figure shows a group of reports for a reason category that pertains to a break-down of the provider's activity in a particular grouping scheme. The four grouping schemes for the MD/Physician model are—Procedure Code Groups, Diagnosis Code groups, Type of Service (TOS) codes and Place of Service (POS) codes. For a reason corresponding to any of these grouping schemes, the reports in FIG. 17 will show up, with the corresponding groups.

First, the report header 1702 shows the grouping scheme, the provider number 1704 being reviewed and the peer group 1706 that is being used for the provider. The peer group can be changed using a drop-down box 1708—this will change the set of providers against which this particular provider's statistics are being compared. Then, the percent of the provider's activity (by dollars paid and by number of services) in each group is shown. (These are the top two images titled "DOLLARS PAID" 1710 and "NUMBER OF SERVICES" 1712). For each group, in addition to showing the level of the provider's activity in that group (depicted by the dot, e.g. dot 1714), the 25th, 50th and 75th percentile values for percent activity in that group across all providers in the selected peer group is also shown. This is depicted by the 3 horizontal lines across the vertical bar for each group (e.g. bars 1716). When the user clicks on the dot showing the provider's level in a particular group, this takes the user to a distribution report that is illustrated in the Provider (Yellow Dot) Chart in FIG. 19. The two bottom charts (1718, and 1720) of the Procedure and/or Diagnosis Group report show the top 5 codes in which the provider's activity is concentrated, one by dollars paid and the other by number of services.

The bottom of this report contains 3 buttons. The "View Client Summary" button 1722 takes the user to a report showing a summary of the providers' activity (relevant to that grouping scheme) with each of his/her clients (one line per client). For example, for procedure code groups, the number of details in each procedure code group for each client will be shown. Clicking on any one line, will takes the user to the claims corresponding to that client. The "Flip Client Summaries" button 1724 takes the user to the report shown in FIG. 18. The "View Procedures" button takes the user to the Provider (Yellow Dot) Chart report, shown in FIG. 19.

Flip Client Summaries (FIG. 18): In drill-down mode, the user comes to this report by clicking on the "Flip Client Summaries" button 1724 at the bottom of Procedure and/or Diagnosis report. This report allows the user to "flip" through the summary of a provider's activity with any given client and compare it to the activity of all other providers on that client. Once again, the user can select the peer group in the drop-down box 1804 in Report header 1802. The "Pick Flip Set" drop-down 1806 allows the user to select the grouping scheme (e.g. Procedure, Diagnosis, TOS, or POS) and number of services or dollars paid for which the user is interested in seeing the activity break-down. Corresponding to the scheme selected, the bar graph 1808 shows, the level of the provider's activity by the different groups compared to all other providers' activity, for the given client. The "Basics" box 1810 shows the basic client summary report (one line per client), off of which a particular client of interest may be selected. The box 1812 next to that shows the statistics for the selected client's activity, across the various groups, for selected providers vs other providers.

Provider (Yellow Dot) Chart (FIG. 19): In drill-down mode, the user comes to this report either by clicking on a yellow provider dot 1714 on the top report on the Procedure and/or Diagnosis report, or by clicking on the View Procedures button 1726 at the bottom of that report. The top chart 1906 on this report illustrates the distribution of the selected statistic (e.g., % activity in group N) across all providers in the selected peer group (once again, selectable through the drop-down 1904 in the report header 1902), and shows where the value corresponding to the current provider of interest lies on that distribution (the vertical line 1914 in the chart). The buttons 1916, 1908 below the chart allow selection of appropriate subsets ("Select Subset") and viewing the distribution within the selected subset ("View Subset"). The third button 1910 "Show Table" takes the user to table 1912. This table has one line per procedure code (or diagnosis code, etc) that the provider has activity in. For each procedure code, the activity by number of services or dollars paid and the corresponding percents is shown for the selected provider.

Client Age Breakdown (FIG. 20): This figure shows reports for the reasons corresponding to breakdown of a provider's clients by age groups. The top three reports 2004, 2006, 2010 respectively show the breakdown of numbers of clients, number of services and the dollars paid for the selected provider by the different client age groups. These charts are similar to the ones described for the Procedure and/or Diagnosis report, where the yellow dot represents level of selected provider's activity and the horizontal lines show the 25th, 50th, 75th percentiles of that activity for the peer group. Again, clicking on a yellow dot in a particular age group takes the user to a distribution chart 2016 similar to the one described for FIG. 19, the Provider (Yellow Dot) Chart report, except that the chart 2016 will show the distribution of services only for the selected age group. The View Client Summary button 2012 once again takes the user to a one-line-per-client report, showing the basic statistics for that client for the selected provider. Clicking on any line, will take the user to the corresponding claims.

From the distribution chart, the View Client Summary 2012 button will take the user to the same report as the corresponding button 2012 on the top chart, except now in a specific age group. The View Breakdown button 2020 will take the user to a Procedure and/or Diagnosis report like FIG. 17, except that the activity shown will correspond to the particular age group that was selected (through the yellow dot). The third box 2022 enables selection of breakdown by different codes/groups.

Monthly Activity (FIG. 21): This report is for reasons corresponding to monthly activity of provider. The breakdown of activity across months is shown for number of clients (2106), number of services (2108) and dollars paid (2110). Again, each yellow dot (e.g., dot 2112) represents level of selected provider's activity and the horizontal lines (e.g. 2113) show the 25th, 50th, 75th percentiles of that activity for the peer group. Like before, clicking on a yellow dot will take the user to a distribution Provider (Yellow Dot) chart as in FIG. 19. The Select Month button 2114 at the bottom of each chart enables selection of a particular month for which the provider's claims, sorted by client are shown. The Show Breakdown button 2116 enables viewing breakdown by different codes/groups, showing Procedure and/or Diagnosis reports similar to ones illustrated in FIG. 17, but for a particular month of activity.

Client Consecutive Visits (FIG. 22): This report is for reasons corresponding to the periodic nature of clients' visits for the selected provider. Top left chart 2206 shows the percent of clients who have consecutive monthly visits for 1, 2, . . . 12 months, while the bottom left chart 2210 shows the percent of clients who have more than two visits per month consecutively for 1, 2, . . . 12 months. Again, each yellow dot (e.g. dot 2213) represents level of selected provider's activity and the horizontal lines show the 25th, 50th, 75th percentiles of that activity for the peer group. Like before, clicking on a yellow dot will take the user to a distribution chart 2208 similar to the one described for the Provider Chart in FIG. 19. Once again, the user can go down to the corresponding Client Summary report 2214 from these charts and then to the corresponding claims. The buttons 2212 at the bottom of the charts also allow the user to select clients for a particular number of months and then look at their summary and claims reports.

Group Participation (FIG. 23): This report is for a reason corresponding to the participation of the provider in a group. Here, the provider's group 2302 is identified and likelihood of peers being in a group 2304 is shown. This report can link to clients' statistics and claims for that particular group 2306.

Figure 19:
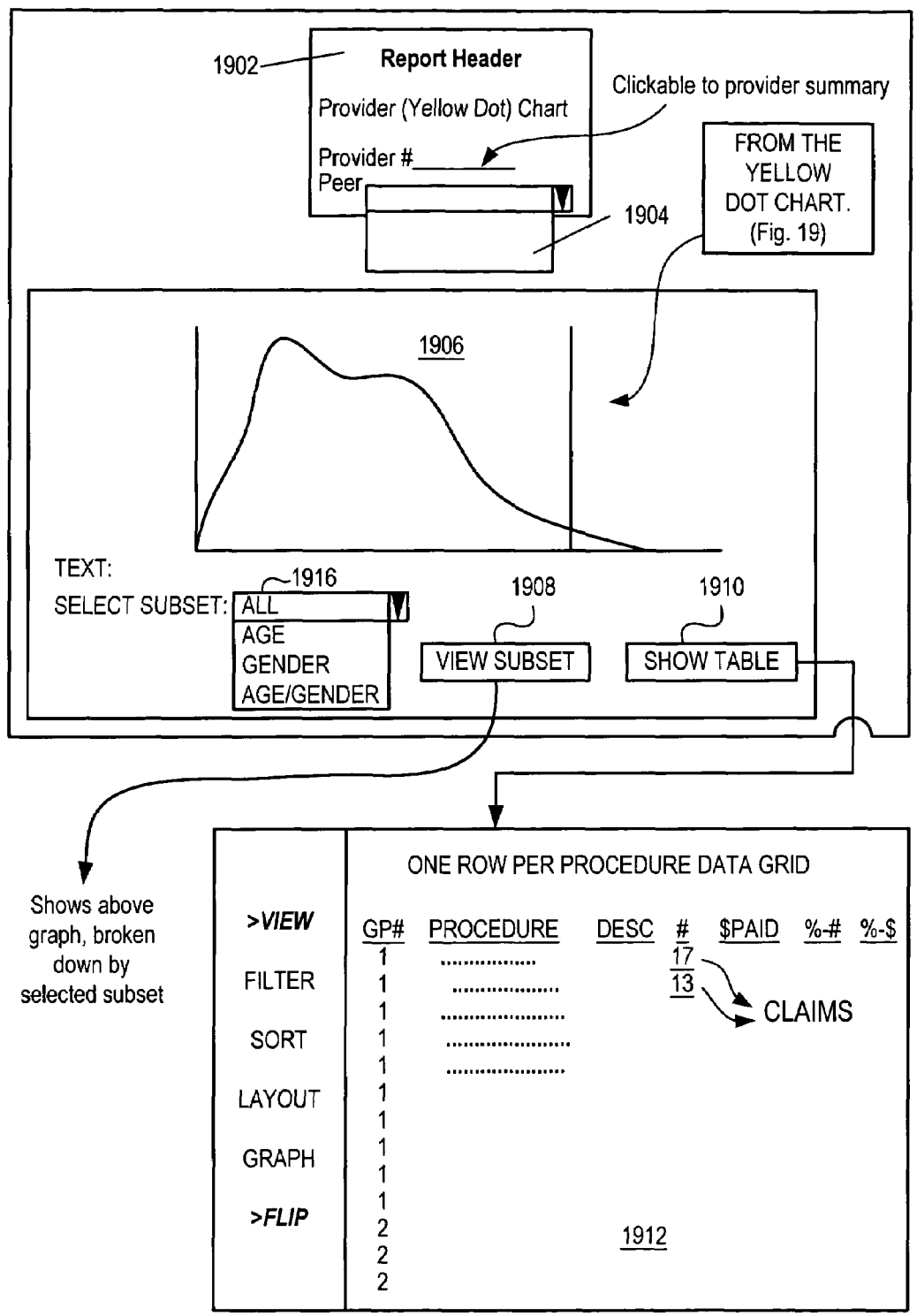
FIG. 19 illustrates the Provider Chart report.
Figure 20:
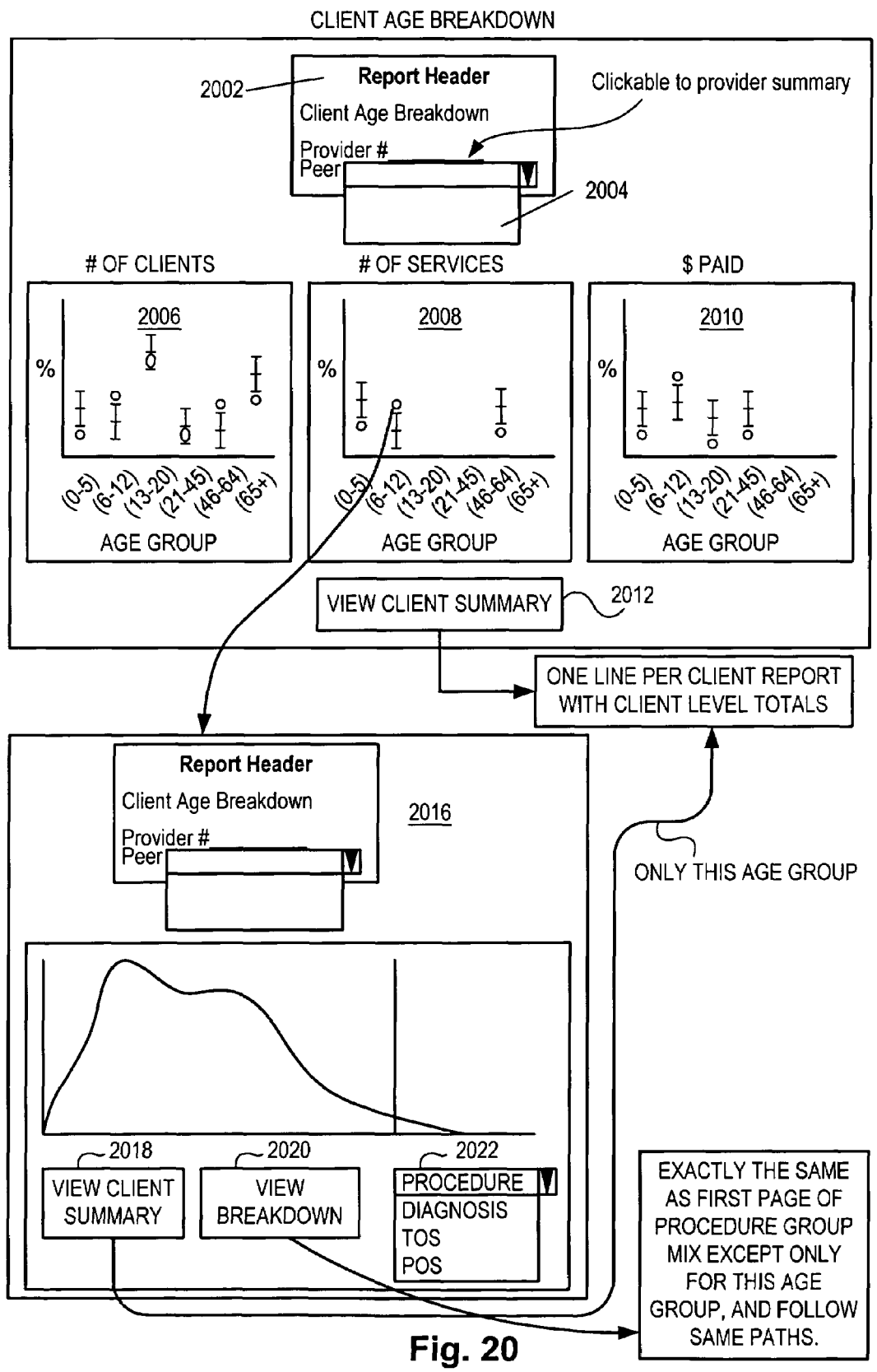
FIG. 20 illustrates the Client Age Breakdown report.
Figure 21:
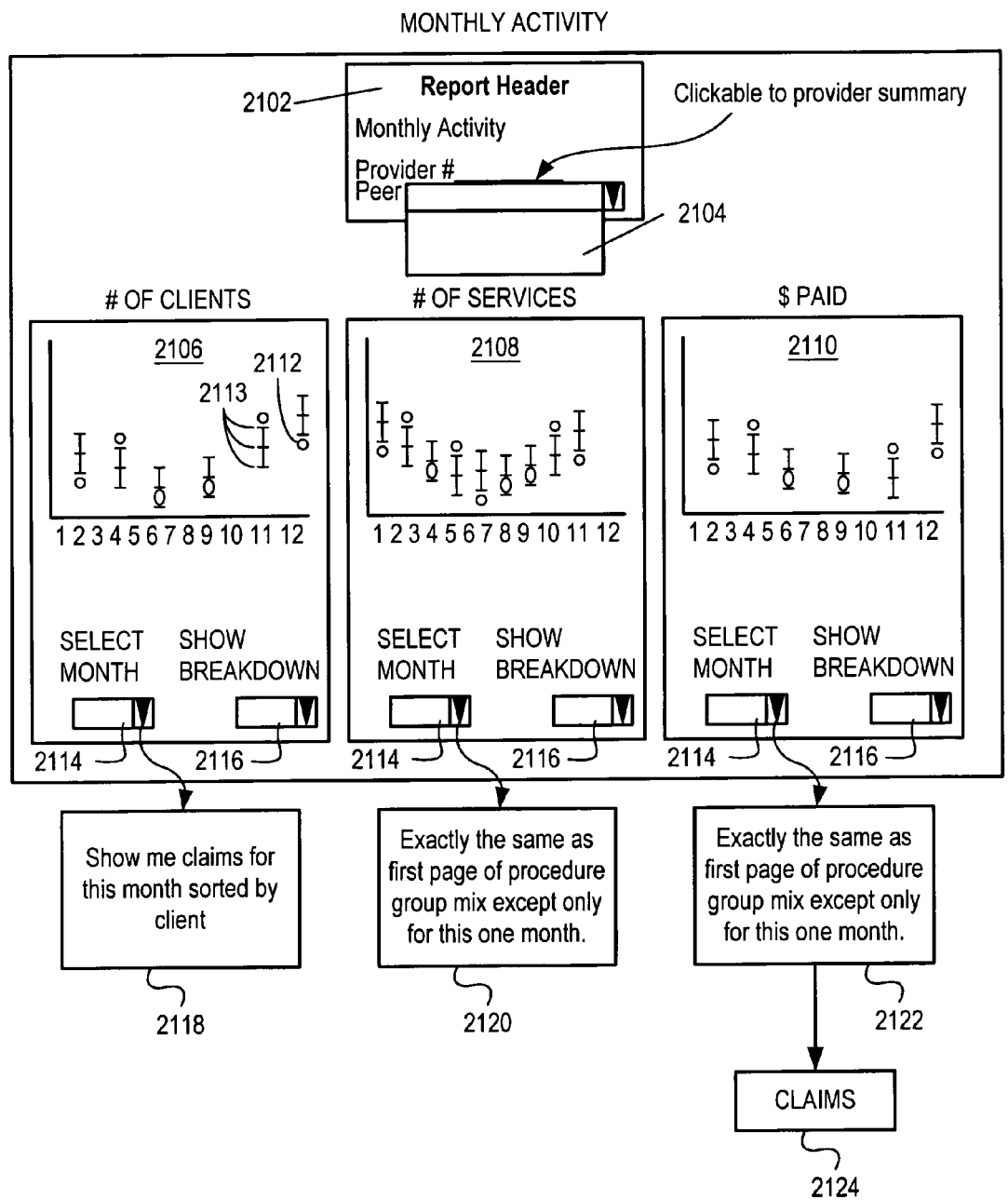
FIG. 21 illustrates the Monthly Activity report.
Figure 22:
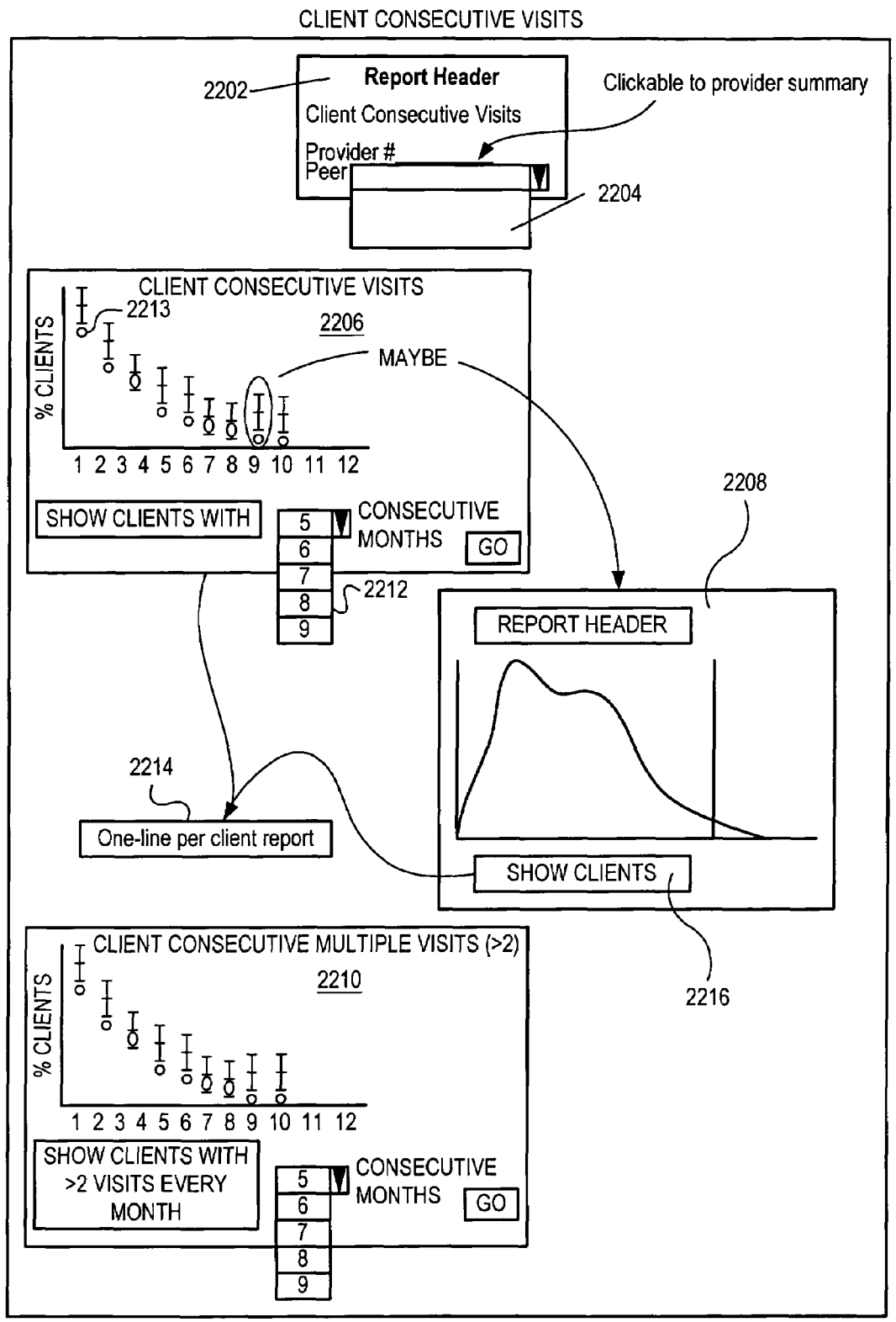
FIG. 22 illustrates the Client Consecutive Visits report.
Figure 23:
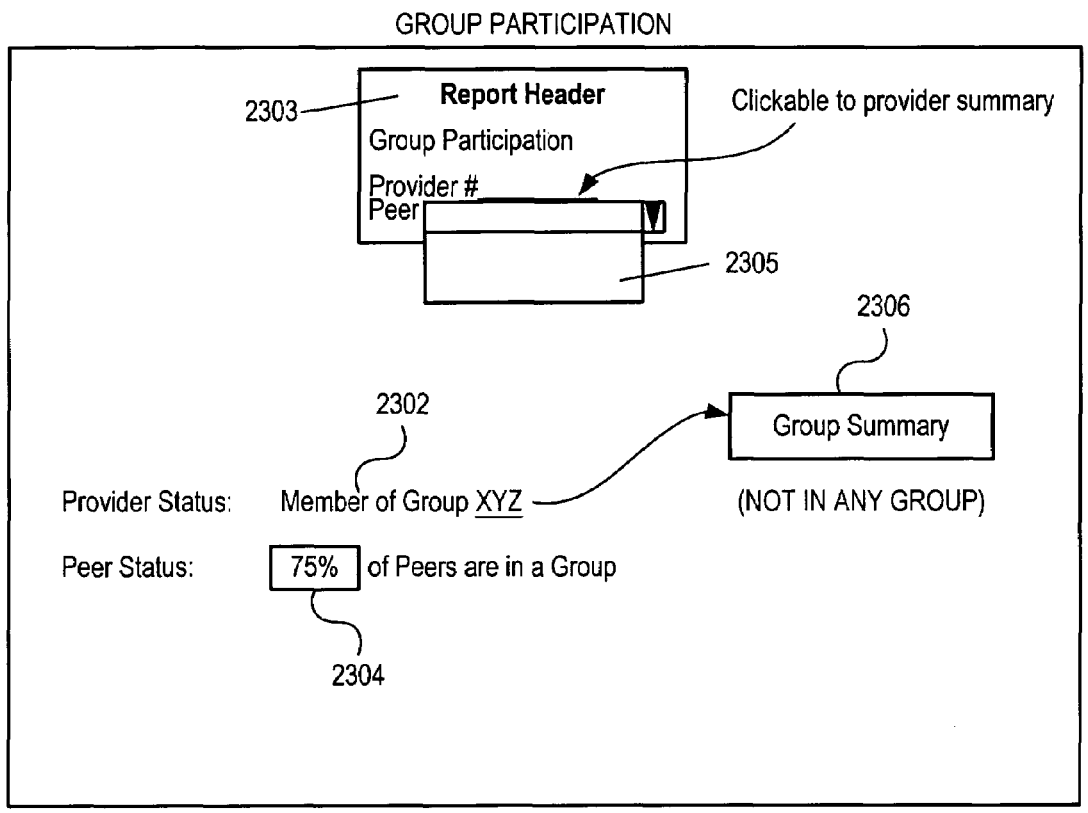
FIG. 23 illustrates the Group Participation report.
Figure 24:
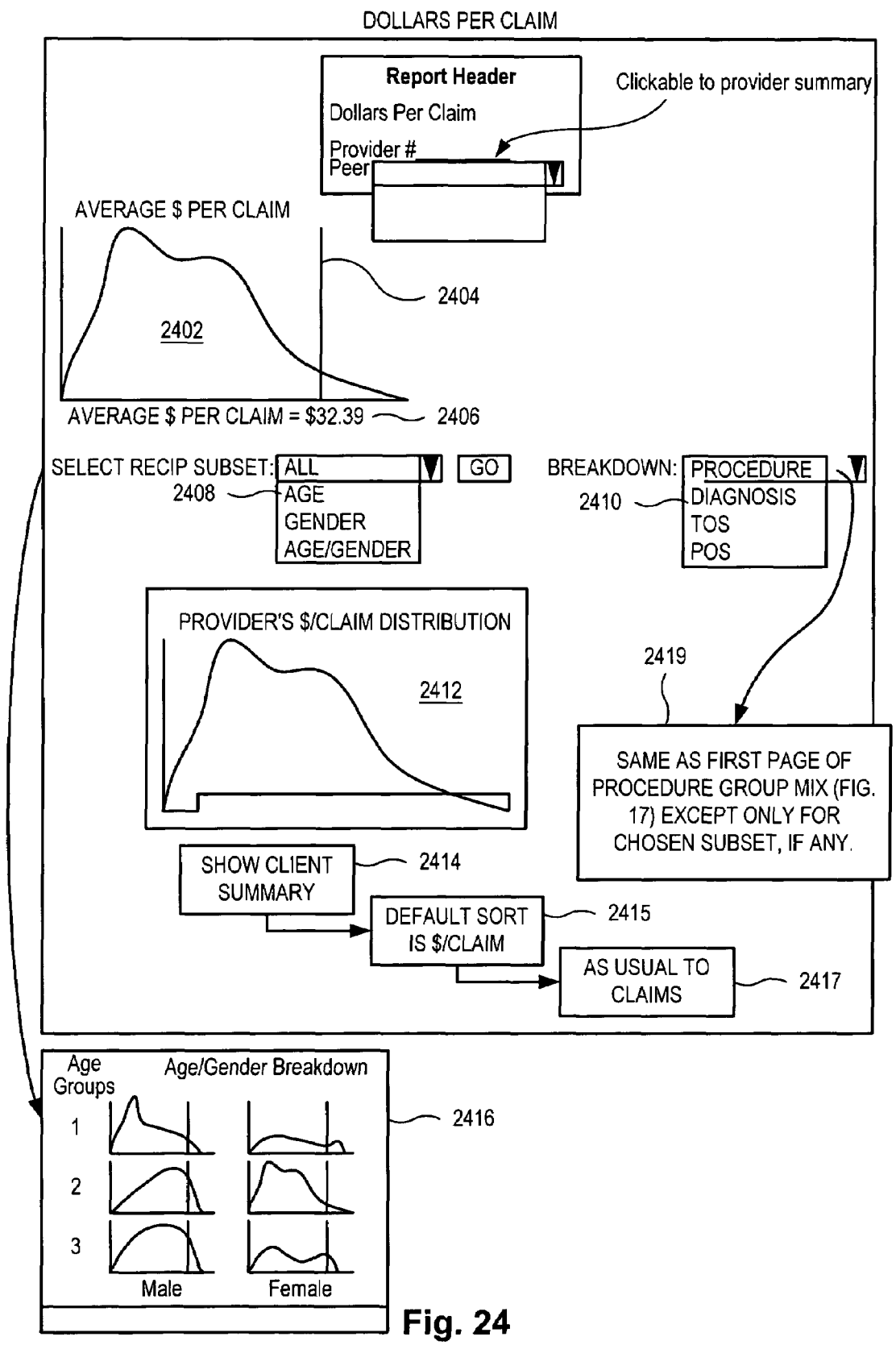
FIG. 24 illustrates the Dollars Per Claim report.
Figure 25:
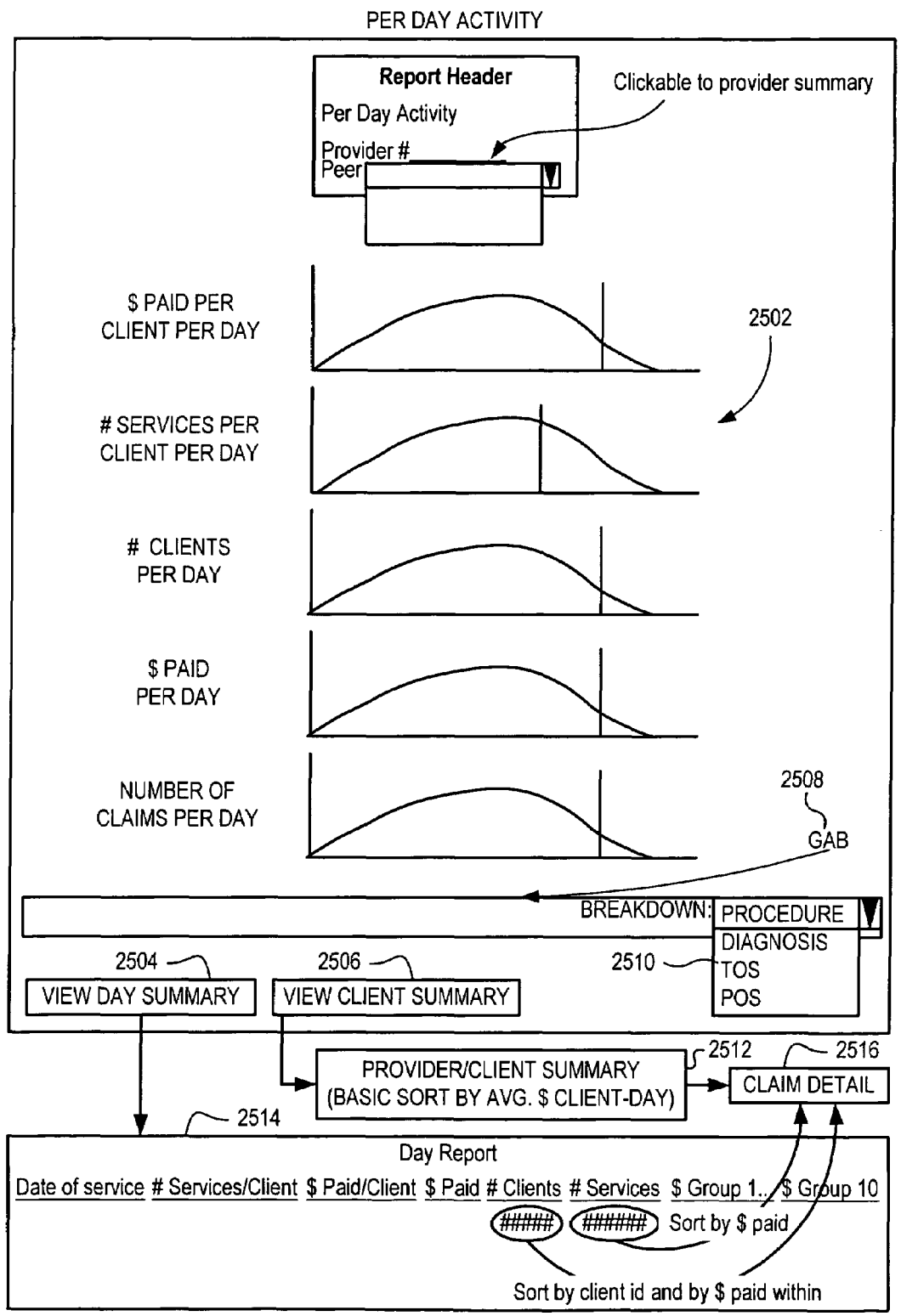
FIG. 25 illustrates the Per Day Activity report.

Dollars Per Claim (FIG. 24): This report corresponds to the provider's distribution of dollars paid per claim. The top chart 2402 is a distribution chart like Provider Chart on in FIG. 19, showing the distribution of average dollars per claim 2406 within the peer group and where the value for the selected provider lies in this distribution (vertical line 2404). Again, the Select Recip Subset 2408 allows selection of a subset of clients by age/gender etc., by which the distribution (chart 2416) may be viewed and the Breakdown button 2410 allows breakdown by different codes/groups (similar reports to the Procedure and/or Diagnosis report, but limited to the selected subset). The distribution chart 2412 shows the distribution of the dollars/claim for this particular provider. Again, the Show Client Summary button 2414 takes the user to a one-line-per-client report sorted (by default) by $/claim. This then leads to the claims corresponding to any selected client.

Per Day Activity (FIG. 25): This report shows distributions of the per-day activity of a provider. The charts 2502 show the different distributions as labeled. The "View Day Summary" 2504 enables viewing the clients/claims 2514 on a particular day. The View Client Summary button 2506 causes the display of a table 2512 with a line per client sorted by average dollars per client-day. The GAB 2508 and "Breakdown" drop-down 2510 enables viewing of the distribution charts by different codes/groups. The client summary leads to the corresponding claim details 2516.

Per Client Volume (FIG. 26): This report shows per-client statistics for a provider. Distributions 2602 of the different quantities for the selected provider are shown (e.g. dollars/client 2602*a*, number of clients 2602*b*, number of services per client 2602*c*, provider's dollars paid per client 2602*d*, and provider's number of services per client 2602*e*). Again, the View Client Summary button 2602 takes the user to a report 2606 with a line per client sorted by dollar such that clients with largest dollar volumes are at the top. Clicking on a client in that report 2606 then leads to a report 2608 of the claims for that client. One can also change the breakdown (procedure code, diagnosis codes, place of service codes, type of service codes) and the data subset (age, gender, age/gender).

Multiple Physicians Per Day (FIG. 27): This report shows the activity of a provider's clients seeing multiple physicians in the same day. Average 2702 and max number of providers 2704 seen by a provider's clients on the same day that they see this particular provider are shown. Again, the "View Client Summary" 2706 takes the user to a report 2710 with a line per client with a column 2714 showing the total number of providers seen by selected client. Clicking on that number takes the user to the claims 2712 for that client for all providers.

In summary then, it can be seen from these examples that the report tree has a general structure along the following lines:

(1) Suspect List
   (2) Breakdown of Provider's activity by procedure code groups
      (3) Distribution chart showing peer activity vs provider
      (3) Subsetting activity breakdown by age/gender
         (4) Subsetting distribution by age/gender
            (5) Table showing activity by breakdown (e.g. Procedure Code, Diagnosis Code, Type of Service, Place of Service)
      (3) Client Summary report (one line per client)
         (4) Flip Client Summaries (graph client summaries and compare to other providers)
            (5) Claims Report From any given report, one can branch out into different reports, hence there are multiple reports at the same level (indicated by numbers in parentheses). Also, different report branches will have different numbers of reports at the different levels. These various reports may be described as follows:

1. Suspect list Report: This is the root of each hierarchy. It contains a list of all the providers scored by the model, rank-ordered by the model score, and showing the top reasons for each provider. Clicking on any of the reasons takes the user down the branch of reports corresponding to that reason.
2. Provider-Based Report(s): This is the first level in any of the reason branches. A provider-based report uses only the selected provider as the key. This report will show the statistics relevant to the particular reason for the selected provider. Usually the distribution of those statistics for the peer group will also be shown in some form for context. Note that there could be multiple provider-based reports on a given reason branch. For example, the first report may show a coarser level of statistics and the ones leading from it will show finer levels of statistics.
3. Provider/Subset Based Report(s): From a provider-based report, one can drill down to a report that breaks down that provider's activity by a particular subset of clients/claims. Examples of subsets include age/gender, particular codes/groups such as procedure codes, diagnosis groups, etc.
4. Provider/Client Based Report(s): This is the next level in the hierarchy of reports. A provider/client based report breaks down a provider's activity across all of the clients that the provider has seen. The coarsest level of a provider/client report is one where there is one line for each client and basic activity statistics between the selected provider and that client, pertaining to the reason of interest, are shown. This report can then lead to reports showing more data on the particular provider-client pair's activity.

5. Claim Detail (Transaction) Reports: This is the last level in the hierarchy. This will show the subset of claims corresponding to the data that was viewed in the higher levels of the report branch.

Note that this description of report applies to a provider-based model and data. A similar hierarchy may be constructed for models in other applications as well, however the specific entities involved will change. The general structure of the "Suspect List" being the root of the tree and the transactions being the last nodes in the tree holds for any application.

VI. WebStation Functional Description

This section describes the preferred general functions of the WebStation 150. The functionality related to case management features is mentioned here, and described in further detail in the next section.

Viewing Report Tree Supporting Data

The WebStation 150 provides a robust set of functions for viewing results of the Detection System 120 as report trees and the underlying data in the Database 140.

1. View primary detection page: Display list of Predictive Models 121 and Rules 122 with high-level summaries of their results (number of suspects, estimated dollars at risk etc.). FIG. 8 is illustrative. This summary page 806 preferably includes:
   a) The date when the model or rule was most recently executed.
   b) For rules: the target (provider, licensee, recipient, etc.), number of claims, providers, groups, license numbers, recipients and dollars billed. (Note that for some rules, certain summary data may not be applicable).
   c) For models: the target, score range, number of providers, groups, license numbers or recipients in the top percentile of scores, top decile of scores (to give an idea of the scope of the model).
2. View a text description of each Predictive Model 121 and Rule 122: From the primary detection screen 800 the user should be able to view a detailed text description of each detection model and rule. This text preferably indicates:
   a) What the model or rule does (on-line description)
   b) The target (providers, licensee or recipients)
   c) The detailed scope (provider sub-specialty, specific fraud scams etc.)
   d) The data that is required in order to run the model or rule
   e) When it was first developed
   f) The history of modifications made.
3. View suspect lists 900 and reasons generated by Predictive Models and Rules: For models, when a model is selected, a list of suspects should be displayed using the frame layout.
4. Drill-down to view pre-defined summary and detailed reports that relate to top reasons (Reason-Driven Analysis).
5. Select from entire list of predefined summary and detailed reports.
6. Select a suspect and drill-down to the relevant summarized information, ultimately to the relevant claims detail (and other raw) data.
7. Search for all relevant detection results for a given provider, group, license number or recipient.
8. Search for cases by case-id, provider, group, license number or recipient.
9. Specify and apply arbitrary sort criteria to on-screen data as it appears in a Data Frame. FIG. 15 is illustrative.
10. Specify and apply constrained filter criteria to on-screen data as it appears in a Data Frame. FIG. 14 is illustrative.
11. View Provider Summary information via Provider Id link. FIG. 10 is illustrative.
12. View Recipient Summary information via Recipient Id link.
13. View Provider Detailed claims data from the Provider Summary screen.
14. View Recipient Detailed claims data from the Recipient Summary screen. FIG. 13 is illustrative.
15. Select a suspect and drill-down to the relevant summarized information, ultimately to the relevant claims detail (and other raw) data.

Much of the typical user's work boils down to viewing data in an effort to validate suspects and determine the nature of the questionable activity so they can take the appropriate actions. Report Trees help users navigate through the multitude of possible reports so they can quickly accomplish their objectives. User is able to start with a suspect list and drill-down to view pre-defined summary and detailed reports that relate to top reasons (Reason-Driven Analysis) or rules (Rule-Driven Analysis). FIGS. 17-27 describe examples of each of the reports and identify fields within each (non-leaf) report that link to additional reports. The user is able to initiate this drill-down through the Report Tree 400 either from a suspect list 700, or from the target summary report in the following manner.

a) Select from entire list of predefined summary and detailed reports
   In addition to Reason-Driven Analysis, the user is able to select from a list of available reports. This list is presented on-screen in a hierarchical (tree) structure.
b) Search for all relevant detection results for a given provider, group, license number or recipient
   The user can view all suspect list entries for any valid provider, group, license or recipient by specifying the appropriate Target Id. The results identify which model or rule identified the search target as a suspect and includes all of the suspect list fields (score, score date, reasons etc.)
c) Search for cases by case-id, provider, group, license number or recipient
   The Management user can search, by case, provider, group, license number or recipient ID, for all cases that exist for that entity. The resulting list includes entity ID (provider, recipient etc.), case ID, case status, case create date, last activity date.
d) View Provider Summary information via Provider Id link
   From any Data Frame including the provider ID, the user can link to the standard summary data for providers. This summary includes provider master-file information (name, address, stated specialty etc.) as well as derived summary data (claims volume, dollars billed, etc.). The contents of the Provider Standard Summary Report are described above with respect to FIG. 10.

e) View Recipient Summary information via Recipient Id link
  From any Data Frame including the recipient ID, the user can link to the standard summary data for recipients. This summary includes recipient eligibility file information (name, address, eligibility start/end dates etc.) as well as derived summary data (claims volume, dollars billed, etc.). (Similarly, the user should be able to link to the target summary for other targets such as licensee, etc.)
f) View Provider Detailed claims data from the Provider Summary screen
  From the Provider Standard Summary the user can link to the detailed claims submitted by the provider. The user can filter these claims by start and end dates, types of claims, etc. before retrieval (filters are available on all fields after retrieval via the Function Frame).
g) View Recipient Detailed claims data from the Recipient Summary screen
  From the Recipient Standard Summary the user can link to the detailed claims submitted for services rendered to the recipient. FIG. 13 is illustrative.
h) Specify and apply arbitrary sort criteria to on-screen data as it appear in a Data Frame
  Allow users to enter sort criteria by column (for example, by entering a signed number in a form, 1=primary sort key, ascending, −2=secondary sort key descending etc.). Allow the user to apply the sort. FIG. 15 is illustrative.
i) Specify and apply constrained filter criteria to on-screen data as it appears in a Data Frame
  Allow users to specify simple criteria (for numeric fields, constrained to >, <, =, <=, >=, with AND, OR, for example) for each column in a Data Frame. Allow users to apply the specified criteria to filter the rows of data within the Data Frame. FIG. 14 is illustrative.
16. View current case-list (the case-list is specific to each user and includes both cases that have been previously worked and cases newly assigned to the user). Each internal or Management user will have a list of cases that they have worked or that have been newly assigned to them (by a Management user). Users should be able to see a list of these cases with summary information relating to each case:
  a) Case Id
  b) Target Id
  c) Case create date
  d) Case create User Id
  e) Last action date
  f) Last action User Id
  g) Current Case Status
17. Frame Layout and Content
  Navigation Frame content:
  Standard Elements, "View Model <model id>" highlighted, Detection sub-tree detail.
  Function Frame content:
  View, Sort, Filter, Title, Graph elements
  Data Frame content:
  For Models each data row contains:
  a) Target Id, linked to appropriate summary report
  b) Score Date
  c) Score
  d) Top <n> reasons, each reason linked to the Reason-Based Report Tree
  e) Link to score history report For Rules each data row contains:
  a) Target Id, linked to appropriate summary report
  b) Run Date
  c) Number of claims
  d) Number of recipients
  e) Total dollars at risk
  f) Link to Rule-Based Report Tree (may be a single claim-level report)

Produce Hardcopy and Electronic Reports
  1. Print any report (as it appears on-screen) relevant to a specific case
  2. Print/Save reports as they appear on-screen
  3. Allow users to print and/or save any report that is viewable on-screen.
  4. Provide management reports to summarize the performance of specific detection models, rules or human reviewers
  5. Allow Management users to view a summary of the case status (open, closed valid, closed fraud etc.) by detection method (Model Id or Rule Id), and by User Id (opening User Id, closing User Id).

Provide Security and Access Controls
  1. Require each user to login to start a session
    a. At the start of a session, require each to enter their Id and Password.
  2. Enforce security by user access level
    a. Assign each user a User Id, Password and User-Type (security level). Enforce security to prevent viewing of results (at the provider and recipient level) and modification of case data by unauthorized users.
  3. Allow Management users to add, delete and modify system User Ids, Passwords and User-Types. Allow Management users to enter new users and specify their User Id, User Type and initial Password. Allow Management users to delete and modify any User Id, change any Password, change any User-Type.
  4. Allow Management users to assign view and modify privileges to system users at the provider-id and recipient-id level (for "Limited" user types). Provide a screen with a form to allow Management users to associate provider or recipient Ids to User Ids for "Limited" users. Allow Management users to delete provider and recipient Ids from a user's access list.
  5. Allow each user to change their own password
  6. Provide security to prevent viewing of results (at the provider and recipient level) and enable only authorized users to modify case status Manage Cases
  1. Open a case by "locking" a suspect from a suspect list
  2. Assign a case by selecting a suspect from a suspect list
    An authorized user (User-Type=Management) may assign a case to a system user. This procedure locks the case (to ensure that other Management users cannot concurrently assign the case).
  3. Lock a case to start a case session, release a case to end a case session Ensure that no other user can lock the case while it is locked. Allow only the user who has locked the case to modify case data. Allow a user to release a case. Automatically release a case when a user exits the application (leaves the site).
  4. Enter comments, set case status, and take actions with respect to the case. Allow a user to enter comments and set case status only when they have the case locked.

5. Allow Management users to release any locked case.

Because internal users may unknowingly keep a case locked (and go on vacation etc.) Management users need to be able to release any case (as identified by the Case Id).

6. Keep track of prior actions and comments saved for each case. Allow a summary of prior actions to be viewed.

Make an entry into the case-action log every time a user modifies case data. Note the User ID, Date, and Start/End time for the user's case session. Allow authorized users (Internal and Management) to view the Prior Actions log.

Additional WebStation Features

The WebStation also offers users additional functions to manage users, integrate with a Case Management Module and customize the way the WebStation displays information to meet each user's needs. The following shows the supported functions, which are easily implemented by those of skill in the art:

Password
Sizing
Colors
Fonts
Miscellaneous
System
Reminder Message

Optional Features

Web CaseBook

As a case is worked users perform different analyses, some using the Spyder Analysis WebStation, others taking advantage of external analysis tools and investigative processes. One mechanism for documenting a case is the Web CaseBook. As the case evolves, different users can add reports generated within the Spyder Analysis WebStation to the Web CaseBook. Preferably, the Web CaseBook has a hierarchical (outline) structure, but a single-level list of reports, comments and analyses may be provided. Each item in the list is stored as HTML and is linked to a title-entry in the main page of the CaseBook. At any point during the life of a case, the Web CaseBook can be viewed using a web browser. Preferably a CaseBook editor is used to help users develop cleaner looking Web CaseBooks.

Because predictive models and rules are executed against data from a changing data warehouse, a thorough record of what the data looked like at the time of investigation is desirable. The CaseBook meets this need. Generally, the Web Casebook is a web-site for a particular case. Some users create and modify the Web casebook, while others can only view its content (with components of the Web Casebook viewable depending upon the viewing user's authorization level). Additional tools (outside of the WebStation) may also provide the ability edit, update and view Web Casebooks.

Enhanced Graphics

The Display Types available for showing data on-screen may be enhanced. New Display Types can be provided for more sophisticated graphics to help users interpret the summary and detailed data needed to understand detection results. Specific new Display Types may include: Pie Charts, Temporal Trend Charts and Scatter Plots.

Graphing Function

In addition to fixed graphical Display Types, an embodiment may include a user-driven capability to select columns from Data Grid displays and generate graphical plots on-the-fly.

File Export

To facilitate export of summary and detailed report data to 3rd-party packages, an embodiment may include a capability to export specified data in an easily transported format(s). The export function supports standard file formats, such as Microsoft Excel, tab-delimited, and so forth.

VII. Case Management Module Software

This section describes in further detail the general and specific functionality of the Case Management Module 180.

Functional Overview

The following is a list of high-level functions for the Case Management Module 180.

Manage Cases

Figure 28:
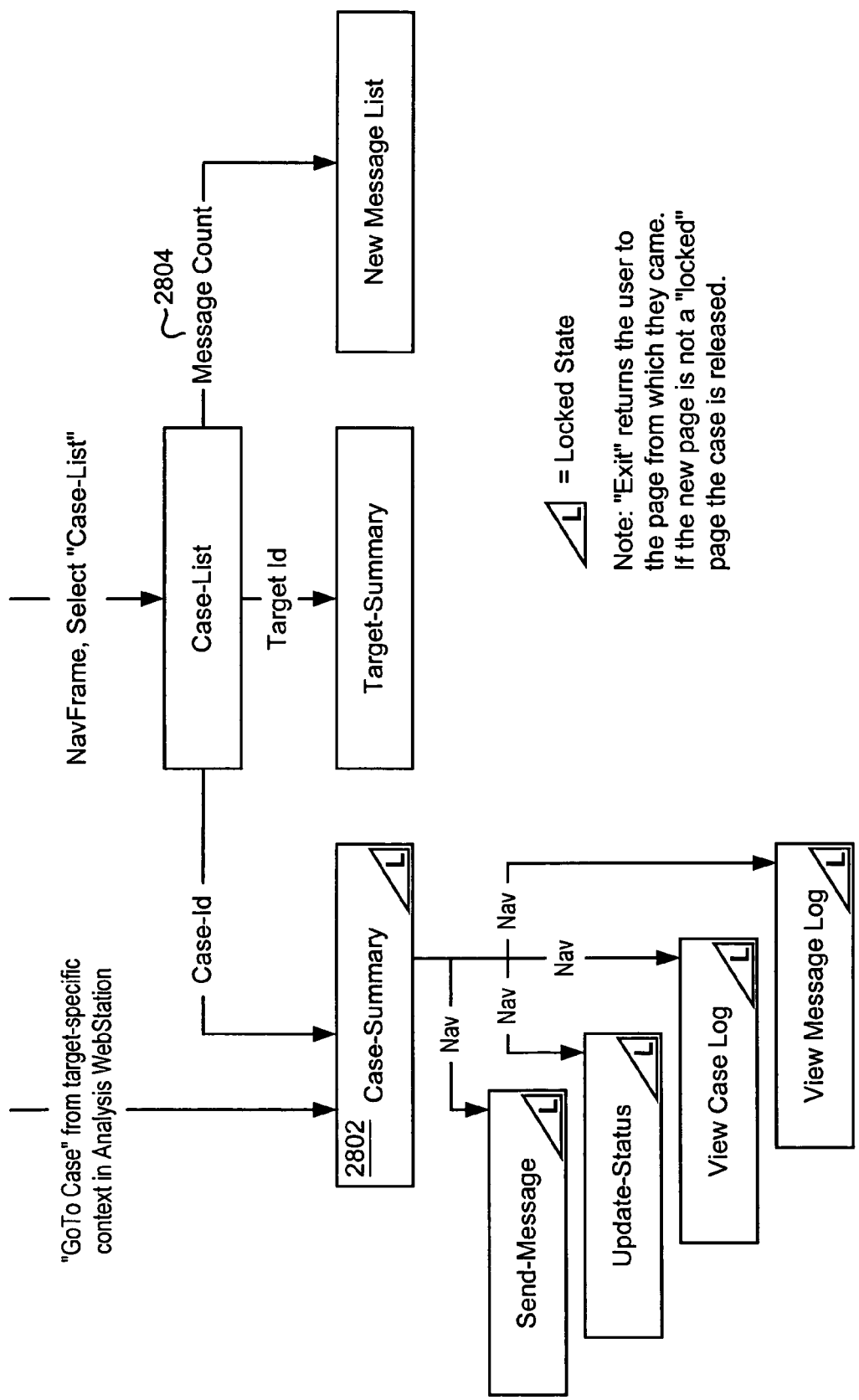
FIG. 28 illustrates the relationship of the various case management screens.

The Case Management Module 180 provides a number of interconnected screens that are used to review and analyze cases. FIG. 28 shows how these screens relate to each other:

Each user has a personal Case-List 2802. An example case list is shown in FIG. 29. Management users build and modify this list by assigning cases to users. Users will begin their session by either going directly to their case-list, or by browsing reports and detailed data using the Analysis WebStation.

Figure 30:
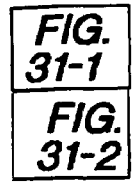
FIG. 30 illustrates a sample new case message screen.
Figures 1, 31:
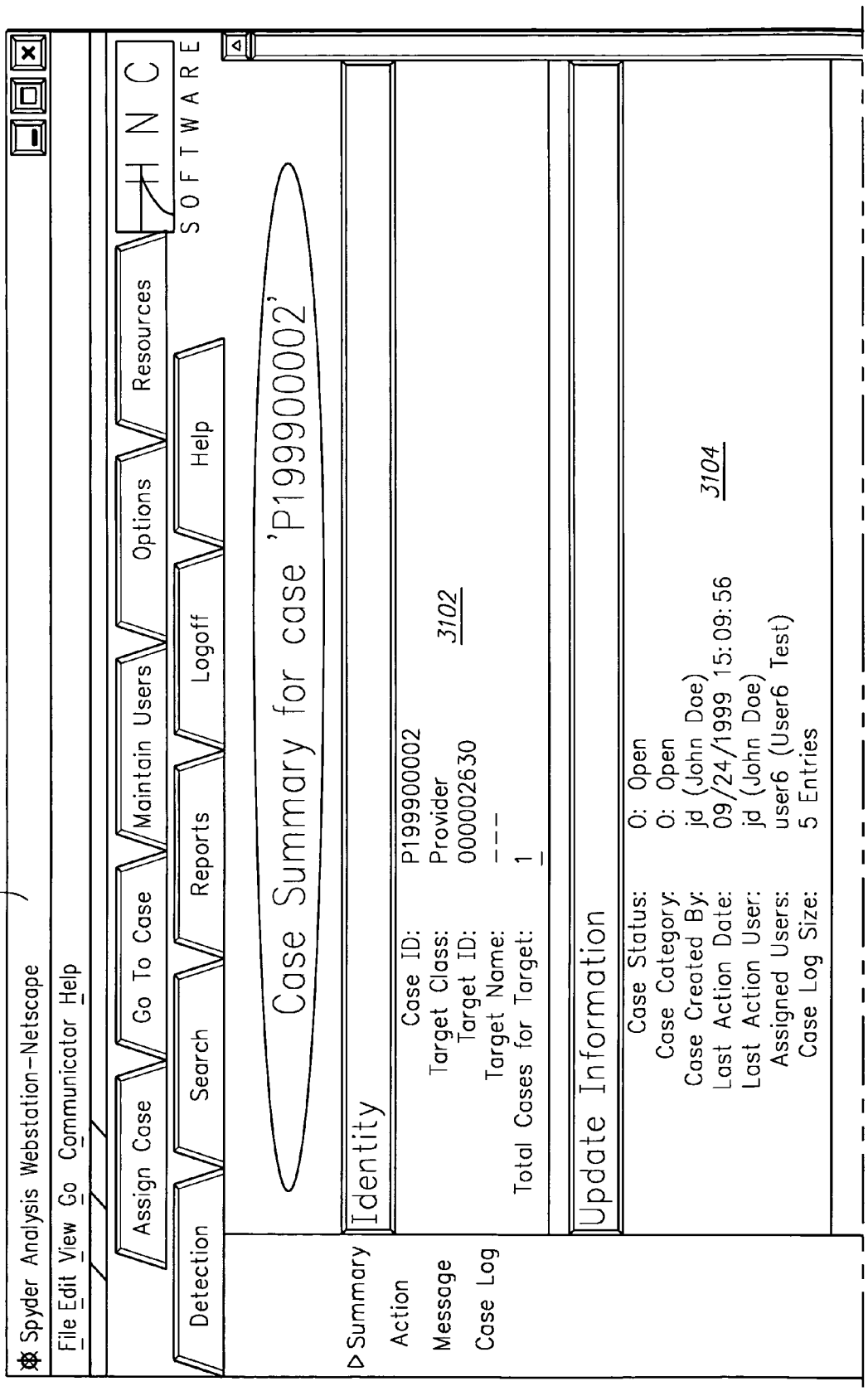

When users elect to view their Case-List 2900, they will see all of their cases, including newly assigned cases. The number of new messages 2902 related to each of their cases will be displayed on their main case-list page. By following the Messages link, the users can read all new messages for the case. A sample of the new messages screen is shown in FIG. 30. The user can also send messages to other users who have authority to access the case. All messages are stored and tracked for inclusion in the case message log.

Figure 31:
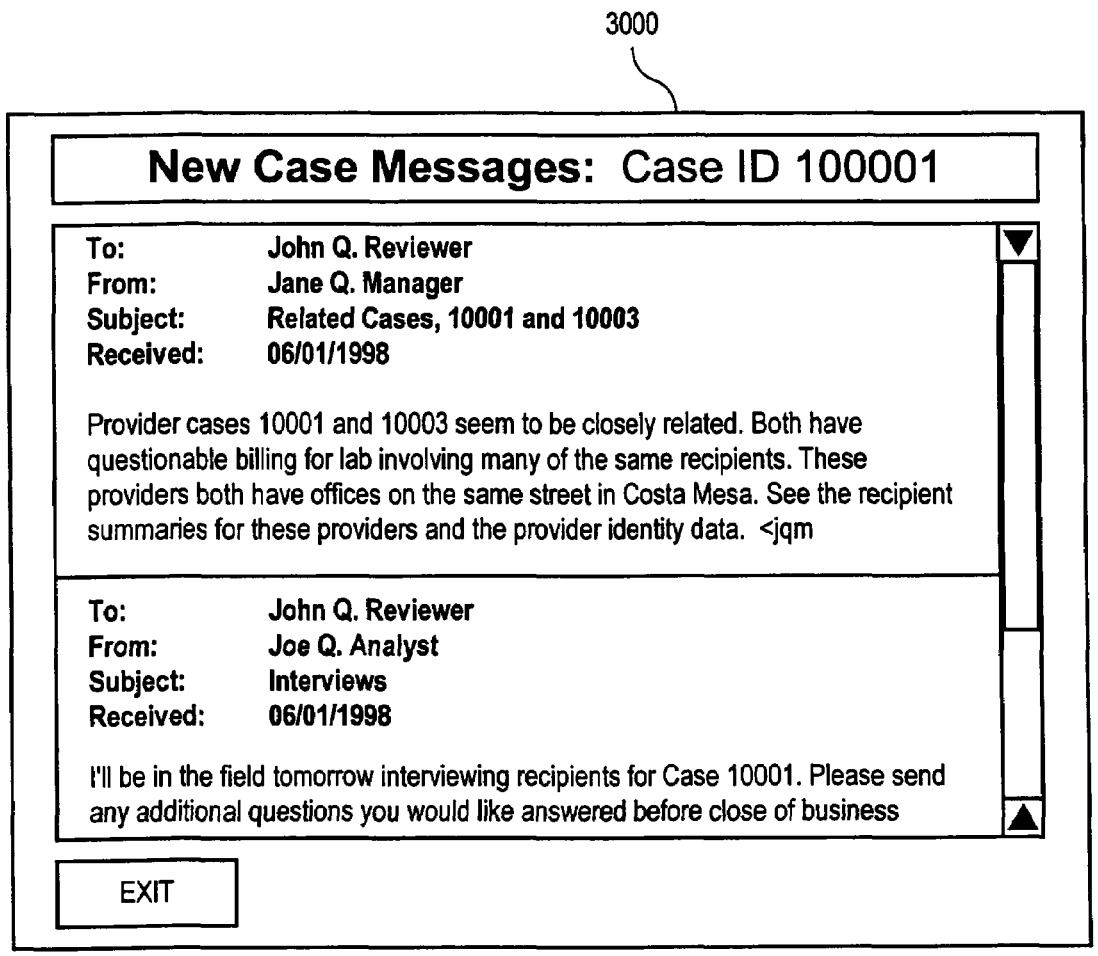
FIG. 31 illustrates a sample case summary screen.

From the Case-List page 2900, users can elect to go to a case by following its Case Id link 2904. This operation takes the user to the Case Summary page (FIG. 31) for that case and locks the case so that no other user can simultaneously modify the case. The Case Summary page shows an overview of all of the critical aspects of the case. The information blocks Identity 3102, Update Information 3104, Detection Sources 3106, Attached claims 3108, Linked Cases 3110, and so forth, group case information into higher-level categories for ease of viewing.

When the user has a case locked they can perform functions such as changing the case status, adding comments to the case notes, and other functions that modify case data. When the user is finished, they exit the case, and the case is released so that other authorized users can work the case.

Figure 32:
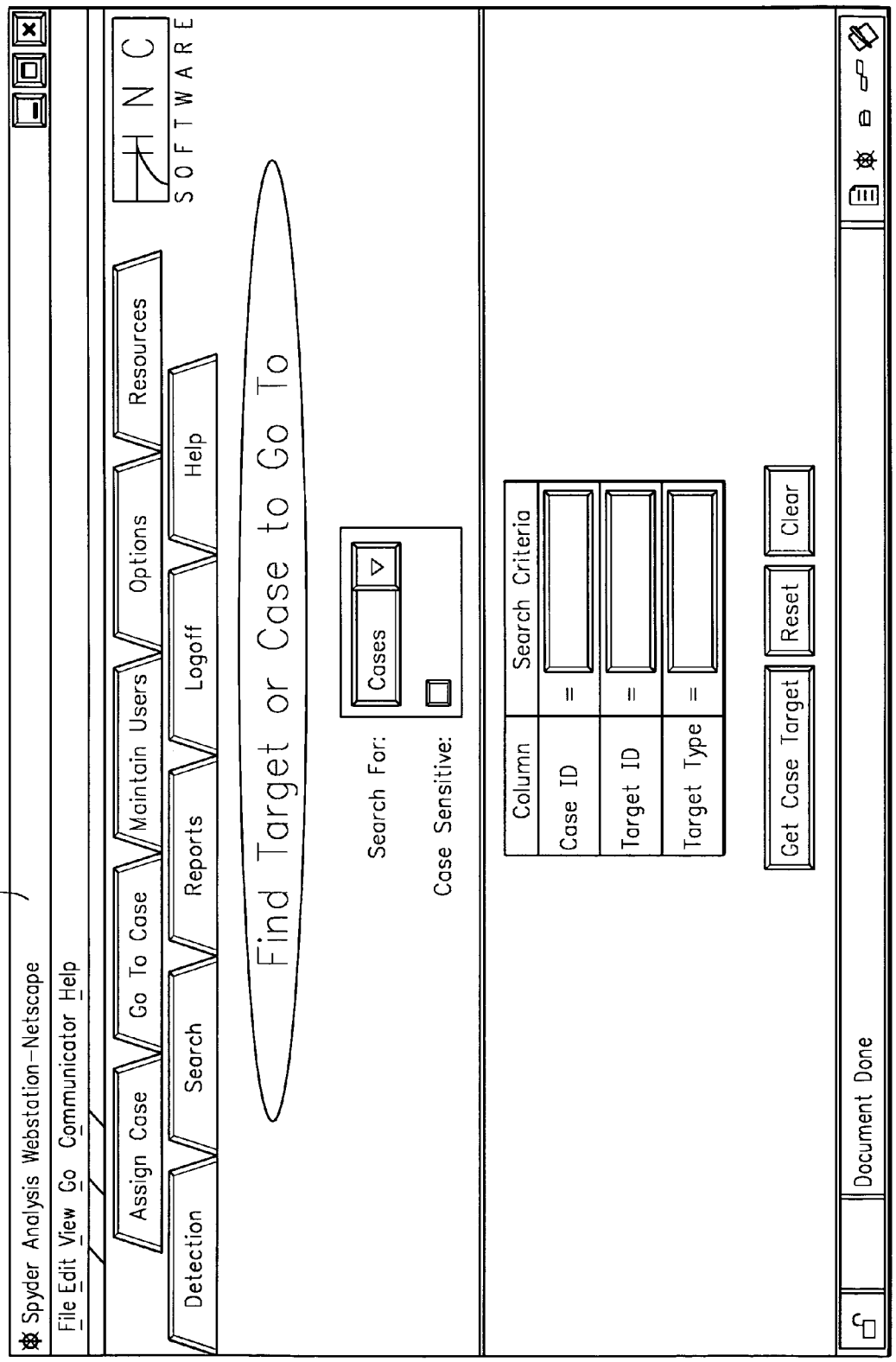
FIG. 32 illustrates sample find target screen.

When browsing reports via the WebStation 150, users may also elect to go to a case. This operation is only available when 1) the user is on a page in the WebStation where a single Target Id. is clearly defined, and 2) the user has authorization to work the case for that Target Id (this implies the case exists). Management users can create a case in this context. Clicking on the Go To Case tab 880 results in the Go To Case page 3200, as shown in FIG. 32. This allows the user to search for a case by entering the case-id, target id, and target type in the appropriate fields.

A variety of review, analysis and investigative actions can be taken as work on a case proceeds. Internal actions are actions that the system completes when instructed to do so by an authorized user. Sending a message and changing the case status are examples of internal actions. External actions are actions whose completion requires work to be done outside the system. Interviewing recipients, requesting patient records, visiting provider offices and reaching a settlement with a provider are examples of external actions.

Figure 33:
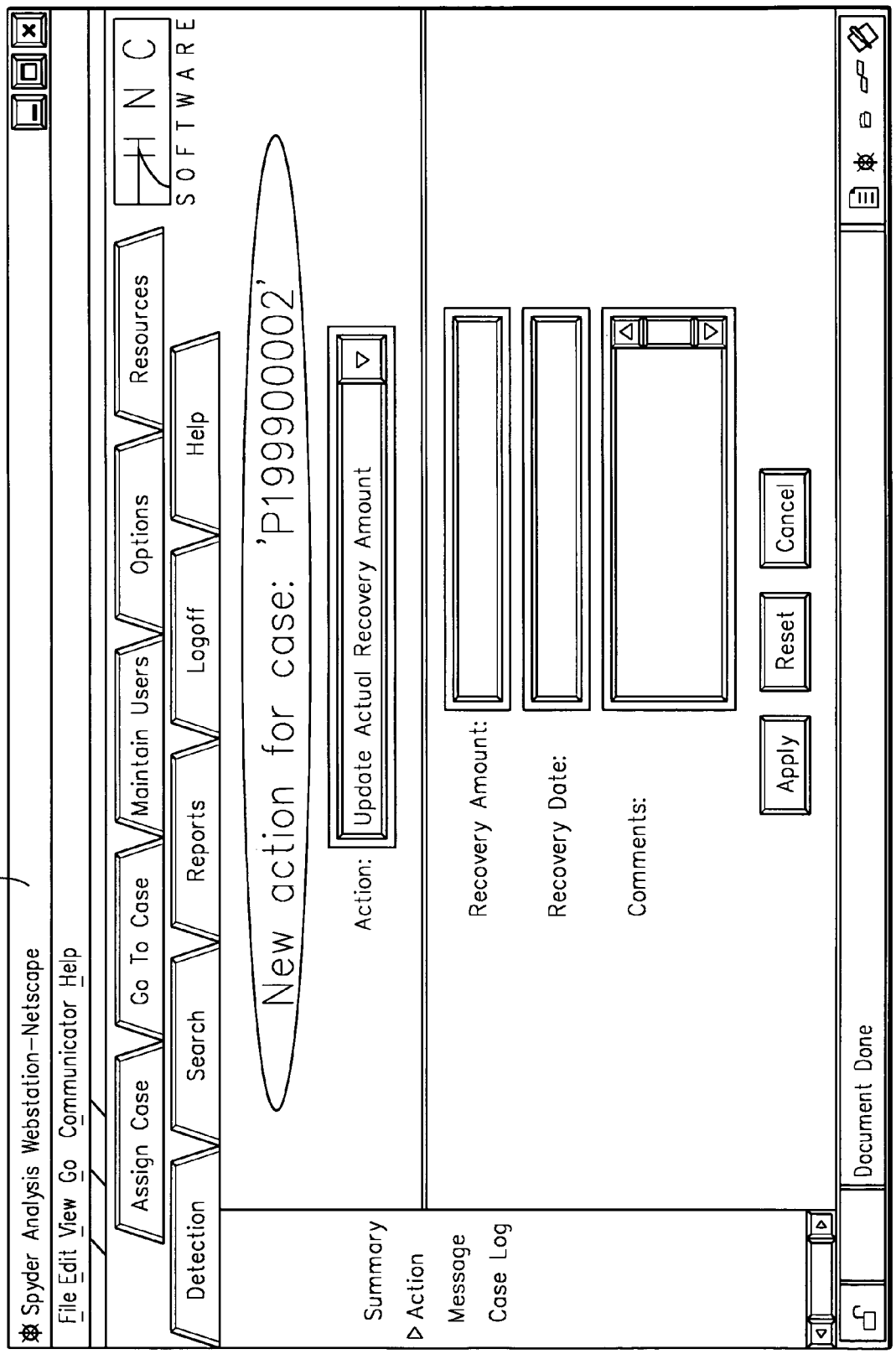
FIG. 33 illustrates a sample action screen.

FIG. 33 illustrates the action screen 3300 for a case, for taking a new action. This page allows the user to select an action from the ACTION drop-down 3302 at the top of the page. In a Spyder embodiment, the actions include:
- Update Case Status
- Update Case Category
- Update Case Detection Source
- Update Estimated Recovery Amount
- Update Actual Recovery Amount
- Attach claim
- Detach Claim
- Link Case
- Unlink Case As noted, in other applications, other actions may be applicable.

The bottom part of the screen (which changes, depending upon what the user selected for an action) allows the user to enter the required data, including descriptive comments to clarify the action.

The system records the date, time, User ID and other data for all internal actions. However, in order to track external actions users must enter information into the system. For example, when a case results in savings (or is far enough along to project savings, recoveries etc.) authorized users can enter projected/actual savings data. This is the case with all external actions as well as "final outcome" information such as legal or disciplinary actions taken against providers, recipients, or other entities.

Figure 34:
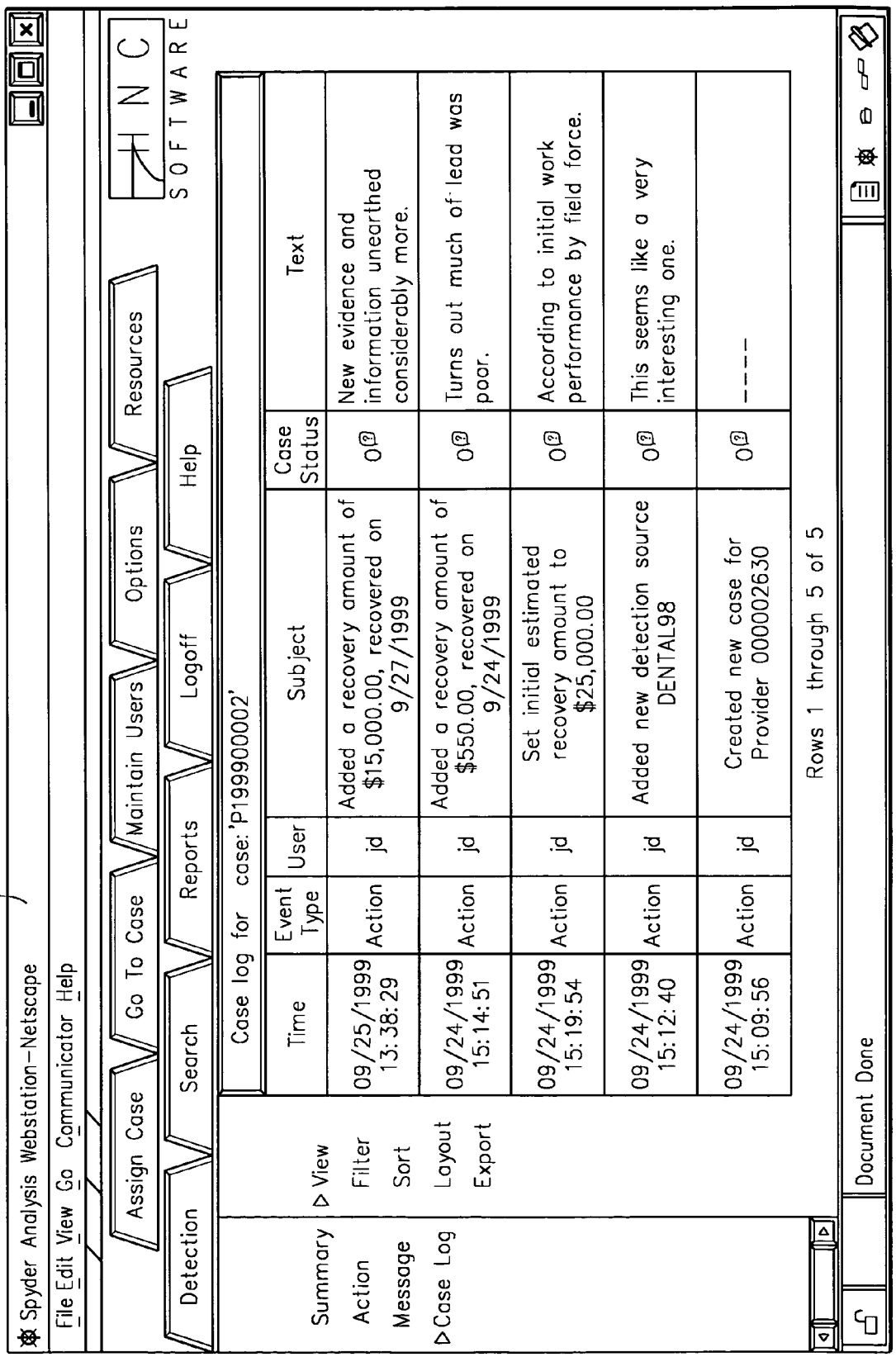
FIG. 34 illustrates a sample case log screen.

The user may also view the Case Log 3400 for a case, as shown in FIG. 34. This page allows users to view (and operate on using the context menu frame 508) the case log. This log lists all events related to the case. The "?"-bubble 3402 in the case status column 3404 provides a longer text description of the "O" case-status. This "bubble-help" facility is used throughout the WebStation for providing longer text descriptions for coded fields.

Figures 1, 35:
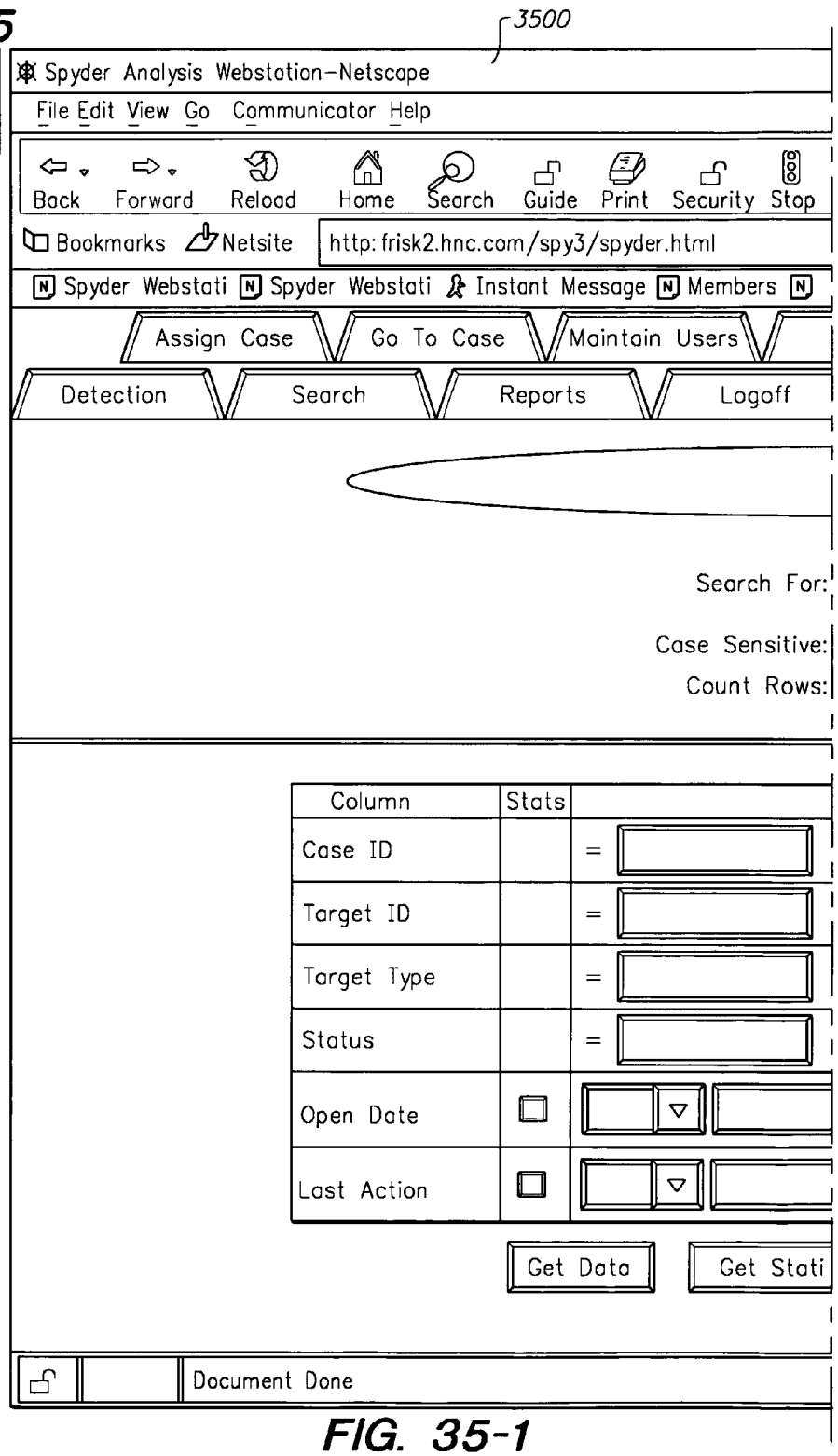
FIG. 35 illustrates a sample search screen.
Figures 2, 35:
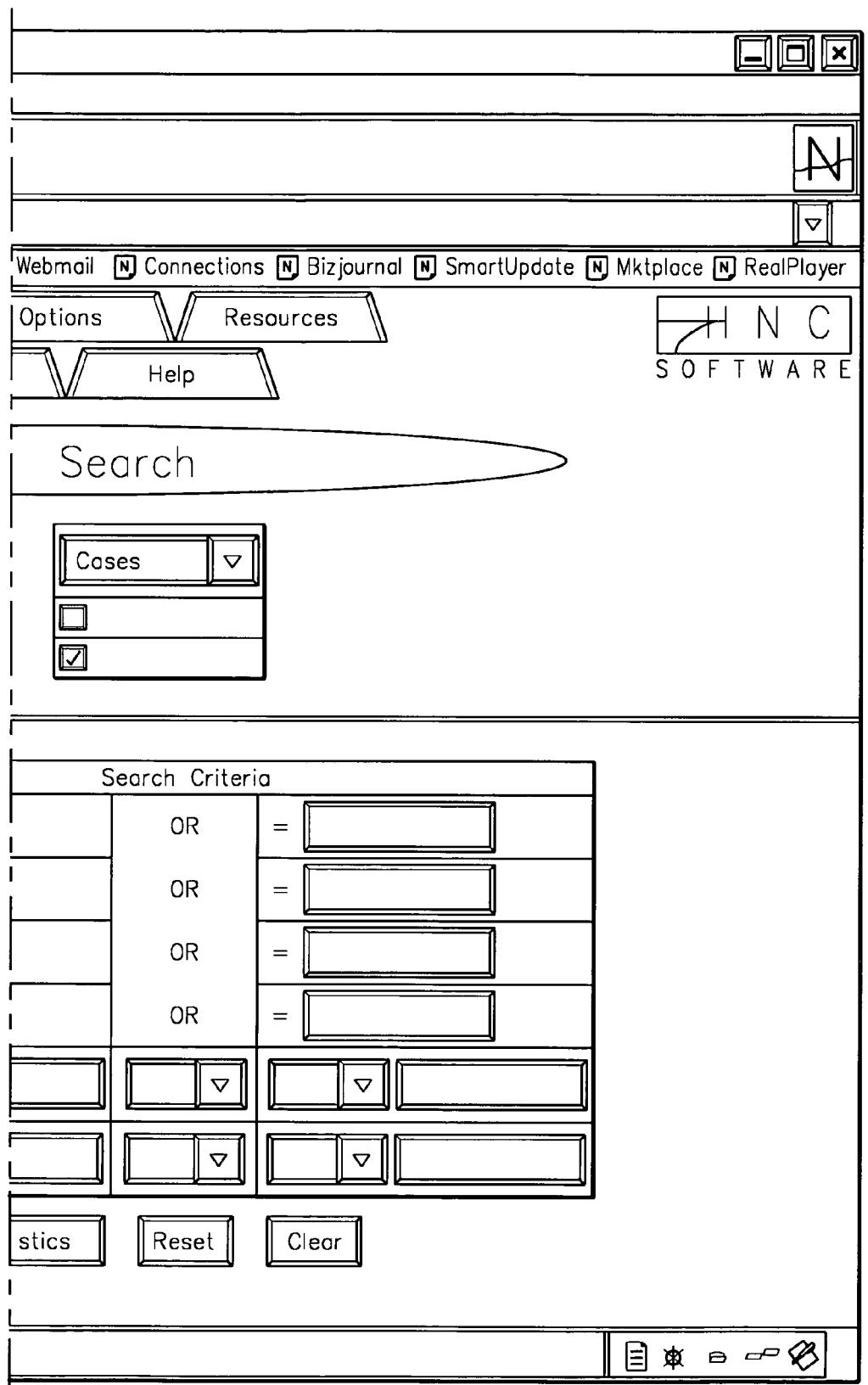
Figure 36:
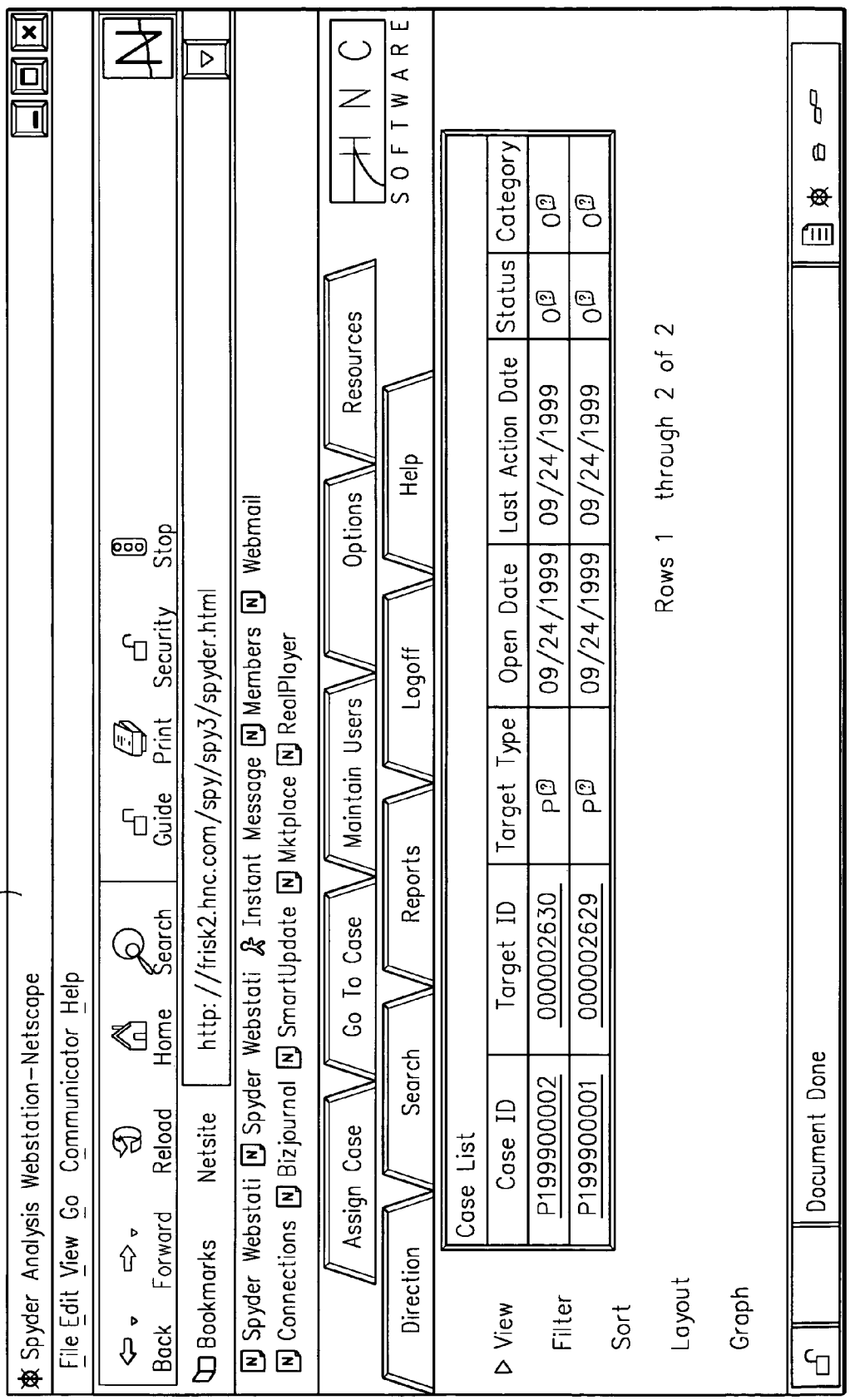
FIG. 36 illustrates a sample case list screen.

The user may also conduct general searches for cases, accessing a Search page 3500 via the Search tab 874. FIG. 35 illustrates the Search page. This pages more flexible search criteria than the Go To Case page. The WebStation executes a database search from the constructed query on the Database 140 and provides the resulting cases in a Case List, as illustrated in FIG. 36.

Case List 3600 is a list of cases that met the specified criteria from a search, and, like all data table pages has a Context Menu Frame 508 to allow further manipulation of the results. Clicking on the CaseID takes the user to the corresponding Case Summary page.

Assign Cases

Management users have the authority to assign cases to system users. They can do this via two different mechanisms. First, the Management user can select a specific Case Id and associate the case with a list of User Ids. Only the specified users can perform case management functions on the case (Management users have review access to all cases).

The queue mechanism is another way to perform an assignment, but it enables users to perform case management functions on all of the cases in the queue. When new cases enter a queue, all users assigned to the queue have access to all of the cases in the queue. In this way, the queue is a more general way to assign cases to users. Instead of dealing with singles cases, Management users can make assignments based upon categories of cases (embodied in the queue definitions).

The focus of case assignment is to control who has authorization to work (or view) cases. This control is placed in the hands of Management users (see User-Type).

Generate Management Reports

Management users have the ability to understand the current state of the fraud and abuse effort, analyze the effectiveness of the many components that make up the overall effort, and recognize opportunities for improvement. The Case Management module provides a suite of flexible reports to support these process tracking and analysis needs.

1) Current Case Load
   Current total number of cases in each different status
   Current cases by case-age
   Current cases by target-class
   Current cases by geographic region
   Current cases by system user (investigator)
2) Time-trend Case Load
   Same as Current Case Load, but with historical values plotted
3) User-Activity (one report per system user)
   General summary (User Identity data, current case load, historical case load, current cases by status, current cases by age bin, current cases by geo-region)
   Detailed summary (all of above, plus age by status matrix, time-trend case load, complete list of cases with Case Id, Target Class, Target Id, case-authorization start and end dates, case age, current case status)
4) Actual/Projected Savings
   Detailed case list, with basic case info, actual dollars saved, projected dollars saved, totals
   Actual/Projected dollars saved by Target Class
   Actual/Projected dollars saved by System User
   Actual/Projected dollars saved by Geographic Region
5) Geographical
   Case status by geographical region (target zip, target county, etc.)
6) Provider-Specific
   Depending upon the target, different reports are provided. For example, the subset of cases where the target is a provider can be further analyzed by stated type and specialty, by practice size, practice location, provider clusters etc. Recipient cases can be broken out by recipient age/gender, recipient zip code, recipient cluster, etc.

Case Management and Report Navigation

If the user is "in the context of" a specific suspect (meaning they are viewing a report that relates to a specific individual suspect), and the user selects a case management tab from the Main Menu Frame 502 (Go To Case 880 or Assign Case 872), the WebStation 150 assumes the user wants to work with the case for that suspect. (If the user selects Go To Case 850 then the Case Summary 3100 for that suspect is shown on-screen; if the user selects Assign Case 872 the software assumes they want to assign a case for that suspect.)

Whenever the user is on a case management page (of any kind), they still see the Main Menu Frame 502 common to nearly all WebStation pages. The tabs in the Main Menu Frame 502 let the user go back to navigating reports—specifically the Home 820 and Search 874 tabs.

Web CaseBook

As a case is worked users perform different analyses, some using the WebStation 150, others taking advantage of external analysis tools and investigative processes. One mechanism for documenting a case is the Web CaseBook. As the case evolves, users can add reports generated within the Analysis WebStation to the Web CaseBook. The end result is a record (in the form of a web site) that includes summary reports, reviewer/investigator notes, case status updates and other information relating to the case.

Because detection models and rules are executed against data from a changing data warehouse, a thorough record of what the data looked like at the time of investigation is needed. The CaseBook meets this need.

Ideally, the Web CaseBook would have a hierarchical (outline) structure, but initially a single-level list of reports, comments and analyses will be provided. Each item in the list is stored as HTML and is linked to a title-entry in the main page of the CaseBook. At any point during the life of a case, the Web CaseBook can be viewed using a web browser. In a future version we will provide a CaseBook editor to help users develop cleaner looking Web CaseBooks that include documents from external sources.

VIII. WebStation Configuration File

The WebStation is a general-purpose software application. It can be configured, using a partly automated and partly manual process, to meet the user-interface needs of any of a wide range of predictive solutions. The WebStation's flexibility is provided in part by the WebStation Configuration File 190. The configuration file provides a way to generate a large portion of the WebStation application software. Specifically, the configuration file enables the WebStation Builder 195 process to generate code (software) that displays tabular data in reports within the Report Tree. The WebStation Configuration File 190 contains a description of which data in the System Database 140 is to be shown on-screen, in a tabular report, which reports can be linked to, how the reports are linked to (which data fields are links), how the data appears on-screen (color, font, etc.), the table layout (which fields are visible/hidden, order of fields), and a variety of other details. The high degree of configurability makes the WebStation deployment across a variety of predictive applications far more practical and efficient than custom development using a similar software specification (source code re-use).

The WebStation configuration file is used to define the default setup for the WebStation. This section describes exemplary configuration parameters for creating WebStation pages, where a page is a formatted view into the WebStation Database. Note that the WebStation configuration file can also define other global preferences, e.g. the default colors and font sizes, but those options are not discussed in this section. In a preferred embodiment, a WebStation configuration tool is used to configure pages for a WebStation, and enforces the syntax and configuration requirements of the WebStation pages as described below. Those of skill in the art will appreciate that pages for the WebStation may be created in any HTML or even text editor, and are not limited to creation in the configuration tool.

Preferred Syntax of a Configuration File

A configuration file is built on the concept of configuration "elements," each of which may have an ID (if there are multiple such elements), and a list of associated data attributes. This section describes the configuration elements and their attributes in detail, including any default values; those of skill in the art will be able to readily extend or alter types of elements, their definitions, or their default values.

The format of these elements and attributes is:

Element [ElementID], Attribute1, Attribute2, . . .

A list of attributes is always terminated with a semi-colon.

Attributes may be separated by a comma, as shown, but the comma is not necessary, and all white space is ignored.

If an element requires an ID, then it must be the first item following the element type.

Some attributes in the attribute list are just "flags," but many require a value, i.e., attribute=<value>.

If an attribute takes a list of values, then the list is enclosed in parentheses. Also, many attributes need not be specified explicitly because there is a default value for each (optional attributes will be shown in this section in square brackets).

The concept of a "parameter string" is used several times in this second. A parameter string is a string with embedded parameters that are expanded at run-time. Parameters can be:
1. A parameter that is passed into a page when it is displayed. It is specified as $<param_name>
2. A global parameter (currently none are defined). These are specified as $<param_name>
3. A WebStation-defined columnID. Note that these can only be used in certain situations, i.e. when creating a SQL clause, or when passing column data from one page to another. These are specified as #<column_ID>.

An example of a parameter string is:

String="The quick $fox_color fox jumps over the lazy $animal_type."

In the above example, the string would be created with the current values for the parameters fox_color and animal_type. Substituting columns works a bit differently and will be explained later.

All ID's in the configuration file must be combination of alphanumeric or '_' characters, starting with either a '_' or a letter.

Comments may be interspersed throughout the configuration file, using either /*<comment>*/ notation for large comment blocks, or //<comment> notation for single line comments.

The configuration file is not case sensitive, so, for example ID "model_id" and "MODEL_ID" are identical.

There is one "master" configuration file, but configuration elements can be separated into multiple files and included in the master configuration file, as INCLUDE "<filename>".

Pages

The primary configuration element in the WebStation configuration file is the "Page". There are two types of pages that the WebStation works with:

"Table" pages—These are the most configurable and most common pages that the WebStation displays. A table page consists mainly of a spreadsheet-style data display, with a page title and columns header. Setting up a table page mainly consists of defining the SQL and the resultant columns that are to be displayed.

"Form" pages—These are all other types of pages that can be a combination of graphs, charts and user input fields. Since the possibilities for such pages are endless. Defining a form page comprises defining a page title, a list of parameters that the page requires, and either the names of the JavaScript methods that are used to build and take action on the pages, or the name of an HTML file.

A page is specified using the following configuration element:

Page <name>
Type=TABLE|FORM
[CopyOf=<existing_page>]
[Params=(param1, param2, . . . ]
  Every page must be given a valid, unique ID because pages are always referenced by name
  Type must be one of TABLE or FORM
  CopyOf is only available for TABLE pages and is an optional attribute that indicates that this page is a slight modification of the given existing_page. A copied page assumes exactly the same column set as the existing_Page, but allows modification of the SQL where, order by, and having clauses. It also allows a different variation of hidden/shown columns as well as the column order of appearance.

Params is an optional attribute that lists all the parameters required to build the page. Each parameter must be a valid ID. When a page is linked from another page, the link is checked to make sure that all the required page parameters are being passed. The WebStation configuration tool will generate an error if this condition is not met.

The following set of configuration elements follow a Page declaration because they are used to define the contents of a page. Note that the order of appearance is not important, as long as all the elements belonging to a page occur after the Page declaration of that page, and before the Page declaration of the next page.

Title

The "Title" configuration element is used to specify the text in the top row of the table, above the column headers. It is specified as:

Title <title_param_string>;

Note, any HTML tags can be embedded in the string, to customize the display. For example, the following title string with put a line break (HTML tag <BR>) in after the parameter model, and before the "for provider":

Title "Clients from model '$model<BR> for provider $provID";

The following configuration elements are available only for table pages. SQL

The "SQL" configuration element is used to define the clauses that are used to generate the SQL to build the report. Note that the column definitions occur with the column configuration elements (see the Column section, below) because columns have a lot of optional attributes and it is easier to keep all information related to a particular column together. Also note that this is an optional configuration element for copied tables, but it is required for "original" tables.

SQL From=<from_param_string>
[Where=<where_param_string>]
[Having=<having_param_string>]
[OrderBy=(column1 [ASC|DESC], column2 [ASC|DESC], ... )]
[GroupBy=(column1, column2, ... )];

"From" is typically just a string that indicates the name of the table or tables used in the query. It is possible, however, to specify a table using a page parameter. Do not use the word "from" in the string. Note that copied tables may not redefine the From clause.

"Where" is an optional parameter string used to define the "where" clause for the query. The parameters used can either be standard parameters or the WebStation-defined column ID's. Note that the use of column ID's is optional when using simple column data because in most cases the column ID defined for the WebStation the same as the column name in the database. However, using a column ID can be useful when a SQL column is a more complicated calculation, like a combination of two or more other columns. Calculated columns, e.g. SUM(dollars), are preferably not used in the Where clause because those should be used in the Having clause. An example of a Where is as follows:
Where="#client_name like '% Smith %' AND service_date>'01-JAN-95' AND prov_id='$provID'"

Note that operations that are AND'ed together are executed from the last operation to the first, so in the example, the where clause selects a given provider that matches the parameter provID. Then it looks for records where the values in table column service_date are after Jan. 1, 1995. Finally, it looks for rows where the column ID client_name contains a sub-string of "Smith" (note that client_name could be a concatenation of two table columns named first_name and last_name).

"Having" is an optional parameter string that works almost exactly like the Where clause, except Having should only be used for calculated columns, i.e. sum, count, min, max, avg, etc. The reason for this is that Where acts on rows before they are retrieved, whereas Having is used to filter rows after they have been retrieved. Note that for efficiency, a Where clause should always be used for filters that act on a single row of data at a time.

"OrderBy" is an optional list of columns used to sort the data. The first column listed is the primary sort key, the second column is the secondary sort key, etc. Ascending sort order is the default, but an ASC or DESC modifier can be used with each column to specify the sort order.

"GroupBy" is an optional list of columns that defines how the data is to grouped, in the event that there is at least one calculated column requested, e.g. you want the total dollars overall (non-grouped) or the total dollars by client (grouped by client). The first column specifies the primary group, and the second column is the secondary group, etc. Note that there must be at least one calculated column (sum, count, etc.) in order for GroupBy to be valid, and if that is the case, then all the non-calculated columns should be specified in a GroupBy. If no GroupBy is specified and there is a calculated column, then the WebStation will group the non-calculated columns in their order of appearance.

Coloring

The "Coloring" configuration element is an optional field used to determine how the background colors of the data tables are alternated. This is a very useful parameter for allowing some degree of visual separation in the data.

Coloring ALWAYS|ONCHANGE
[Cols=(column1, column2, ... )]

If "Coloring:" is defined, then it is followed by:

ALWAYS—Always alternate the background colors from row to row. This gives an appearance similar to a "green bar" paper printout report ONCHANGE—Alternate the background colors based on the data in the table. Use to Cols attribute to specify the columns to monitor. This is very useful when the monitored columns match the OrderBy columns so that "blocks" of "like" data or colored together.

Cols is used to specify the columns to be monitored for ONCHANGE coloring. It should not be specified for ALWAYS or NEVER Coloring. Any column ID may be used in the list, but this option is most useful if the columns match some subset of the columns specified in the OrderBy clause, if any.

Column

The "Column" configuration element is the most complicated page element in that it has the most possible attributes. It is used to define which database columns are chosen and how they are to be displayed. Note that redefining column attributes is not allowed for CopyOf pages Column <columnID>
[SQL=<column name or calculation>]
[DisplayName=<column header string>]
[SamplingTable=<database table for sampling>]
[DataWidth=<width of data>]

[Justify=LEFT|RIGHT|CENTER]
[Show/Hide]
[Type=DATE|TIME|STRING|INTEGER|FLOAT|
    MONEY|CATEGORY]
[Precision=<decimal precision for FLOATS>]
[Categories=(value1, value2, . . . )]
[Info=<database table for info string>]
[Link=(<URL|pageID>,[<target_frame>],
    [parm1=<pValue1>, parm2=<pValue2>, . . . ])]

The columnID must be specified for every column. In most cases, the columnID for the column should be the same as the name of the column in the database, but it is not required to be so. A columnID must be unique for a given page.

SQL is an optional attribute that specifies the SQL to build this column. Typically, this is just a simple column name, and if the columnID is the same as the requested column name, then the SQL attribute need not be specified at all. However, SQL must be specified for all calculated columns (sum, min, max, etc).

DisplayName is an optional attribute that specifies the string that will appear in the column header of the data table. The string may contain embedded HTML tags if desired. If the DisplayName is not specified, it will use the columnID as the table column header.

SampleTable is an optional attribute that is used to specify a database table that contains a list of all possible values for that column along with a random number for each column. This table can be used to sample the data displayed, and if it is specified a "Sample By" line will appear in the table Filter screen to allow the sample rate specification.

DataWidth is an optional attribute that specifies the width of the data (in characters) that will appear in the table column on screen.

Justify is an optional parameter to define how data is to be justified inside the column. If Justify is not specified, the column will be justified to the CENTER.

Show/Hide are flag attributes that indicate whether or not the current column will be shown in the table or will be hidden from view. By default, all columns are shown, unless specified with a Hide flag.

Type is an optional attribute that indicates the data type. This should match with the type of the column in the database, though a STRING type can always be used (though no always for the best results). By default, it assumes that the columns are STRING types.

Precision is an optional attribute that is only allowed for FLOAT type data columns. It allows a limitation on the maximum number of digits after the decimal point that are allow in the display. By default, the data is displayed as it is stored in the database.

Categories must be specified when the Type is CATEGORY. A CATEGORY type means that a given column is limited to a small number of elements (e.g. gender), and the Categories attribute is used to define all the possibilities. Usage of CATEGORY types only impacts the table Filter screen, where CATEGORY type columns are given filter options in "checkbox" format instead of the standard operations.

Info is an optional attribute that is used to allow an English text description to be attached to a given coded value by specifying a database table that gives a code-to-English map. If Info is used, a small question mark "help" icon will appear next to all the rows in this column. Mouse-oven on the icon will pop-up the English text.

Link is an optional attribute that is used to define a hyperlink from this each cell in this column to another page. There are several arguments to the Link attribute:
1. The first argument to Link is the page that is going to be linked to. Typically, this will be another page defined in the WebStation configuration file, specified with the pageID, but it can be a link to any desired URL by specifying the URL in a string.
2. The second argument to Link is the target window that the linked page will be drawn in. This is an optional argument because, typically, WebStation pages are linked to the "dataFrame" window, which is the main data display frame. However, any other target can be specified, including "_parent", "_self", "_top", and "_blank". Skip this argument to use the standard WebStation data window.
3. The rest of the arguments, if any, specify the parameters to be passed to the page that is being linked. Each parameter includes a "parameter=<value>" expression, where parameter is the parameter ID that the linked page is expecting, and value is the data that is being passed. Here, value is a type of parameter string and is typically one of:
    a) A simple string constant, like the pageID of the current page, e.g. currentPage="claimsData" would send a parameter called currentPage to the linked page with a value of "claimsData".
    b) A parameter. This is typically done to pass a current parameter to the next page. A common example is modelID=$modelID, which would send the current value of modelID to the linked page.
    c) A columnID. This will pass the datum from the specified column in the current row to the linked page. Since the hyperlink is from a particular column in a particular row, it is often required that the linked page be passed additional information about the row that was selected. An example is providerID=#provID, where a parameter called providerID is passed the datum that resides in the provID column of the row that was clicked on.

Shown/Order

The "Shown" and "Order" configuration elements are only available for CopyOf pages. "Shown" is used to redefine only the Hide/Show attributes of the columns of the original page. "Order" is used to change the order in which the columns will appear. These attributes exist as the primary uses of the CopyOf concept, where there is a need for a page that runs the same query as an existing page, but a different set of columns is to be displayed and focused on, perhaps with a different sort order.

"Shown" is essentially a list of flags that indicate whether the indicated columns are shown (ON) or hidden (OFF). Any columns not specified in this list inherit the mode from the original page. "Shown" is an optional element and looks like the following:

Shown (columnID ON|OFF, columnID2 ON|OFF, . . . );

"Order" is a list of the columnID's in the order that they will be displayed in the table. Note that all the columns from the original page must be represented in this list. "Order" is an optional element and looks like the following:

Order=(columnID1, columnID2, . . . );

Example Page Configuration

The following is an excerpt from an example configuration file for an example WebStation for healthcare fraud and abuse detection (e.g. a Spyder implementation). It gives the configuration for the main suspect list (page "modelScores"). That page has links to:
1) All the patients for each provider—page "provClients" linked from the "Clients" column
2) All the claim details for each provider—page "provClaims" linked from the "Details" column
3) All the reason reports The provClients and provClaims reports are given, as well as a report called "patClaims" which is exactly like "provClaims" but it also takes a client ID as a parameter. Last, there is a report called "patClaimsPCG" which is also a copy of "provClaims" but takes both a client ID and a procedure group.

//
// This is the page that displays suspect lists for models
//

PAGE modelScores
  Type=TABLE
  Params=(modelID, navTree);

SQL From="spy_mscr s, reas_lookup t1, reas_lookup t2, reas_lookup t3, reas_lookup t4, reas_lookup t5"
  Where ="s.reason_1=t1.code AND s.reason_2=t2.code AND s.reason_3=t3.code AND
  s.reason_4=t4.code AND s.reason_5=t5.code AND MODEL_ID='$modelID'"
  OrderBy=(SCORE);

Title "Suspect list for model '$modelID'";

Column MODEL_ID
  DisplayName="Model ID"
  Hide;

Column SUSPECT_ID
  DisplayName="Suspect ID"
  Link=(summaryRpt, targID=#SUSPECT_ID, targType=#SUSPECT_TYPE);

Column SUSPECT_TYPE
  DisplayName="Suspect Type"
  Hide;

Column SCORE
  DisplayName="Score"
  Type=INTEGER;

Column SCORE_DT
  DisplayName="Score Date"
  Type=DATE;

Column RANK
  DisplayName="Rank"
  Type=INTEGER;

Column TOT_PAID
  DisplayName="Total Paid"
  Type=MONEY
  Justify=RIGHT;

Column NUM_DETAILS
  DisplayName="Details"
  Link(provClaims, provID=#SUSPECT_ID)
  Type=INTEGER;

Column NUM_CLNTS
  DisplayName="Clients"
  Link(provClients, provID=#SUSPECT_ID)
  Type=INTEGER;

Column REASON_TXT
  DisplayName="Reasons"
  Justify=LEFT
    Grid=5×1
      GridCol SQL="'(1) ' || s.reason_1 || ' - ' || t1.description" Link(reasRpt, provID=#SUSPECT_ID, reason=#REASON_1)
      GridCol SQL="'(2) ' || s.reason_2 || ' - ' || t2.description" Link(reasRpt, provID=#SUSPECT_ID, reason=#REASON_2)
      GridCol SQL="'(3) ' || s.reason_3 || ' - ' || t3.description" Link(reasRpt, provID=#SUSPECT_ID, reason=#REASON_3)
      GridCol SQL="'(4) ' || s.reason_4 || ' - ' || t4.description" Link(reasRpt, provID=#SUSPECT_ID, reason=#REASON_4)
      GridCol SQL="'(5) ' || s.reason_5 ||' - '|| t5.description" Link(reasRpt, provID=#SUSPECT_ID, reason=#REASON_5);

Column REASON_1
  DisplayName="Reason 1"
  Info="reas_lookup"
  Link(reasRpt, provID=#SUSPECT_ID, reason=#REASON_1) Hide;

Column REASON_2
  DisplayName="Reason 2"
  Info="reas_lookup"
  Link(reasRpt, provID=#SUSPECT_ID, reason=#REASON_2)
  Hide;

Column REASON_3
  DisplayName="Reason 3"
  Info="reas_lookup"
  Link(reasRpt, provID=#SUSPECT_ID, reason=#REASON_3)
  Hide;

Column REASON_4
  DisplayName="Reason 4"
  Info="reas_lookup"
  Link(reasRpt, provID=#SUSPECT_ID, reason=#REASON_4)
  Hide;

Column REASON_5
  DisplayName="Reason 5"
  Info="reas_lookup"
  Link(reasRpt, provID=#SUSPECT_ID, reason=#REASON_5)
  Hide;

//
// This page displays a provider's patients
//

PAGE provClients
  Type=TABLE
  Params=(modelID, provID, navTree);

Target Param=provID
  Type="P";

SQL From ="spy_mart"
  Where ="$setID AND H1PPROV='$provID'"
  OrderBy=(TOT_DOL DESC);

Title "Patient list for provider ID '$provID', used in model '$modelID'"
Column H1PPROV
  DisplayName="Prov ID"
  Hide
  Link(provSum, provID=#H1PPROV);
Column H1PCN
  DisplayName="Client ID"
  Link(clientSum, clientID=#H1PCN);
Column PCN_AGE
  DisplayName="Age"
  Type=INTEGER;
Column CLTGENDR
  DisplayName="Gender"
  Type=CATEGORY
  Categories=("M", "F");
Column NUM_SRV_THIS
  SQL="COUNT(H1PCN)"
  DisplayName="# Services"
  Type=INTEGER
  Link(patClaims, clientID=#H1PCN, provID=#H1PPROV);
Column AVG DOL
  SQL="AVG(H1DPAID)"
  DisplayName="Average $"
  Type=MONEY
  Justify=RIGHT;
Column TOT_DOL
  SQL="SUM(H1DPAID)"
  DisplayName="Total $"
  Type=MONEY
  Justify=RIGHT;
Column PROC_GRP_NUM
  DisplayName="# Services, Proc Groups"
  Type=INTEGER
  Justify=CENTER
  Grid=1×32
    GridCol SQL="SUM(PROC01)" Link(patClaimsPCG, provID=#H1PPROV, clientID=#H1PCN, pcg="PROC01")
    GridCol SQL="SUM(PROC02)" Link(patClaimsPCG, provID=#H1PPROV, clientID=#H1PCN, pcg="PROC02")
    GridCol SQL="SUM(PROC03)" Link(patClaimsPCG, provID=#H1PPROV, clientID=#H1PCN, pcg="PROC03")
    GridCol SQL="SUM(PROC04)" Link(patClaimsPCG, provID=#H1PPROV, clientID=#H1PCN, pcg="PROC04")
    GridCol SQL="SUM(PROC05)" Link(patClaimsPCG, provID=#H1PPROV, clientID=#H1PCN, pcg="PROC05")
    GridCol SQL="SUM(PROC06)" Link(patClaimsPCG, provID=#H1PPROV, clientID=#H1PCN, pcg="PROC06")
    GridCol SQL="SUM(PROC07)" Link(patClaimsPCG, provID=#H1PPROV, clientID=#H1PCN, pcg="PROC07")
    GridCol SQL="SUM(PROC08)" Link(patClaimsPCG, provID=#H1PPROV, clientID=#H1PCN, pcg="PROC08")
    GridCol SQL="SUM(PROC09)" Link(patClaimsPCG, provID=#H1PPROV, clientID=#H1PCN, pcg="PROC09")
    GridCol SQL="SUM(PROC10)" Link(patClaimsPCG, provID=#H1PPROV, clientID=#H1PCN, pcg="PROC10")
    GridCol SQL="SUM(PROC11)" Link(patClaimsPCG, provID=#H1PPROV, clientID=#H1PCN, pcg="PROC11")
    GridCol SQL="SUM(PROC12)" Link(patClaimsPCG, provID=#H1PPROV, clientID=#H1PCN, pcg="PROC12")
    GridCol SQL="SUM(PROC13)" Link(patClaimsPCG, provID=#H1PPROV, clientID=#H1PCN, pcg="PROC13")
    GridCol SQL="SUM(PROC14)" Link(patClaimsPCG, provID=#H1PPROV, clientID=#H1PCN, pcg="PROC14")
    GridCol SQL="SUM(PROC15)" Link(patClaimsPCG, provID=#H1PPROV, clientID=#H1PCN, pcg="PROC15")
    GridCol SQL="SUM(PROC16)" Link(patClaimsPCG, provID=#H1PPROV, clientID=#H1PCN, pcg="PROC16")
    GridCol SQL="SUM(PROC17)" Link(patClaimsPCG, provID=#H1PPROV, clientID=#H1PCN, pcg="PROC17")
    GridCol SQL="SUM(PROC18)" Link(patClaimsPCG, provID=#H1PPROV, clientID=#H1PCN, pcg="PROC18")
    GridCol SQL="SUM(PROC19)" Link(patClaimsPCG, provID=#H1PPROV, clientID=#H1PCN, pcg="PROC19")
    GridCol SQL="SUM(PROC20)" Link(patClaimsPCG, provID=#H1PPROV, clientID=#H1PCN, pcg="PROC20")
    GridCol SQL="SUM(PROC21)" Link(patClaimsPCG, provID=#H1PPROV, clientID=#H1PCN, pcg="PROC21")
    GridCol SQL="SUM(PROC22)" Link(patClaimsPCG, provID=#H1PPROV, clientID=#H1PCN, pcg="PROC22")
    GridCol SQL="SUM(PROC23)" Link(patClaimsPCG, provID=#H1PPROV, clientID=#H1PCN, pcg="PROC23")
    GridCol SQL="SUM(PROC24)" Link(patClaimsPCG, provID=#H1PPROV, clientID=#H1PCN, pcg="PROC24")
    GridCol SQL="SUM(PROC25)" Link(patClaimsPCG, provID=#H1PPROV, clientID=#H1PCN, pcg="PROC25")
    GridCol SQL="SUM(PROC26)" Link(patClaimsPCG, provID=#H1PPROV, clientID=#H1PCN, pcg="PROC26")
    GridCol SQL="SUM(PROC27)" Link(patClaimsPCG, provID=#H1PPROV, clientID=#H1PCN, pcg="PROC27")
    GridCol SQL="SUM(PROC28)" Link(patClaimsPCG, provID=#H1PPROV, clientID=#H1PCN, pcg="PROC28")
    GridCol SQL="SUM(PROC29)" Link(patClaimsPCG, provID=#H1PPROV, clientID=#H1PCN, pcg="PROC29")
    GridCol SQL="SUM(PROC30)" Link(patClaimsPCG, provID=#H1PPROV, clientID=#H1PCN, pcg="PROC30")

```
GridCol SQL="SUM(PROC31)" Link(patClaimsPCG,
    provID=#H1PPROV,        clientID=#H1PCN,
    pcg="PROC31")
GridCol SQL="SUM(PROC32)" Link(patClaimsPCG,
    provID=#H1PPROV,        clientID=#H1PCN,
    pcg="PROC32");
//
// This page display a providers's claims
//
PAGE provClaims
    Type=TABLE
    Params=(modelID, provID, navTree);
SQL From="spymart"
    Where="$setID AND H1PPROV='$provID'"
    OrderBy=(H1DFDOS1 ASC);
Target Param=provID
    Type="P";
Title "Claim data for provider '$provID'. Data used in model '$modelID'"
Column H1PPROV
    DisplayName="Prov ID"
    Link(provSum, provID=#H1PPROV)
    Hide;
Column H1PCN
    DisplayName="Client ID"
    Link(clientSum, clientID=#H1PCN);
Column H1ICN
    DisplayName="Claim ID"
    Link(claimSum, claimID=#H1ICN)
    Hide;
Column H1DFDOS1
    DisplayName="FDOS"
    Type=DATE;
Column H1DPAID
    DisplayName="$ Paid"
    Type=MONEY
    Justify=RIGHT;
Column H1PROC
    DisplayName="Procedure"
    Info="proc_lookup";
Column H1DTOS
    DisplayName="TOS"
    Info="tos_lookup";
Column H1DPOS
    DisplayName="POS"
    Info="pos_lookup";
Column H1DTCPT
    DisplayName="Dx"
    Info="dx_lookup";
//
// This page display a patient's claims for a provider
//
PAGE patclaims
    Type=TABLE
    CopyOf=provClaims
    Params=(modelID, provID, clientID, navTree);
Target Param=provID
    Type="P";
SQL Where="$setID AND H1PCN='$clientID' AND H1PPROV='$provID'";
Title "Claim data for patient '$clientID', provider '$provID'. Data used in model '$modelID'"
//
// This page display a patient's claims for a provider and given provider group
//
PAGE patClaimsPCG
    Type=TABLE
    CopyOf=provClaims
    Params=(modelID, provID, clientID, navTree, pcg);
Target Param=provID
    Type="P";
SQL Where="$setID AND $pcg='1' AND H1PCN='$clientID' AND H1PPROV='$provID'";
Title "Claim data for patient '$clientID', provider '$provID'. Data used in model '$modelID'"
```

We claim:

1. A computer implemented method of analyzing results of a predictive model applied to a data pertaining to a plurality of entities, the method comprising:

providing a predictive model for scoring the entities;

displaying a rank ordering at least some of the entities according to their scores; and for each of the displayed entities, providing a hyperlink to a report tree containing a plurality of hyperlinked reports, including at least one summary report providing a quantitative summary of data contributing to a reason the entity is included in the rank ordered listing;

wherein the report tree contains a plurality of reports comprising:

a suspect list of entities identified by the predictive model;

a breakdown report of each entity's activity by a selected categorization of the entity's activity, the breakdown report linked to the entity in the suspect list;

a distribution chart linked from the breakdown comparing activity of the entity to activity of the entity's peers;

a first subset report linked to the breakdown report showing the breakdown o the entity's activity by at least one of age or gender of other entities which interact with the entity;

a second subset report linked to the first distribution report showing the breakdown of the entity's activity by at least one of age or gender of other entities which interact with the entity;

a tabular report, linked to at least one of the breakdown report, the distribution chart, the first subset report or the second subset report, showing activity of the entity with respect to a selected categorization of the entity's activity;

a interacting entity summary report linked to the breakdown report showing a summary of activities of the entity with respect to each other entity which interacts with the entity;

a comparison report linked to at least one of the previous reports, comparing activity of the entity for at least one other entity with activity of the entity's peers for the same at least one other entity; and a report linked to at least one previous report, providing a listing of individual activities of an entity with respect to a selected categorization of the entity's activities.

2. The method of claim 1, wherein the other entities are clients of the entity.

3. A computer implemented system for analyzing results of a predictive model applied to a data pertaining to a plurality of entities, the method comprising:

providing a predictive model for scoring the entities;

displaying a rank ordering at least some of the entities according to their scores, and for each of the displayed entities, providing a hyperlink to a report tree containing a plurality of hyperlinked reports, including at least one summary report providing a quantitative summary of data contributing to a reason the entity is included in the rank ordered listing;

wherein the report tree contains a plurality of reports comprising:

a suspect list report including a plurality of entities scored by the predictive model;

at least one entity-based report, linked to an individual entity in the suspect list, and providing a comparison of the individual entity's activity with respect to activity of the entity's peers;

at least one entity-subset report, linked an entity-based report, and providing a breakdown of the entity's activity by a selected category;

at least one entity to other entity report, linked to an entity-based report, and providing a breakdown of an entity's activity with respect to each other entity which interacts with the entity; and at least one detail report, linked to at least one previous report, and providing a listing of activities that pertain to the report to which the detail report is linked.

4. The method of claim 3 wherein the predictive model is for identifying suspicious entities based on transactions associated with the entities.

5. The method of claim 3 wherein the entities include at least one entity that is derived from multiple entities that interact with each other.

6. The method of claim 3 wherein a reason for including an entity in the rank ordered listing is suspicious activity of the entity, and the report tree includes a summary report providing a summary of activity of the entity.

7. The method of claim 6, wherein an entity is included in the rank ordered listing if the entity's activities are suspicious relative to the activities of the entity's peers.

8. A computer implemented system for analyzing results of a predictive model applied to a data pertaining to a plurality of entities, the method comprising:

providing a predictive model for scoring the entities;

displaying a rank ordering at least some of the entities according to their scores, and for each of the displayed entities, providing a hyperlink to a report tree containing a plurality of hyperlinked reports, including at least one summary report providing a quantitative summary of data contributing to a reason the entity is included in the rank ordered listing;

wherein the entities are healthcare entities and the predictive model is for identifying suspicious healthcare entities from data including healthcare procedure reimbursement transactions associated with the entities; and wherein the healthcare entities are selected from a set consisting of: healthcare providers, patients, claims processors, doctors, hospitals, nursing facilities, practice groups, laboratories, and pharmacies, and interacting combinations of any of the foregoing entities.

9. The method of claim 8, wherein the summary report compares activity of the entity to activity of the entity's' peers with respect to at least one of following:

a selected set of procedure code groups;

a selected set of diagnosis code groups;

a selected set of type of service codes; and a selected set of place of service codes.

10. The method of claim 8, wherein the summary report compares activity of the entity to activity of the entity's' peers with respect to an individual client of the entity.

11. The method of claim 8, wherein the summary report compares activity of the entity in each of a plurality of age groups of the entity's clients to the activities of the entity's peers in each of the age groups.

12. The method of claim 8, wherein the summary report compares activity of the entity in at least one month to activity of the entity's peers in the at least one month.

13. The method of claim 12, wherein the summary report includes a hyperlink to another report that summarizes the entity's activity in the at least one month with respect to at least one of procedure codes, diagnosis codes, place of service codes, and type of service codes.

14. The method of claim 8, wherein the summary report compares client consecutive visits of the entity for a selected period of time to client consecutive visits of the entity's peers in the selected period of time.

15. The method of claim 8, wherein the summary report compares average dollars per claim for the entity with average dollars per claim for the entity's peers.

16. The method of claim 15, wherein the summary report includes a hyperlink to a report providing a distribution of dollars per claim for the entity.

17. The method of claim 8, wherein the summary report compares per day activity of the entity with per day activity of the entity's peers.

18. The method of claim 17, wherein the per activity is measured by at least one of the following:

dollars paid per client per day;

number of services per client per day;

number of clients per day;

dollars paid per day;

number of claims per day.

19. The method of claim 17, wherein the per activity is limited by at least one of the following:

procedure codes;

diagnosis codes;

type of services codes; and place of service codes.

20. The method of claim 8, wherein the summary report compares the per client volume of activity of the entity with the entity's peers.

21. The method of claim 20, wherein the per client volume of activity is measured by at least one of the following:

dollars paid per client;

number of clients;

number of services per client;

dollars paid to the entity per client;

number of services provided by the entity per client.

22. The method of claim 20, wherein the per client volume of activity is limited by at least one of the following:

procedure codes;

diagnosis codes;

type of services codes; and place of service codes.

23. The method of claim 20, wherein the summary report includes a hyperlink to a report of activity volume for each of the entity's clients, sorted according to a measure of the activity volume per client.

24. The method of claim 8, wherein the summary report compares the number of multiple entities seen per day by the entity's clients to the number of multiple entities seen per day by the clients of the entity's peers.

25. A computer implemented method of analyzing results of a predictive model applied to a data set pertaining to transactions of a plurality of entities, the method comprising:

executing a predictive model on the data set to select from the entities, a suspect list containing a plurality of suspects, the suspects rank ordered according to their predictive model scores, each suspect associated with a list of reasons generated by the predictive model for including the suspect in the suspect list, the reasons for each suspect rank ordered by their from a predetermined set of reasons;

for each reason, providing a hyperlink to a report tree comprising a plurality of predetermined hyperlinked reports, arranged by their hyperlinks to provide access from the reason in the suspect list to at least one summary report providing a summary analysis of data related to the reason and the suspect, at least one summary report hyperlinked directly or indirectly to at least one detail report containing a list of specific transactions which contribute to the inclusion of the suspect in the suspect list;

receiving a user input selecting for one a suspect from the suspect list a hyperlinked reason in the list of reasons associated with the suspect, and in response, generating from the report tree for the selected reason, a summary report providing the summary analysis of the transactions related to the selected reason and suspect; and responsive to user input selecting a hyperlink to one of the detail reports, generating the selected detailed report from the transactions associated with suspect.

\* \* \* \* \*